US011462003B2

United States Patent
Gunnam et al.

(10) Patent No.: US 11,462,003 B2
(45) Date of Patent: Oct. 4, 2022

(54) FLEXIBLE ACCELERATOR FOR SPARSE TENSORS IN CONVOLUTIONAL NEURAL NETWORKS

(71) Applicant: Western Digital Technologies, Inc., San Jose, CA (US)

(72) Inventors: Kiran Gunnam, Santa Clara, CA (US); Anand Kulkarni, San Jose, CA (US); Zvonimir Bandic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 323 days.

(21) Appl. No.: 16/830,167

(22) Filed: Mar. 25, 2020

(65) Prior Publication Data
US 2021/0303909 A1     Sep. 30, 2021

(51) Int. Cl.
G06V 10/75 (2022.01)
G06K 9/62 (2022.01)
G06F 17/16 (2006.01)
G06N 3/08 (2006.01)
G06N 3/04 (2006.01)
G06N 20/00 (2019.01)

(52) U.S. Cl.
CPC ............ *G06V 10/753* (2022.01); *G06F 17/16* (2013.01); *G06K 9/6251* (2013.01); *G06N 3/0445* (2013.01); *G06N 3/08* (2013.01); *G06N 20/00* (2019.01)

(58) Field of Classification Search
CPC .... G06V 10/753; G06N 20/00; G06N 3/0445; G06N 3/08; G06F 17/16; G06K 9/6251
See application file for complete search history.

(56) References Cited

U.S. PATENT DOCUMENTS

| 8,832,004 B2 | 9/2014 | Kato et al. |
| 10,180,928 B2 | 1/2019 | Nurvitadhi et al. |
| 2017/0323196 A1* | 11/2017 | Gibson ............... G06N 3/0481 |

(Continued)

FOREIGN PATENT DOCUMENTS

| CN | 110163042 A | 8/2019 |
| WO | WO 2019/196222 A1 | 10/2019 |

OTHER PUBLICATIONS

International Search Report & The Written Opinion of the International Searching Authority dated Aug. 27, 2020, International Application No. PCT/US2020/035428.

(Continued)

*Primary Examiner* — Fayyaz Alam
(74) *Attorney, Agent, or Firm* — Vierra Magen Marcus LLP

(57) ABSTRACT

A system with a multiplication circuit having a plurality of multipliers is disclosed. Each of the plurality of multipliers is configured to receive a data value and a weight value to generate a product value in a convolution operation of a machine learning application. The system also includes an accumulator configured to receive the product value from each of the plurality of multipliers and a register bank configured to store an output of the convolution operation. The accumulator is further configured to receive a portion of values stored in the register bank and combine the received portion of values with the product values to generate combined values. The register bank is further configured to replace the portion of values with the combined values.

20 Claims, 28 Drawing Sheets

(56) References Cited

U.S. PATENT DOCUMENTS

| | | | |
|---|---|---|---|
| 2018/0046916 A1 | 2/2018 | Dally et al. | |
| 2018/0336456 A1 | 11/2018 | Norrie et al. | |
| 2019/0042257 A1* | 2/2019 | Baum | G06F 9/30025 |
| 2019/0243653 A1 | 8/2019 | Sodani et al. | |
| 2019/0243800 A1 | 8/2019 | Sodani et al. | |
| 2019/0243871 A1 | 8/2019 | Sodani et al. | |
| 2019/0244117 A1 | 8/2019 | Sodani et al. | |
| 2019/0244118 A1 | 8/2019 | Sodani et al. | |
| 2019/0244130 A1 | 8/2019 | Sodani et al. | |
| 2019/0244141 A1 | 8/2019 | Sodani et al. | |
| 2020/0311183 A1* | 10/2020 | Simpson | G06F 17/16 |
| 2020/0341772 A1* | 10/2020 | Chilappagari | G06F 9/3887 |
| 2021/0182025 A1* | 6/2021 | Shafiee Ardestani | |
| | | | G06N 3/0454 |
| 2021/0256357 A1* | 8/2021 | Najafi | G06F 7/523 |
| 2021/0357741 A1* | 11/2021 | Jha | H04W 12/42 |

OTHER PUBLICATIONS

Gondimala A., et al., "Sparten: A sparse tensor accelerator for convolutional neural networks," In Proceedings of the 52nd Annual IEEE/ACM International Symposium on Microarchitecture, Oct. 12, 2019, Abstract only.

English Abstract of Chinese Publication No. 110163042 published Aug. 23, 2019.

International Search Report & The Written Opinion of the International Searching Authority dated Sep. 6, 2020, International Application No. PCT/US2020/035435.

English Abstract of PCT Publication No. W02019/196222 published Oct. 17, 2019.

A. Coates et al.,"Deep learning with COTS HPC systems", Proceedings of the 30th International Conference on Machine Learning, Atlanta, Georgia, US, 2013.

A. Krizhevsky et al., "ImageNet Classification with Deep Convolutional Neural Networks", 2012.

A. Parashar, et al. "SUNN: An Accelerator for Compressed-Sparse Convolutional Neural Networks", May 23, 2017.

Albericio, J. et al., "Cnvlutin: Ineffectual-Neuron-Free Deep Neural Network Computing", Conference Paper—Jun. 2016.

Bendersky, Eli "Depthwise separable convolutions for machine learning" (Apr. 4, 2018), Eli Bendersky's website, from https://eli.thegreenplace.net/2018/depthwise-separable-convolutions-for-machine-learning/ (retrieved Mar. 3, 2020).

Chen et al. "Escoin: Efficient Sparse Convolutional Neural Network Inference on GPUs", Apr. 3, 2019.

Chen et al., "Eyerissv2: A Flexible Accelerator for Emerging Deep Neural Networks on Mobile Devices", 2019.

Chen, Tianshi et al., "DianNao: A Small-Footprint High-Throughput Accelerator for Ubiquitous Machine-Learning", ASPLOS '14, Salt Lake City, Utah, USA, 2014.

Chen, Yunji et al., "DaDianNao: A Machine-Learning Supercomputer", 2014 47th Annual IEE/ACM International Symposium on Microarchitecture, IEEE Computer Society, 2014.

Du, Zidong et al., "Shidiannao Shifting Vision Processing Closer to the Sensor", Portland, OR, USA, ACM, 2015.

Han, Song et al., "EIE: Efficient Inference Engine on Compressed Deep Neural Network", IEEE Press 2016.

Han, Song et al., "Deep Compression: Compressing Deep Neural Networks with Pruning, Trained Quantization and Huffman Coding", pp. 1-14, published as a conference paper at ICLR 2016.

Han, Song et al., "ESE: Efficient Speech Recognition Engine with Sparse LSTM on FPGA", ACM, Feb. 20, 2017.

Han, Song et al., "Learning Both Weights and Connections for Efficient Neural Networks", pp. 1-9, 2015.

J. L. Holt and J.-N. Hwang, 'Finite precision error analysis of neural network hardware implementations,' IEEE Transactions on Computers, vol. 42, 1993.

J. Zhang, K. Fangineni, Z. Ghodsi, S. Garg, "ThUnderVolt: Enabling Aggressive Voltage Underscaling and Timing Error Resilience for Energy Efficient Deep Learning Accelerators" 2018 Association for Computing Machinery (DAC 18). Jun. 2018.

Jouppi, Norman P. et al., "In-Datacenter Performance Analysis of a Tensor Processing Unit", Google, Inc., Mountain View, CA USA, 2017.

Khlestov, Illarion "Different types of the convolution layers" (2019), Illarion's Notes, Github, from https://ikhlestov.github.io/pages/machine-learning/convolutions-types/ (retrieved Mar. 3, 2020).

Kim et al., "Parallax Sparsity aware Data Parallel Training of Deep Neural Networks", Seoul National University, Dec. 25, 2018.

Le, Quoc V., "Building High-level Features using Large Scale Unsupervised Learning", Proceedings of the 29th International Conference on Machine Learning, Edinburgh, Scotland, UK, 2012.

Lee, Ching-En et al., "Stitch-X—An Accelerator Architecture for Exploiting Unstructured Sparsity in Deep Neural Networks", University of Michigan, NVIDIA, and Massachusetts Institute of Technology.

Lu et al., "Promoting the Harmony between Sparsity and Regularity: A Relaxed Synchronous Architecture for Convolutional Neural Networks", 2018.

Lu et al., "SpWA An Efficient Sparse Winograd Convolutional Neural Networks Accelerator on FPGAs", Center for Energy-efficient Computing and Applications, School of EECS, Peking University, 2018.

NVIDIA Deep Learning Accelerator: NVDLA Open Source Project >> Ducumentation>>NVDLA, from http://nvdla.org/ (retrieved May 8, 2019).

Page et al. "SPARCNet: A Hardware Accelerator for Efficient Deployment of Sparse Convolutional Networks", University of Maryland, Baltimore County, 2017.

Rastegari, M. et al., XNOR-Net: ImageNet Classification Using Binary Convolutional Neural Networks, Allen Institute for AI, University of Washington, Aug. 2, 2016.

Smith, Steven W. "The Scientist and Engineer's Guide to Digital Signal Processing" Chapter 27, 22 pgs. (Published 2011) from https://www.dspguide.com/ch27/2.htm (Retrieved Nov. 11, 2019).

Sombatsiri et al., "Parallelism-flexible Convolution Core for Sparse Convolutional Neural Networks on FPGA", IPSJ Transactions on System LSI Design Methodology, vol. 12, pp. 22-37, Feb. 2019.

Steffl, Samuel et al., "LACore: A RISC-V Based Linear Algebra Accelerator for SOC Designs" IEEE Conference on Computer Design, 2007, retrieved from https://content.riscv.org/wp-content/uploads/2017/12/Wed1612_linear_algebra_Steffl.pdf (Retrieved Nov. 11, 2019) 11 pgs.

Wang, Yi et al., "Exploiting Parallelism for CNN Applications on 3D Stacked Processing-In-Memory Architecture", pp. 1-12, IEEE, 2018.

Yao, Zhuliang et al. "Balanced Sparsity for Efficient DNN Inference on GPU", Association for the Advancement of Artificual Intilligence (www.aaai.org), 2019.

Zhang, Shijin et al.,"Cambricon-X: An Accelerator for Sparse Neural Networks", IEEE, 2016.

Zhou, Xuda, et al. "Cambricon-S: Addressing Irregularity in Sparse Neural Networks through A Cooperative Software/Hardware Approach", 2018 51st Annual IEEE/ACP International Symposium on Microarchitechture, 2018.

* cited by examiner

FLEXIBLE ACCELERATOR FOR SPARSE TENSORS IN CONVOLUTIONAL NEURAL NETWORKS

BACKGROUND

Applicant provides the following description to assist the understanding of the reader. None of the information provided or references cited is admitted to be prior art.

Machine learning algorithms are used in a wide variety of applications such as medical imaging, computer vision, advertising, gaming, etc. Machine learning algorithms process a large amount of input data. As the amount of input data increases, the computation time and computational resources needed to process the large amount of input data also increases. However, currently used mechanisms are limited in the way they are configured and the way they process input data in machine learning applications.

SUMMARY

In accordance with some aspects of the present disclosure, a system is disclosed. The system includes a multiplication circuit having a plurality of multipliers. Each of the plurality of multipliers is configured to receive a data value and a weight value to generate a product value in a convolution operation of a machine learning application. The system also includes an accumulator configured to receive the product value from each of the plurality of multipliers and a register bank configured to store an output of the convolution operation. The accumulator is further configured to receive a portion of values stored in the register bank and combine the received portion of values with the product values to generate combined values. The register bank is further configured to replace the portion of values with the combined values.

In accordance with some other aspects of the present disclosure, a method is disclosed. The method includes inputting, by a processor in a machine learning application, a data value and a weight value into each of a plurality of multipliers to generate a plurality of product values in each iteration of a plurality of iterations of a convolution operation. The method also includes combining, by the processor in each iteration of the plurality of iterations, each of the plurality of product values with one of a plurality of accumulator values in an accumulator to generate a plurality of combined values. The plurality of accumulator values are received from a register bank. The method also includes replacing, by the processor in each iteration of the plurality of iterations, the plurality of accumulator values with the plurality of combined values in the register bank.

In accordance with yet other aspects of the present disclosure, a non-transitory computer-readable media having computer-readable instructions stored thereon is disclosed. The computer-readable instructions when executed by a processor associated with a machine learning application cause the processor to partition an input feature map into a plurality of sub-feature maps, and input each of the plurality of sub-feature maps into a tensor compute unit of a plurality of tensor compute units to generate an output sub-feature map. The generating of the output sub-feature map for a first sub-feature map of the plurality of sub-feature maps includes inputting a plurality of data values of the first sub-feature map into a plurality of multipliers of a first tensor compute unit of the plurality of tensor compute units, inputting a weight value into the plurality of multipliers for generating a plurality of product values, combining each of the plurality of product values with one of a previously computed product value to obtain a plurality of combined values, shifting the plurality of combined values to obtain the output sub-feature map for the first sub-feature map, and combining the output sub-feature map from each of the plurality of tensor compute units to obtain an output feature map.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
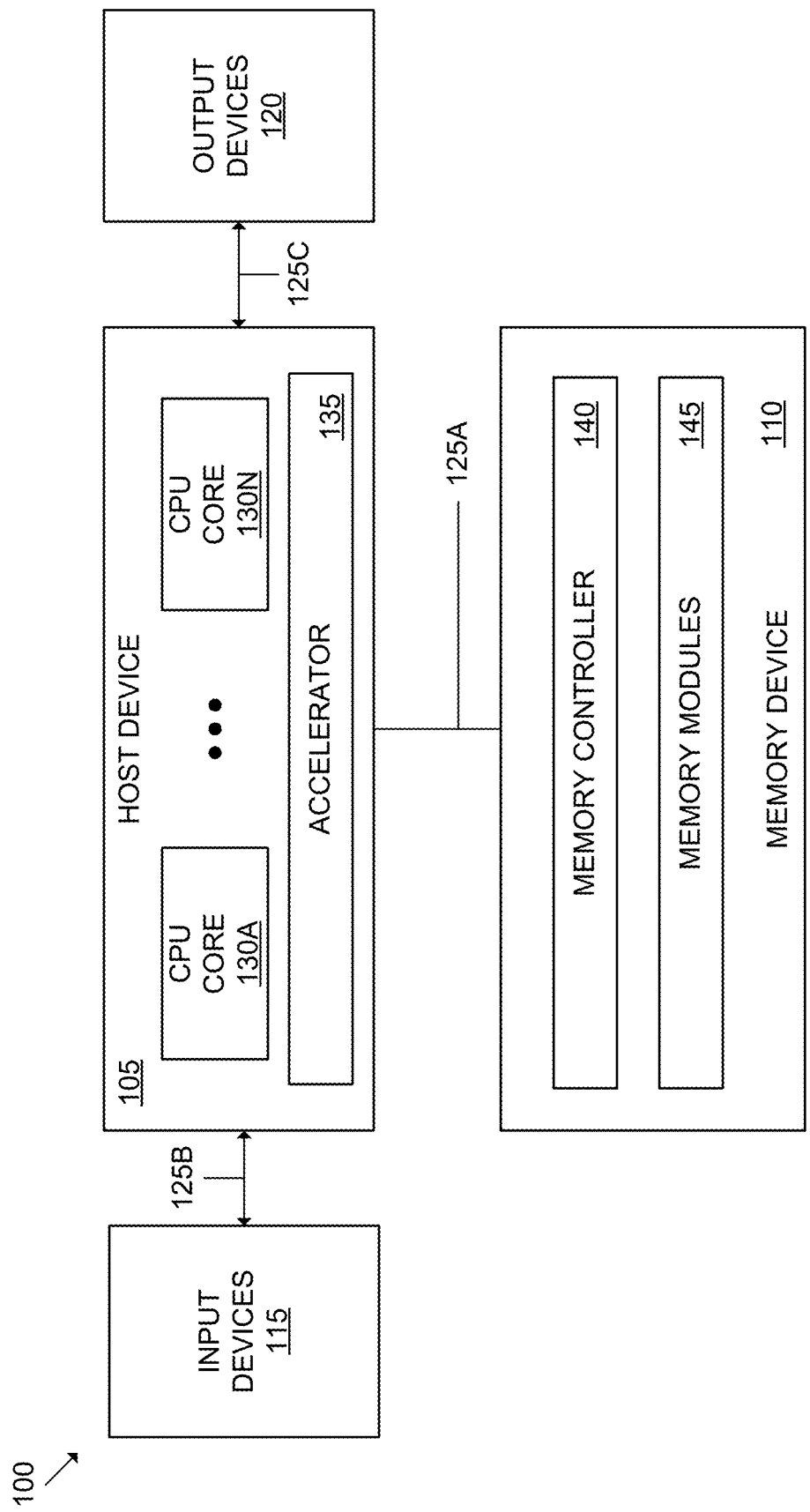
FIG. 1 is an example block diagram of a computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Neural networks keep advancing towards larger and deeper architectures as they get involved in more sophisticated processing tasks in a broader scope of scenarios. Large neural networks intensify the computation and memory accesses with increasing amount of data. Specifically, the number of synapses and neurons in a neural network increase each time the amount of data that needs to be processed increases. For example, some neural networks may have over six hundred thousand neurons, while some other neural networks may have more than one million neurons. The number of synapses may be much larger, for example, over sixty million in one neural network. Convolutional Neural Networks ("CNN") are one type of neural networks. Specifically, CNN is a type of a deep neural network that uses convolution operations to classify an input (e.g., an image). To classify, the CNN receives the input and assigns weights and biases to the input to differentiate one aspect of the input from another aspect of the input. In some embodiments, CNN may include multiple layers of processing between receiving the input and sending the output. Depending upon the size of the input and the number of layers used in the CNN, a large amount of data may need to be processed.

Processing such large amounts of data brings challenges for off-chip and on-chip memory bandwidth in accelerator architecture design. Mechanisms may be used to either reduce the amount of data on which computation is to be performed or reduce the computation time. One such mechanism that reduces the amount of data to be computed or the computation time may include weight encoding via quantization and entropy coding that shrink the weight size. Other mechanisms work at the circuit-level, such as using shorter bit-width operators or approximate computing. Another mechanism to reduce computation time or amount of data relies on sparsity. Sparsity may determine the number or percentage of non-zeroes in a given data. Pruning synapses and neurons in a neural network based on sparsity may reduce the amount of data that needs to be computed by more than ten times with negligible accuracy loss. Sparsity may be either static or dynamic. Static sparsity is known beforehand and may not change from one set of input data to another set of input data. The sparsity in weights may be considered static sparsity. For example, the weights that are zero or non-zero in value may be known before the computation on the input data is begun. Further, the weights that are zero or non-zero may remain the same from one set of input data to the next. Dynamic sparsity is the sparsity in an input feature map of the input data.

Specifically, from an input data (e.g., an input image), one or more input feature maps may be generated. Each of the input feature maps may be combined with associated weights to perform a classification process. Each input feature map may have either zero values or non-zero values. The number or percentage of non-zero values in a given input feature map may determine the sparsity of that input feature map. Since each input feature map may be different from another input feature map, and the location of the zero and non-zero values may change from one input feature map to another, the sparsity in an input feature map is dynamic sparsity. Since static sparsity is easier to identify and consider in a machine learning operation, many mechanisms that reduce the amount of data to be computed rely on static sparsity only. The irregularity caused by dynamic sparsity prevents many mechanisms from fully leveraging the computation and data reduction.

Thus, the present disclosure provides mechanisms to transform dynamic and random sparsity into a more or less structured sparsity for reducing both the amount of data that is to be computed, as well as for reducing the computation time. Specifically, the present disclosure provides a flexible accelerator that converts an input feature map into a plurality of input sub-feature maps such that each of the plurality of sub-feature maps has a similar amount of sparsity and allows each of the plurality of sub-feature maps to be processed independently while taking advantage of the sparsity.

Referring now to FIG. 1, an example block diagram of a computing system 100 is shown, in accordance with some embodiments of the disclosure. The computing system 100 may include a host device 105 associated with a memory device 110. The host device 105 may be configured to receive input from one or more input devices 115 and provide output to one or more output devices 120. The host device 105 may be configured to communicate with the memory device 110, the input devices 115, and the output devices 120 via appropriate interfaces 125A, 125B, and 125C, respectively. The computing system 100 may be implemented in a variety of computing devices such as computers (e.g., desktop, laptop, servers, data centers, etc.), tablets, personal digital assistants, mobile devices, wearable computing devices such as smart watches, other handheld or portable devices, or any other computing unit suitable for performing operations using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, image data, sound data, position data, combinations thereof, or other types of analog and/or digital data that is suitable for processing using the computing system 100.

The host device 105 may include one or more Central Processing Unit ("CPU") cores or processors 130A-130N that may be configured to execute instructions for running one or more applications associated with the host device. The CPU cores 130A-130N are shown as a non-limiting representative example of integrated circuits that can perform processing functions, and may be substituted and/or combined with Field Programmable Gate Array ("FPGA"), Graphical Processing Unit ("GPU"), custom Application Specific Integrated Circuit ("ASIC"), and the like. In some embodiments, the instructions and data needed to run the one or more applications may be stored within the memory device 110. The host device 105 may also be configured to store the results of running the one or more applications within the memory device 110. The host device 105 may also include an accelerator 135. The accelerator 135 may be used to perform machine learning operations. The accelerator 135 is discussed in greater detail in FIG. 2. Although the accelerator 135 is shown as being part of the host device 105 in FIG. 1, in other embodiments, the accelerator may be apart from the host device and communicatively coupled (e.g., through a bus or network connection) to the host device. In such a case, the accelerator 135 may also be communicatively coupled to the memory device 110, be a part of the memory device 110, or include its own separate memory device.

To facilitate communication with the memory device 110, the memory device may include or be associated with a memory controller 140. Although the memory controller 140 is shown as being part of the memory device 110, in some embodiments, the memory controller may instead be part of the host device 105 or another element of the computing system 100 and operatively associated with the memory device. The memory controller 140 may be configured as a logical block or circuitry that receives instructions from the host device 105 (e.g., the accelerator 135) and performs operations in accordance with those instructions. The memory device 110 may include one or more memory modules 145 that store data and instructions. The memory modules 145 may be any of a variety of memory types, including a variety of volatile memories, non-volatile memories, or a combination thereof. For example, in some embodiments, one or more of the memory modules 145 or portions thereof may include NAND flash memory cores. In other embodiments, one or more of the memory modules 145 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory device 110. In some embodiments, one or more of the memory modules 145 or portions thereof may be configured as other types of storage class memory ("SCM"). Generally speaking, the memory modules 145 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable in performing the functions described herein. Similarly, the host device 105, the input devices 115, the output devices 120, and the memory device 110 including the accelerator 135, the memory controller 140, and the memory modules 145 may include other hardware, software, and/or firmware components that are considered necessary or desirable in performing the functions described herein. In addition, in certain embodiments, the memory device 110 may integrate some or all of the components of the host device, including, for example, the CPU cores 130A-130N and/or the accelerator 135.

Figure 2:
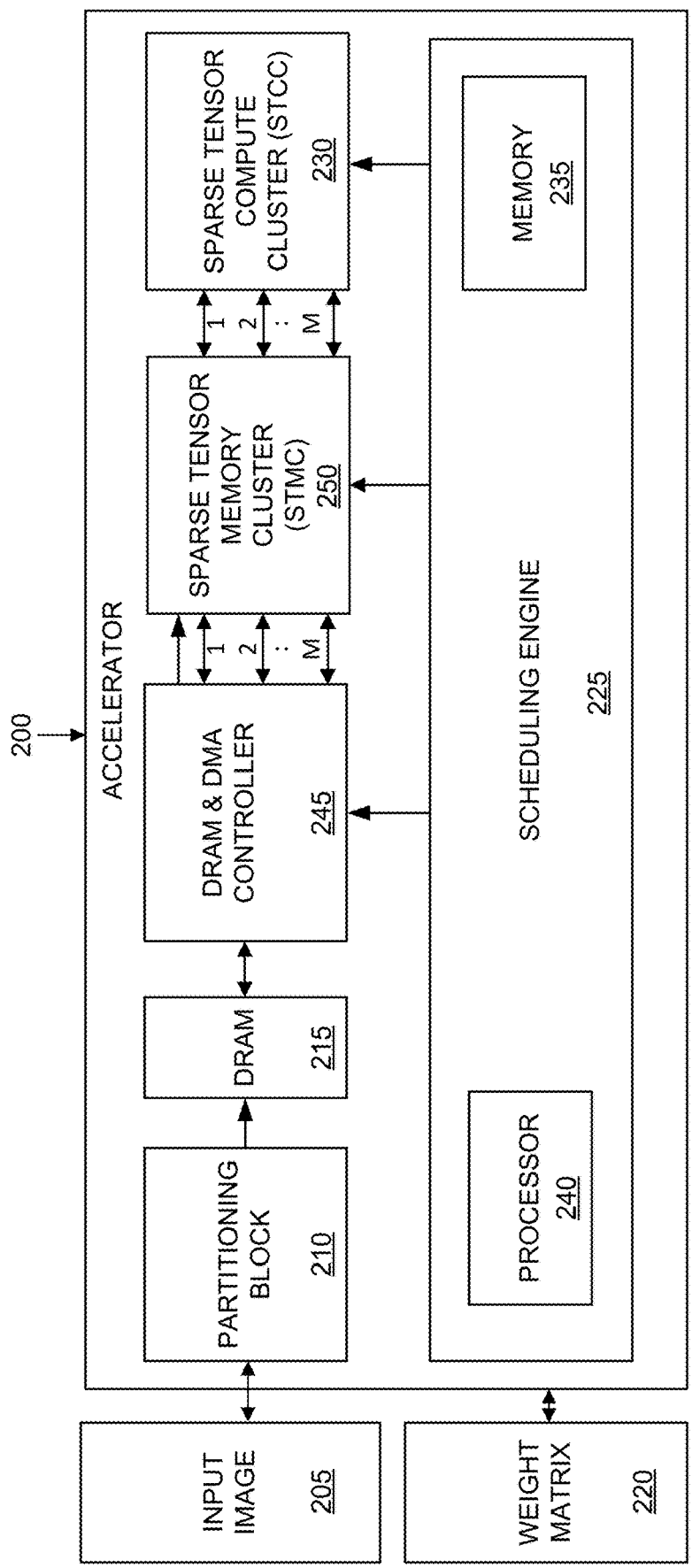
FIG. 2 is an example block diagram of an accelerator of the computing system of FIG. 1, in accordance with some embodiments of the present disclosure.

Turning now to FIG. 2, an example accelerator 200 is shown, in accordance with some embodiments of the present disclosure. The accelerator 200 is analogous to the accelerator 135 of FIG. 1. Thus, although not shown, the accelerator 200 may be associated with a host device (e.g., the host device 105) and a memory device (e.g., the memory device 110). The accelerator 200 may be used to optimize machine learning operations, for example, in a CNN. Although the accelerator 200 is explained with respect to CNN, in other embodiments, the accelerator 200 may be used in other types of neural networks or machine learning applications as well. Generally speaking, the accelerator 200 may be used in any type of application (whether machine learning or otherwise) that desires to reduce computation data and computation time.

In some embodiments, the accelerator 200 may be used to consider dynamic and static sparsity in the input feature maps and the weights, respectively, and allocate computation amongst various compute engines based on the dynamic and static sparsity. The accelerator 200 may receive an input image 205 (e.g., from the host device 105) on which one or more machine learning operations are to be performed. It is to be understood that although the input image 205 is used herein as an example, the accelerator 200 may be used to process other types of data including video, text, and any other type of data that may benefit from being processed by the accelerator.

The input image 205 may be represented by an array of pixels. Simply as an example and without intending to be limited in any way, say the input image 205 is represented by a 1024×1024×3 array of pixels. Thus, the input image 205 is 1024 pixels high, 1024 pixels wide, and 3 colors (e.g., Red, Green, Blue) deep. In some embodiments, the 1024×1024×3 array of pixels may be divided into three input feature maps, with each input feature map representing one color and being of size 1024×1024×1 (also referred to herein as simply 1024×1024). Further, each input feature map may be represented as a matrix having a plurality of rows and a plurality of columns. Each row extends in an X-direction (left-right), while each column extends in a Y-direction (up-down). Each pixel of an input feature map may correspond to one cell (e.g., formed at the intersection of one row and one column) of the matrix. Thus, a 1024×1024 input feature map may be represented by a matrix having 1024 rows and 1024 columns, with the intersection of each row and each column forming one cell for one pixel.

In some embodiments, the input feature maps of the input image 205 may be generated by the accelerator 200. For example, in some embodiments, a partitioning block 210 may be configured to generate the input feature maps from the input image 205. In other embodiments, a feature map block (not shown) of the accelerator 200 may receive the input image 205, and generate the input feature maps therefrom, and send those input feature maps to the partitioning block 210. In yet other embodiments, the input feature maps of the input image 205 may be generated outside of the accelerator 200, and instead of the input image, the input feature maps may be input into the accelerator. The partitioning block 210 may be configured in software, hardware, firmware, or combinations thereof.

Each of the input feature maps of the input image 205 may be further sub-divided into one or more sub-feature maps in the partitioning block 210. The sub-division of an input feature map into one or more sub-feature maps in the partitioning block 210 is discussed in FIGS. 3A and 3B below. Each sub-feature map is also referred to herein as an "input tensor." By dividing an input feature map into one or more sub-feature maps, each of the sub-feature maps may be independently processed to generate an output sub-feature map and to increase performance. The output sub-feature maps from each of the sub-feature maps may then be combined together to create an output feature map. When the image 205 includes multiple channels, the input feature maps of each channel may be sub-divided into one or more sub-feature maps, each of the sub-feature maps may be processed independently to generate an output sub-feature map, and the output sub-feature maps of each of the one or more sub-feature maps may be combined to generate a channel output feature map. The various channel output feature maps may then be combined to generate the output feature map. Such convolution operations that involves multiple channels is referred to herein as "depth wise separable convolution." In some embodiments, the input feature maps and/or each of the sub-feature maps may be compressed to reduce storage space and further increase performance. The process of compressing as used throughout this disclosure is discussed in greater detail in U.S. application Ser. No. 16/726,084, titled "Flexible Accelerator For Sparse Tensors (FAST) in Machine Learning" and filed on Dec. 23, 2019, the entirety of which is incorporated by reference herein.

The partitioning block 210 may be associated with a DRAM 215 that may be configured to initially store the input feature maps of the input image 205, and upon sub-dividing the input feature maps into one or more sub-feature maps, store each of the one or more sub-feature maps. The DRAM 215 may also be used to store any intermediate outputs (e.g., the output sub-feature map, channel output feature map, etc.) and/or the output feature map. In some embodiments, the DRAM 215 may also be configured to store a weight matrix 220. In some embodiments, the DRAM 215 may also store various training models, schedules, and other information needed to process the input image 205. Further, although only the DRAM 215 is shown in the accelerator 200, in some embodiments, the accelerator may include additional and/or other types of memories. For the sake of simplicity, the DRAM 215 is used in the description, but other memory substitutes are contemplated for various embodiments. For example, in some embodiments, the accelerator 200 may additionally or alternatively include SRAM, storage class memory such as MRAM, ReRAM, and/or flash memories to store the input feature maps, the one or more sub-feature maps, various outputs, training models, schedules, and/or other information needed to process the input image 205. When such multiple memories are provided in the accelerator 200, in some embodiments, these memories may be interconnected with each other and configured to communicate with each other. In some embodiments, the DRAM 215 and any other memory in the accelerator 200 may be part of the memory device (e.g., the memory device 110) associated with the host device (e.g., the host device 105) of which the accelerator is part of. In some embodiments, one or more of the DRAM 215 and any other memory in the accelerator 200 may be separate from the memory device (e.g., the memory device 110).

In addition to the input image 205, the accelerator 200 also receives the weight matrix 220 (e.g., from the host device 105). The weight matrix 220 may include weights or filters that are to be applied to each of the sub-feature maps. The weight matrix 220 is also referred to herein as a kernel matrix or a filter matrix. The weight matrix 220 may include at least one row and at least one column, forming cells at the intersection of rows and columns. The weight matrix 220 may be used to perform the convolution operations on the input image 205. In some embodiments, the weight matrix 220 may also be sub-divided into one or more sub-weight maps similar to the input feature maps. In some embodiments, the weight matrix 220 and/or the sub-weight maps may also be compressed similar to the input feature maps/sub-feature maps. In some embodiments, the weight matrix 220 may be received by a scheduling engine 225. In other embodiments, the weight matric 220 may be received by the partitioning block 210 or by another component of the accelerator 200. Further, if the weight matrix 220 is sub-divided into sub-weight maps and/or compressed, these processes may occur within the scheduling engine 225 in some embodiments. In other embodiments, these processes may occur in the portioning block 210, in a separate partitioning block in the accelerator 200 dedicated to the weight matrix 220, and/or outside the accelerator. The weight matrix 220 and/or the sub-weight maps may be stored within the DRAM 215, the scheduling engine 225, or in any other memory of the accelerator 200.

The scheduling engine 225 is configured to perform a sparsity analysis, and assign, in some embodiments, each of the input feature maps to a compute unit based upon the sparsity. As used herein, "sparsity" means the number or percentage of non-zeroes in a given input data. In some embodiments, an input feature map that has more non-zeroes than zeroes is a less sparse input feature map or a dense input feature map, whereas, an input feature map that has more zeroes than non-zeroes is a sparse input feature map. In other embodiments, a sparse input feature map may be defined as having at least a certain percentage of zeros (e.g., 80%), and a dense input feature map may have more zeroes than non-zeroes (e.g., 60:40). More generally, a sparse input feature map has more zeros than a dense input feature map. Thus, to perform the sparsity analysis, the scheduling engine 225 may determine the number or percentage of zeroes or non-zeroes in an input feature map. Further, the scheduling engine 225 may assign or allocate a sparse input feature map to a sparse tensor compute cluster 230 for processing. Thus, the sparse tensor compute cluster 230 is configured to process input feature maps having higher sparsity (e.g., number or percentage of zeroes above a threshold, or in other words, more zero values than non-zero values). The sparse tensor compute cluster 230 is discussed in greater detail below.

In some embodiments, the accelerator 200 may also include a dense tensor compute cluster (not shown in FIG. 2) and/or a vector accelerator (also not shown in FIG. 2). If provided, the dense tensor compute cluster may be configured to process feature maps having lower sparsity (e.g., dense input feature maps or input feature maps in which the number or percentage of zeroes is below a threshold, or in other words, having more non-zero values than zero values) and the vector accelerator may be used to process input feature maps that cannot be processed by either the dense tensor compute cluster or the sparse tensor compute cluster 230. For example, in some embodiments where the dense tensor compute cluster and/or a vector accelerator are provided, the dense tensor compute cluster and the sparse tensor compute cluster 230 may be configured with a defined or supported list of operations that the dense tensor compute cluster and the sparse tensor compute cluster, respectively, may be able to perform. If the processing requires performing an operation that is not supported by either of the dense tensor compute cluster or the sparse tensor compute cluster 230, then that operation may be performed by the vector accelerator. In some embodiments, the vector accelerator may be an open source vector accelerator based on RISC-V such as LACore. In other embodiments, other types of suitable vector accelerators may be used for the vector accelerator. The dense tensor compute cluster and the vector accelerator are discussed in greater detail in the U.S. application Ser. No. 16/726,084 mentioned above, again the entirety of which is incorporated by reference herein.

The scheduling engine 225 may include a memory 235 to store computer-readable instructions that may be executed by a processor 240 to perform the operations of the scheduling engine 225. The memory 235 may be part of the memory device (e.g., the memory device 110) of the host device (e.g., the host device 105) of which the accelerator 200 is part of, or may be provisioned from a separate memory. Further, the scheduling engine 225 may be implemented as software, hardware, firmware, or combination thereof. The processor 240 may be part of or may be similar to the CPU cores 130A-130N of the host device 105, or in the case when the accelerator is part of the memory device 110, part of a processor or controller of the memory device.

For processing an input feature map in the sparse tensor compute cluster 230, the accelerator 200 may also include a direct memory access controller 245 configured to transfer the sub-feature maps from the DRAM 215 to a sparse tensor memory cluster 250 with minimal intervention from the scheduling engine 225 or the sparse tensor compute cluster. The sparse tensor memory cluster 250 is also discussed in greater detail below. It is noted while direct memory access is used as an example for illustration, other type of memory access protocols/methods may be used, including memory access across communication buses and memory fabrics.

It is to be understood that only some components of the accelerator 200 are shown in FIG. 2. The accelerator 200 may include other or additional components that may be needed or considered desirable in performing the operations described herein.

Figure 3A:
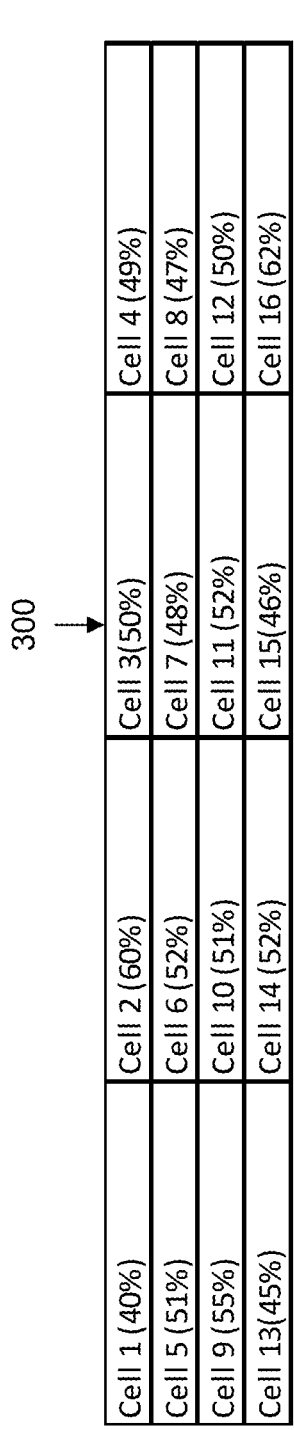
FIGS. 3A and 3B are examples for converting an input feature map into a plurality of sub-feature maps, in accordance with some embodiments of the present disclosure.
Figure 3B:
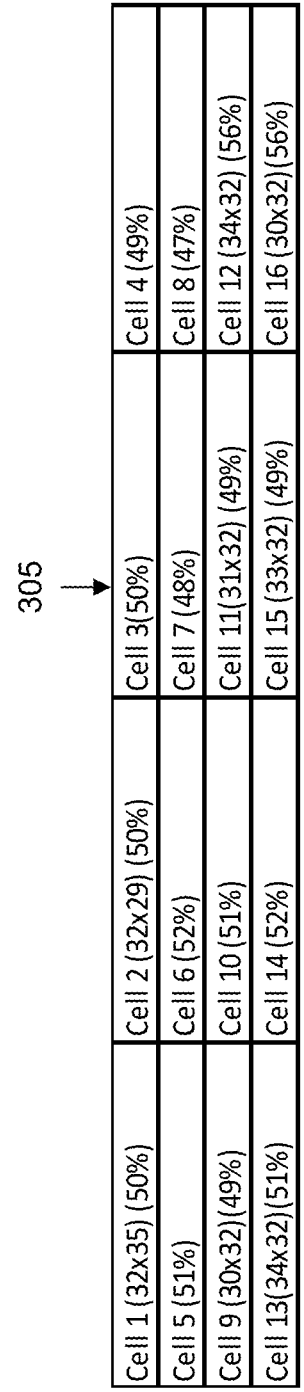

Turning to FIGS. 3A and 3B, an example of dividing an input feature map into one or more sub-feature maps or input tensors in the partitioning block 210 is shown, in accordance with some embodiments of the present disclosure. Specifically, an input feature map that is a sparse input feature map and has been designated to be processed in the sparse tensor compute cluster 230 may be sub-divided into one or more sub-feature maps. Specifically, each input feature map for each channel may be divided into "M" sub-feature maps. "M" is dependent upon a number of sparse tensor compute units provided within the sparse tensor compute cluster 230 and/or the number of parse tensor feature map memory units in the sparse tensor memory cluster 250. For example, for five sparse tensor compute units in the sparse tensor compute cluster 230, each input feature map of each channel may be divided into five sub-feature maps. By dividing each input feature map into "M" sub-feature maps corresponding to "M" number of sparse tensor compute units in the sparse tensor compute cluster 230, each of the "M" sub-feature maps may be processed independently in one of the "M" sparse tensor compute units to increase performance and reduce computation time.

In some embodiments, each of the "M" sub-feature maps may be a matrix have overlapping (k−1, as an example) rows and (k−1, as an example) columns with neighboring sub-feature maps, where (k×k) is the size of the weight matrix 220. By overlapping rows and columns of one sub-feature map with a neighboring sub-feature map, each sub-feature map may be processed independently in the sparse tensor compute cluster 230 and the output sub-feature maps of each of the sub-feature maps may be combined together without needing any intra-cluster communication between the "M" sub-feature maps to create an output feature map. In other embodiments, the "M" sub-feature maps may have no overlapping rows and/or columns. Without overlapping, the intermediate results from neighboring sub-feature maps may need to be combined. In some embodiments, with a kernel size of 1×1, overlapping rows and/or columns of the neighboring sub-feature maps may not be needed.

Each input feature map may be divided into "M" sub-feature maps based on sparsity, and specifically, to convert the dynamic nature of sparsity in the input feature map into close to static sparsity. Simply as an example and without intending to be limiting in any way, say the input feature map of a particular channel of the input image 205 is 512×512 in size (e.g., 512 rows and 512 columns), and the number of sparse tensor compute units in the sparse tensor compute cluster 230 is 16 (in other words, "M"=16). Thus, the 512×512 input feature map may be divided into 16 sub-feature maps, with each sub-feature map being assigned to one of the 16 sparse tensor compute units of the sparse tensor compute cluster 230. To create the 16 sub-feature maps, the 512×512 input feature map may be initially divided into 16 equal sized or roughly equal sized partitions, such that each partition has a number of rows and a number of columns.

For example, FIG. 3A shows an example table 300 after dividing the 512×512 input feature map into 16 sub-feature maps (e.g., generally represented by cell 1-cell 16). Thus, each of the 16 partitions of the 512×512 input feature map may be 32×32 (e.g., 32 rows and 32 columns) in size. Each cell of the table 300 corresponds to one 32×32 partition of the input feature map. The value in the parenthesis in each cell in FIG. 3A indicates the percentage of non-zeroes in that particular cell. Thus, for example, cell 1 of the table 300 corresponds to the first partition (e.g., rows 1 to 32 and columns 1 to 32 of the input feature map) and includes 40% non-zeroes (and therefore, 60% zeroes), cell 2 corresponds to the second partition (e.g., rows 1 to 32 and columns 33-64) and includes 60% non-zeroes (and therefore, 40% zeroes), and so on. Cell 5 corresponds to the fifth partition (rows 33 to 64 and columns 1 to 32 of the input feature map) and includes 51% non-zeroes, and so on. In the example of FIG. 3A, there is no overlap in the rows and columns of the 16 sub-feature maps. However, as discussed above, in some embodiments, at least some of the sub-feature maps may have overlapping rows and/or columns with neighboring sub-feature maps. In such cases, the number of the sub-feature maps may vary from 16 in the example of FIG. 3A.

The initial partitions of the table 300 may be reorganized such that each partition includes the same or substantially similar number or percentage of non-zeroes and/or zeroes. In some embodiments, a percentage difference of non-zeroes (or zeroes) may be pre-determined such that any two given partitions may not have a greater than the pre-determined percentage difference in the non-zeroes. As an example, if the pre-determined percentage difference in the percentage of non-zeroes between any two given partitions is 3%, the initial partitions of FIG. 3A may be reorganized such that each partition has roughly equal number of non-zeroes, with no two partitions having greater than a 3% difference in the number of non-zeroes. Thus, referring to FIG. 3B, another table 305 is shown that shows how the cells from the table 300 are reorganized. For example, cell 1 in the table 300 has 40% non-zeroes, while cell 2 in the table 300 has 60% non-zeroes. Thus, the percentage difference in the non-zeroes between cell 1 and cell 2 in table 300 is greater than the pre-determined percentage difference of 3%. Thus, cells 1 and 2 may be reorganized as shown in the table 305 by allocating columns from cell 2 to cell 1. For example, three columns from cell 2 may be allocated to cell 1 such that each of cell 1 and cell 2 has about 50% non-zeroes, thereby equalizing the number of non-zeroes in those cells.

After the reorganization, cell 1 may have 32 rows and 35 columns, and is therefore 32×35 in size, as shown in the table 305 instead of the 32×32 size in the table 300. Similarly, after the organization, cell 2 may have 32 rows and 29 columns, as shown in the table 305. Thus, cells 1 and 2 are of different sizes, as shown in the table 305. Although cell 1 is allocated 3 columns from only one neighboring cell, in some embodiments, cell 1 may be allocated rows/columns from multiple neighboring cells. For example, in some embodiments, cell 1 may be allocated 2 columns from cell 2 and 1 row from cell 5. The number of rows and/or the number of columns that are allocated from one or more cells to a particular cell may be dependent upon the number of non-zeroes (or zeroes) that are present in a particular row and/or column, and the number of non-zeroes (or zeroes) that are needed to be reallocated to satisfy the pre-determined percentage difference. Likewise, the other cells in the table 300 may be balanced out by allocating one or more rows and/or one or more columns from one or more neighboring cells until the pre-determined difference is satisfied, as shown in the table 305.

By reorganizing the initial partitions shown in the table 300, the number of non-zeroes in the various initial partitions may be balanced to balance out the processing in the sparse tensor compute cluster 230. Each cell in the table 305 corresponds to one sub-feature map or one input tensor, which may be assigned to one sparse tensor feature map memory unit of the sparse tensor memory cluster 250 and one sparse tensor compute unit of the sparse tensor compute cluster 230. Although FIGS. 3A and 3B have been explained as going from the initial partition of the table 300 to the final partition of the table 305 in a single step, in other embodiments, multiple iterations of reallocating rows/columns to/from neighboring cells may be needed to achieve the pre-determined percentage difference. Further, although FIGS. 3A and 3B have been explained with respect to the pre-determined percentage difference of non-zeroes, in other embodiments, different metrics may be used. For example, in some embodiments, instead of the percentage of non-zeroes, a percentage of zeroes may be used. Similarly, in some embodiments, instead of the percentage, a number of zeroes or non-zeroes may be used. In yet other embodiments, metrics other than "number" may be used. Each of the sub-feature maps of FIG. 3B may be stored within the DRAM 215.

Figure 4:
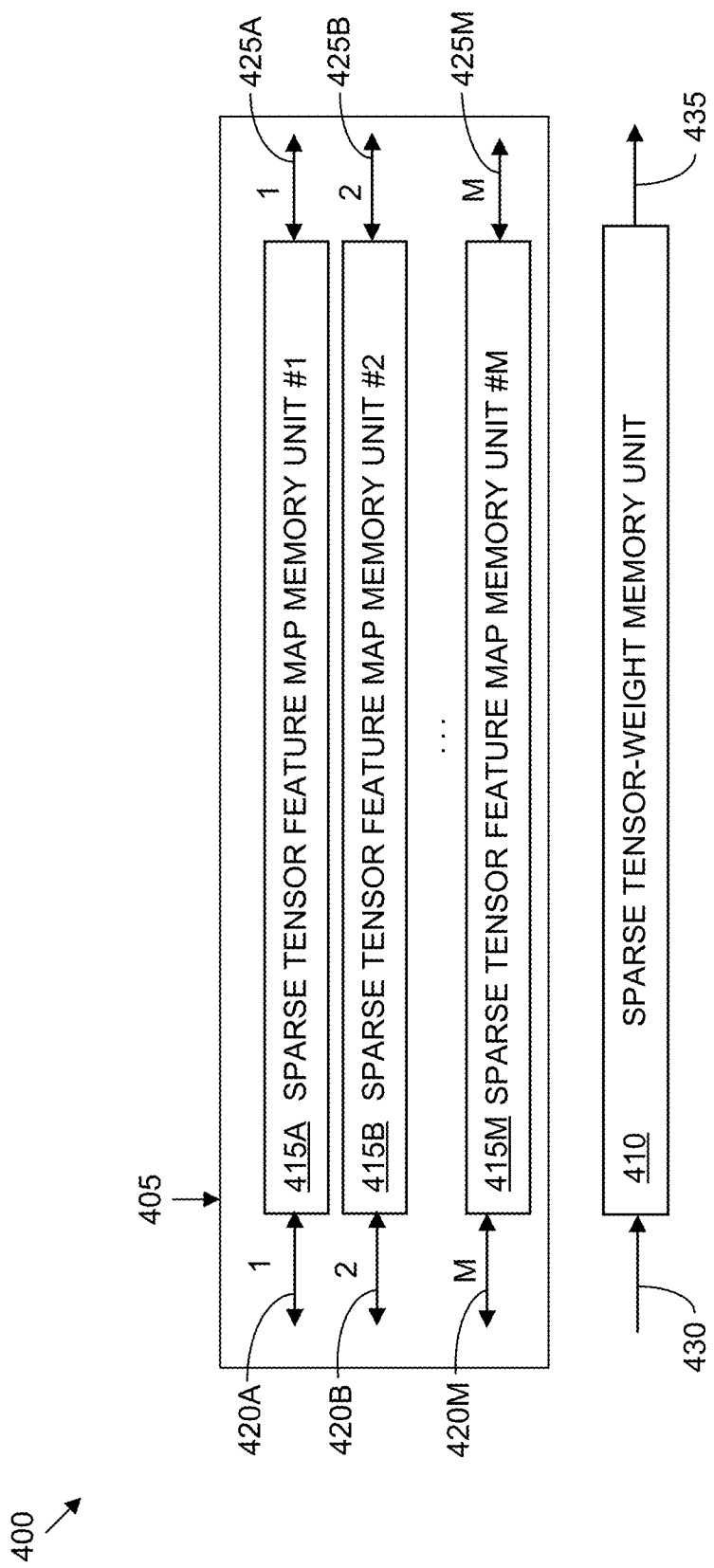
FIG. 4 is an example block diagram of a sparse tensor memory cluster of the accelerator of FIG. 2, in accordance with some embodiments of the present disclosure.

Referring to FIG. 4, an example of a sparse tensor memory cluster 400 is shown, in accordance with some embodiments of the present disclosure. The sparse tensor memory cluster 400 is analogous to the sparse tensor memory cluster 250 of FIG. 2. The sparse tensor memory cluster 400 includes a sparse tensor feature map memory 405 and a sparse tensor weight memory 410. The sparse tensor feature map memory 405 is configured to store the sub-feature maps received from the DRAM 215 and the direct memory access controller 245. The sparse tensor feature map memory 405 is also configured to store the various outputs received from the sparse tensor compute cluster 230. The sparse tensor feature map memory 405 includes a plurality of sparse tensor feature map memory units 415A-415M. The number of the plurality of sparse tensor feature map memory units 415A-415M may be dependent upon a designated number of sub-feature maps that may be desired to be processed in parallel. Each of the plurality of sparse tensor feature map memory units 415A-415M is independent from other sparse tensor feature map memory units and may be configured to store at least one sub-feature map independent from other sparse tensor feature map memory units.

Thus, in some embodiments, the plurality of sparse tensor feature map memory units 415A-415M are not configured to share the data stored therein with other ones of the plurality of sparse tensor feature map memory units. Further, each of the plurality of sparse tensor feature map memory units 415A-415M is configured to send the sub-feature map stored therein to a corresponding one of a sparse tensor compute unit of the sparse tensor compute cluster (e.g., the sparse tensor compute cluster 230). For example, in some embodiments, the sparse tensor feature map memory unit #i may be configured to send the input tensor stored therein to the sparse tensor compute unit #i, as discussed further below. Such one-to-one correspondence between a particular sparse tensor feature map memory unit and a sparse tensor compute unit is referred to herein as "static binding." Thus, in some embodiments, the number of the plurality of sparse tensor feature map memory units 415A-415M in the sparse tensor feature map memory 405 is same as the number of sparse tensor compute units in the sparse tensor compute cluster (e.g., the sparse tensor compute cluster 230).

Further, each of the plurality of sparse tensor feature map memory units 415A-415M may be connected via a bi-directional bus 420A-420M, respectively, to receive sub-feature maps from the DRAM 215 via the direct memory access controller 245, as well as to send outputs received from the sparse tensor compute cluster 230 back to the DRAM via the direct memory access controller. Similarly, each of the plurality of sparse tensor feature map memory units 415A-415M may be connected via a bi-directional bus 425A-425M, respectively, to an associated one of the sparse tensor compute unit of the sparse tensor compute cluster (e.g., the sparse tensor compute cluster 230) to send the sub-feature maps stored therein to the sparse tensor compute cluster and to receive outputs back from the sparse tensor compute cluster.

Thus, for example, the sparse tensor feature map memory unit 415A may receive a sub-feature map from the DRAM 215 via the direct memory access controller 245 and the bus 420A for storing, and send that sub-feature map to an associated one of the sparse tensor compute unit of the sparse tensor compute cluster (e.g., the sparse tensor compute cluster 230) for processing via the bus 425A. Similarly, the sparse tensor feature map memory unit 415A may receive the output (e.g., the result from processing the sub-feature map) from the sparse tensor compute cluster (e.g., the sparse tensor compute cluster 230) via the bus 425A for storing, and send that output to the DRAM 215 via the direct memory access controller 245 and the bus 420A. The sparse tensor feature map memory units 415B-415M may function similar to the sparse tensor feature map memory unit 415A.

In some embodiments, each of the plurality of sparse tensor feature map memory units 415A-415M may also be configured to store index values of the sub-feature map that is stored therein. In addition to receiving a sub-feature map, each of the plurality of sparse tensor feature map memory units 415A-415M may also receive the index values associated with the sub-feature map from the DRAM 215. For example, if the sparse tensor feature map memory units 415A receives sub-feature map A from the DRAM 215, that sparse tensor feature map memory unit may also receive the index values corresponding to the sub-feature map A. The sparse tensor feature map memory units 415A may then send the index values of the sub-feature map A to the sparse tensor compute cluster (e.g., the sparse tensor compute cluster 230) along with sending the sub-feature map A. The index values capture the row numbers and column numbers of a particular sub-feature map in the input feature map. For example, an index value (X, Y) refers to the row number X and column number Y of the sub-feature map in the input feature map.

The sparse tensor weight memory 410 may be configured to store the weights that are to be applied to the sub-feature maps stored within the sparse tensor feature map memory units 415A-415M. Thus, the sparse tensor weight memory 410 may be connected via a uni-directional bus 430 to the DRAM 215 and the direct memory access controller 245 to receive the weights and via a bus 435 to the sparse tensor compute cluster (e.g., the sparse tensor compute cluster 230) for sending the weights to the sparse tensor compute cluster. Since the sparse tensor weight memory 410 does not need to receive any results back from the sparse tensor compute cluster and does not need to send any results back to the DRAM 215, the bus 430 and the bus 435 may be uni-directional buses configured to send data in a single direction. In other embodiments, the bus 430 and/or the bus 435 may be bi-directional similar to the bi-directional bus 420A-420M/the bi-directional bus 425A-425M.

Figure 5:
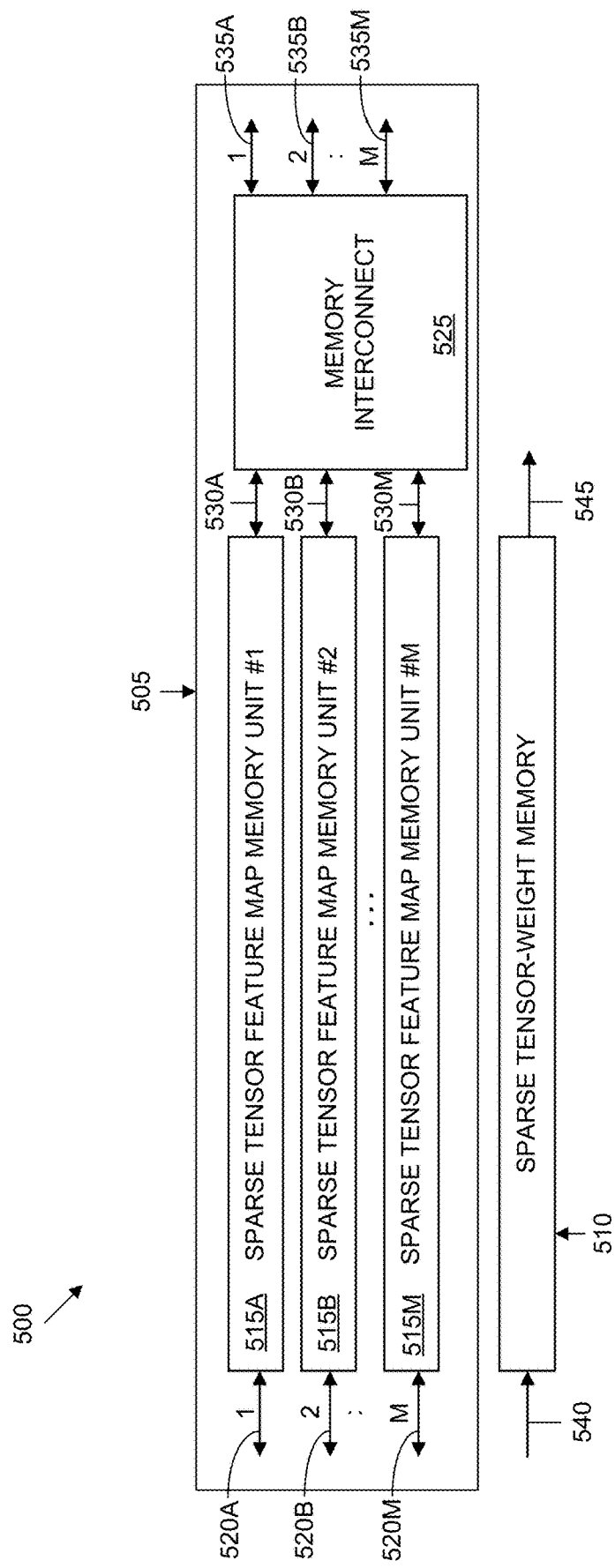
FIG. 5 is another example block diagram of the sparse tensor memory cluster of the accelerator of FIG. 2, in accordance with some embodiments of the present disclosure.

Turning to FIG. 5, an example of a sparse tensor memory cluster 500 is shown, in accordance with some embodiments of the present disclosure. The sparse tensor memory cluster 500 is analogous to the sparse tensor memory cluster 250 of FIG. 2. The sparse tensor memory cluster 500 is also substantially similar to the sparse tensor memory cluster 400. For example, similar to the sparse tensor memory cluster 400, the sparse tensor memory cluster 500 includes a sparse tensor feature map memory 505 and a sparse tensor weight memory 510. Also similar to the sparse tensor feature map memory 405, the sparse tensor feature map memory 505 includes a plurality of sparse tensor feature map memory units 515A-515M connected via a bi-directional bus 520A-520M to the DRAM 215 and the direct memory access controller 245. However, unlike the sparse tensor feature map memory 405 in which each of the plurality of sparse tensor feature map memory units 515A-515M is independent, does not share the data stored therein with other ones of the plurality of sparse tensor feature map memory units, and sends the data stored therein to the corresponding one of the sparse tensor compute unit, the plurality of sparse tensor feature map memory units 515A-515M of the sparse tensor feature map memory 505 are interconnected to one another and to other sparse tensor compute units via a memory interconnect 525.

Further, in some embodiments, the memory interconnect 525 may be configured to override the static binding discussed above. For example, in some embodiments, the memory interconnect 525 may enable a sparse tensor feature map memory unit #i to communicate with sparse tensor compute unit #1-M ("M" is the number of the sparse tensor compute units in the associated sparse tensor compute cluster) depending upon the configuration of the memory interconnect. In some embodiments, the memory interconnect 525 may be two-by-two switch that enables a sparse tensor feature map memory unit #i to communicate with the sparse tensor compute unit #i or sparse tensor compute unit #i+1. In other embodiments, the memory interconnect 525 may be a multi-stage interconnect such as a mesh network or Benes Network that allows a sparse tensor feature map memory unit #i to communicate with each of the sparse tensor compute units #1-M. In yet other embodiments, the memory interconnect 525 may be configured in other ways to allow a sparse tensor feature map memory unit #i to communicate with one or more sparse tensor compute units in addition to the sparse tensor compute unit #i. Similarly, in some embodiments, the memory interconnect 525 may enable a particular one of the plurality of sparse tensor feature map memory units 515A-515M to be interconnected with one or more of the other ones of the plurality of sparse tensor feature map memory units. For example, depending upon the configuration of the memory interconnect 525, a sparse tensor feature map memory unit #i may be interconnected with one or more of the sparse tensor feature map memory units #(i+1)-M.

Each of the plurality of sparse tensor feature map memory units 515A-515M may be connected to the memory interconnect 525 via a bi-directional bus 530A-530M. Thus, each of the plurality of sparse tensor feature map memory units 515A-515M may be configured to send the sub-feature map (and corresponding index values) stored therein to the memory interconnect 525 and receive a sub-feature map (e.g., that is stored in another sparse tensor feature map memory unit) or an output from the memory interconnect via their respective one of the bi-directional bus 530A-530M. Similarly, the memory interconnect 525 may be connected to the sparse tensor compute cluster (e.g., the sparse tensor compute cluster 230) via a bi-directional bus 535A-535M to send sub-feature maps (and the index values) to and receive outputs from the sparse tensor compute cluster. By using the memory interconnect 525, the flexibility in storing information within the plurality of sparse tensor feature map memory units 515A-515M may be increased and the static binding of the sparse tensor memory cluster 400 may be overridden.

The sparse tensor weight memory 510 is similarly configured as the sparse tensor weight memory 410. Thus, the sparse tensor weight memory 510 may be configured to store the weights that are to be applied to the sub-feature maps stored within the sparse tensor feature map memory units 515A-515M. Further, the sparse tensor weight memory 510 may be connected via a uni-directional bus 540 to the DRAM 215 and the direct memory access controller 245 to receive the weights and via a bus 545 to the sparse tensor compute cluster (e.g., the sparse tensor compute cluster 230) for sending the weights to the sparse tensor compute cluster. In other embodiments, the bus 540 and/or the bus 545 may be bi-directional.

Figure 6:
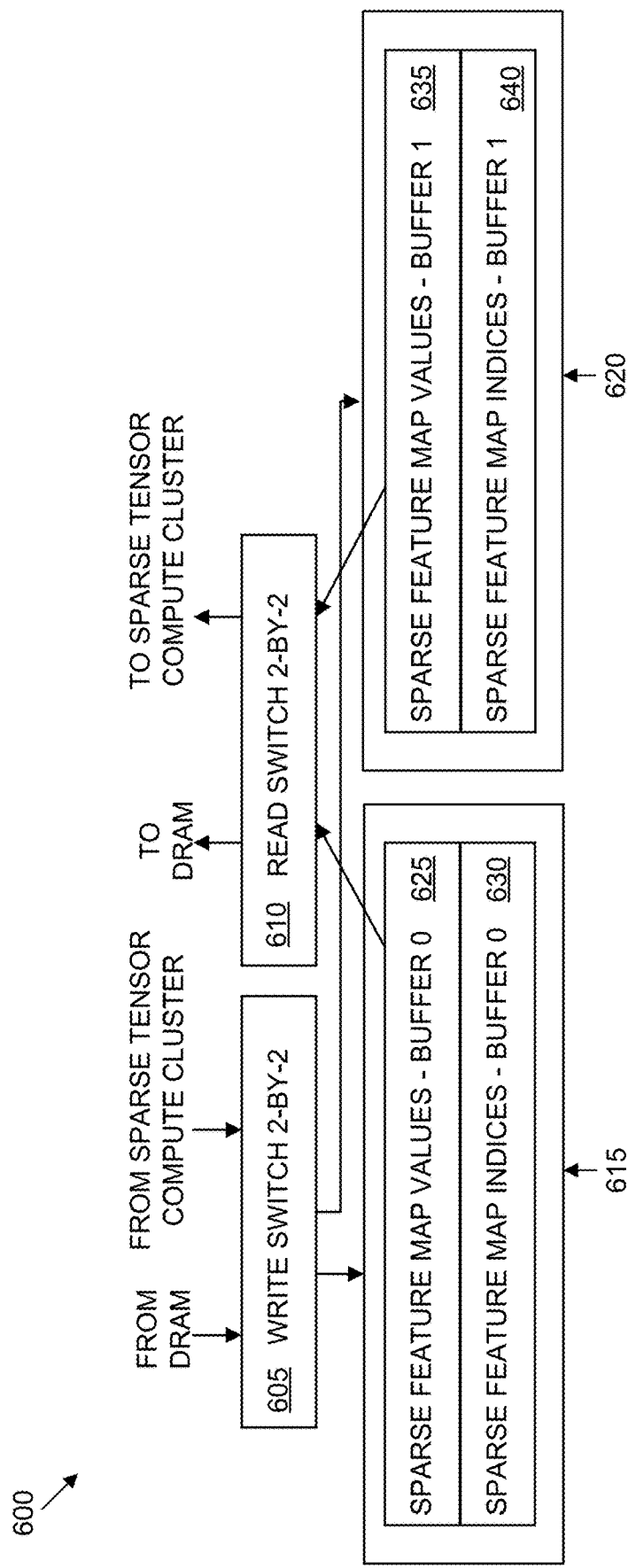
FIG. 6 is an example block diagram of a sparse tensor feature map memory unit of the sparse tensor memory clusters of FIGS. 4 and 5, in accordance with some embodiments of the present disclosure.

Referring to FIG. 6, an example sparse tensor feature map memory unit 600 is shown, in accordance with some embodiments of the present disclosure. The sparse tensor feature map memory unit 600 is analogous to each of the plurality of sparse tensor feature map memory units 415A-415M and the plurality of sparse tensor feature map memory units 515A-515M. The sparse tensor feature map memory unit 600 includes a write switch 605, a read switch 610, a first set of buffers 615, and a second set of buffers 620. The write switch 605 is configured to write the sub-feature maps received from the DRAM 215 (or from another sparse tensor feature map memory unit if interconnected) to the first set of buffers 615 and/or the second set of buffers 620. The write switch 605 is also configured to write the outputs (e.g., the output sub-feature maps) received from the sparse tensor compute cluster (e.g., the sparse tensor compute cluster 230) to the first set of buffers 615 and/or the second set of buffers 620. In some embodiments, the write switch 605 may be a 2×2 switch configured for double buffering control to receive data from two sources and write data to two sets of buffers (e.g., the first set of buffers 615 and the second set of buffers 620). In other embodiments, the write switch 605 may be configured in other ways.

The read switch 610 may be configured to read data stored within the first set of buffers 615 and the second set of buffers 620. For example, the read switch 610 may read data written by the write switch 605 in the first set of buffers 615 and/or the second set of buffers 620 to send the read data to the DRAM 215 (via the direct memory access controller 245). Similarly, the read switch 610 may read data written by the write switch 605 in the first set of buffers 615 and/or the second set of buffers 620 to send the read data to the sparse tensor compute cluster (and particularly the sparse tensor compute unit) of the sparse tensor compute cluster that is associated with the sparse tensor feature map memory unit 600. For example, the write switch 605 may receive a sub-feature map (and corresponding index values) from the DRAM 215 and store the sub-feature map (and the index values) within the first set of buffers 615 and/or the second set of buffers 620. The read switch 610 may then read that sub-feature map (and the index values) from the first set of buffers 615 and/or the second set of buffers 620 and send the read data to the sparse tensor compute cluster. Similarly, the write switch 605 may receive an output sub-feature map from the sparse tensor compute cluster and write that output sub-feature map within the first set of buffers 615 and/or the second set of buffers 620. The read switch 610 may read that output from the first set of buffers 615 and/or the second set of buffers 620 and transmit that output tensor to the DRAM 215.

In some embodiments, the read switch 610 may also be 2×2 switch configured for double buffering control to read data from two sets of buffers (e.g., the first set of buffers 615 and the second set of buffers 620). In other embodiments, the read switch 610 may be a 1×1 switch configured to read data from a single set of buffers or the read switch may be configured to read data from more than two sets of buffers.

Each of the first set of buffers 615 and the second set of buffers 620 may include two buffers in some embodiments. For example, in some embodiments, the first set of buffers 615 may include a first value buffer 625 and a first indices buffer 630. Similarly, in some embodiments, the second set of buffers 620 may include a second value buffer 635 and a second indices buffer 640. Although only two sets of buffers (e.g., the first set of buffers 615 and the second set of buffers 620) are shown in the sparse tensor feature map memory unit 600, in other embodiments, a single set of buffers or greater than two sets of buffers may be provided depending upon the configuration of the write switch 605 and/or the read switch 610. Similarly, although each of the first set of buffers 615 and the second set of buffers 620 is shown to have two buffers each, in other embodiments, either or both of the first set of buffers and the second set of buffers may include greater than two buffers or possibly a single buffer each.

The first value buffer 625 and the second value buffer 635 may be configured to store data values of the sub-feature map or the output sub-feature map, while the first indices buffer 630 and the second indices buffer 640 may be configured to store the index values of the sub-feature maps or the output sub-feature maps. For example, in some embodiments, the data values of sub-feature map A may be stored within the first value buffer 625 and the index values of that sub-feature map may be stored within the first indices buffer 630. In other embodiments, the data values of a particular sub-feature map (or the output sub-feature map) may be stored within one of the first set of buffers 615 or the second set of buffers 620 and the index values of that particular sub-feature map (or output sub-feature map) may be stored within the other one of the first set of buffers or the second set of buffers. Further, in some embodiments, the first set of buffers 615 may be designated to store the data values and the index values of the sub-feature maps, while the second set of buffers may be configured to store the data values and index values of the output sub-feature maps. In other embodiments, each of the first set of buffers 615 and the second set of buffers 620 may store both—the sub-feature maps and the output sub-feature maps (and their corresponding index values). Thus, each sub-feature map and each output sub-feature map may be associated with two buffers—a value buffer (e.g., the first value buffer 625, the second value buffer 635) to store the data values of the sub-feature map or the output sub-feature map and an indices buffer (e.g., the first indices buffer 630, the second indices buffer 640) to store the index values of that sub-feature map or the output sub-feature map.

Additionally, although the data values and the index values of a particular sub-feature map or the output sub-feature map are shown as being stored in separate buffers (e.g., the first value buffer 625, the second value buffer 635, the first indices buffer 630, the second indices buffer 640), in some embodiments, the data values and the index values of a particular sub-feature map or the output sub-feature map may be stored within a single buffer. In other words, in some embodiments, the first value buffer 625 and the first indices buffer 630 may be merged together to form a single buffer. Similarly, in some embodiments, the second value buffer 635 and the second indices buffer 640 may be merged together to form a single buffer.

Each buffer in the first set of buffers 615 and the second set of buffers 620 may be an SRAM memory configured as a single port read/write register file, a first-in-first-out data structure, a set of registers, or the like. By using SRAM memory for the buffers in the first set of buffers 615 and the second set of buffers 620, complex and more expensive cache structures may be avoided. In other embodiments, one or more buffers in the first set of buffers 615 and/or the second set of buffers 620 may be other types of memories. Further, each buffer in the first set of buffers 615 and the second set of buffers 620 may be configured with a particular size to be able to accommodate the data values and index values of at least one sub-feature map or at least one output sub-feature map.

Figure 7:
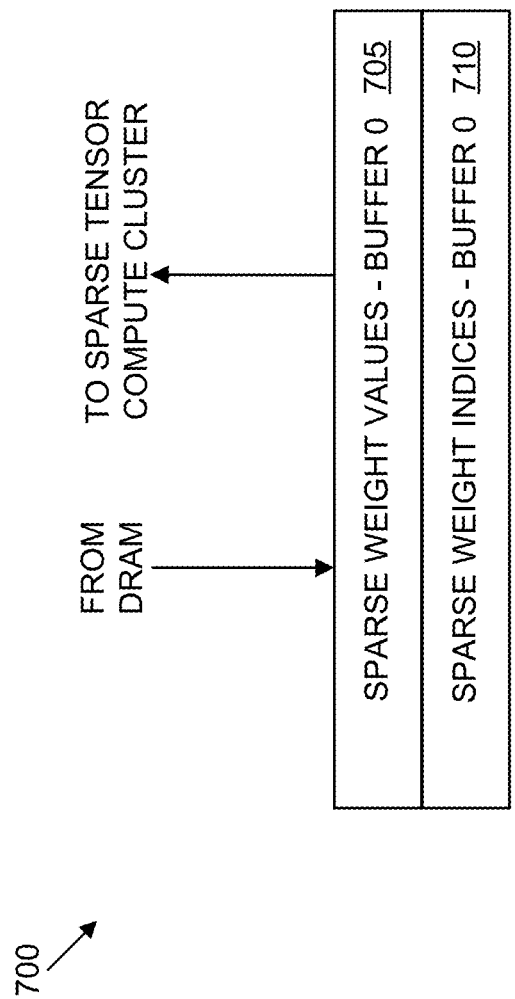
FIG. 7 is an example block diagram of a sparse tensor weight memory of the sparse tensor memory clusters of FIGS. 4 and 5, in accordance with some embodiments of the present disclosure.

Referring now to FIG. 7, an example sparse tensor weight memory 700 is shown, in accordance with some embodiments of the present disclosure. The sparse tensor weight memory 700 is analogous to the sparse tensor weight memory 410 and the sparse tensor weight memory 510. The sparse tensor weight memory 700 includes a first buffer 705 configured to store the weight values and a second buffer 710 to store the index values of the weight values from the weight matrix 220. Thus, the first buffer 705 is similar to the first value buffer 625 and the second value buffer 635, while the second buffer 710 is similar to the first indices buffer 630 and the second indices buffer 640. The first buffer 705 and the second buffer 710 may receive and store weight values/index values from the DRAM 215 and send those values to the sparse tensor compute cluster (e.g., the sparse tensor compute cluster 230). In some embodiments, greater than one buffer for storing the weight values and/or greater than one buffer for storing the index values of the weight matrix may be used.

Figure 8:
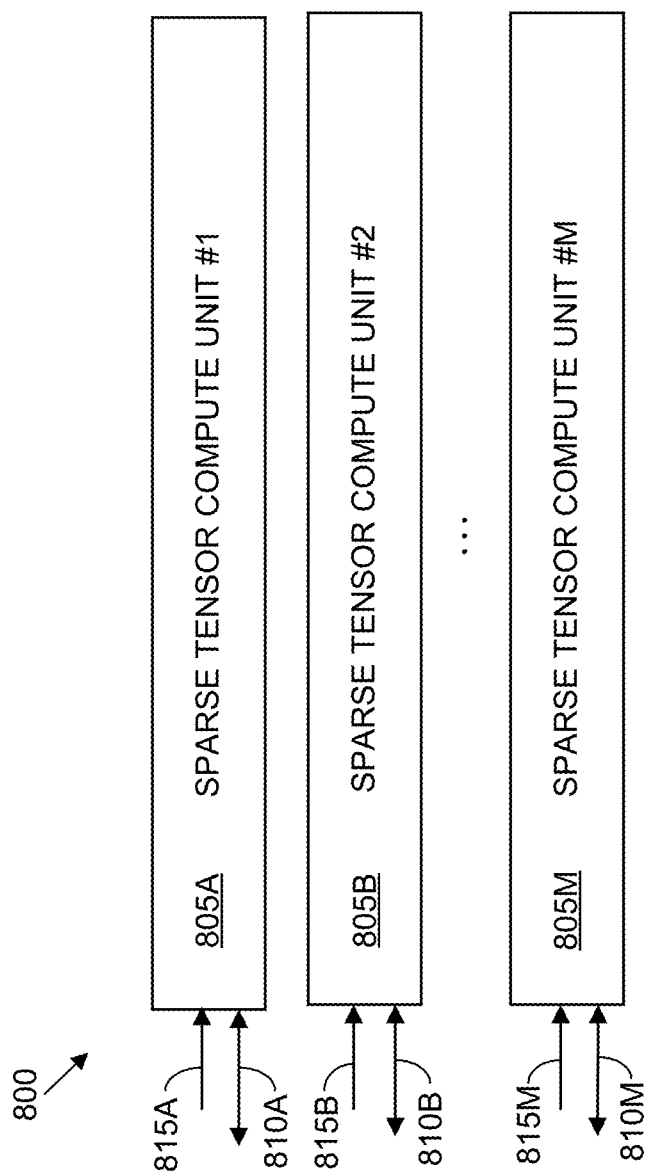
FIG. 8 is an example block diagram of a sparse tensor compute cluster of the accelerator of FIG. 2, in accordance with some embodiments of the present disclosure.

Turning to FIG. 8, an example sparse tensor compute cluster 800 is shown, in accordance with some embodiments of the present disclosure. The sparse tensor compute cluster 800 is analogous to the sparse tensor compute cluster 230. The sparse tensor compute cluster 800 includes a plurality of sparse tensor compute units 805A-805M. The number of the plurality of sparse tensor compute units 805A-805M may be dependent upon a designated number of sub-feature maps that may be desired to be processed in parallel. For example, to process five sub-feature maps in parallel, five sparse tensor compute units may be provided, with each sparse tensor compute unit being configured to process one sub-feature map at a time. In some embodiments, the number of the plurality of sparse tensor compute units 805A-805M is same as the number of the plurality of sparse tensor feature map memory units 415A-415M or 515A-515M, with a sparse tensor compute unit #i being associated with sparse tensor feature map memory unit #i. In other embodiments, different numbers of the plurality of sparse tensor compute units 805A-805M and the plurality of sparse tensor feature map memory units 415A-415M or 515A-515M may be used.

Further, in some embodiments, each of the plurality of sparse tensor compute units 805A-805M may be independent from other sparse tensor compute units, and process data independent from other ones of the plurality of sparse tensor compute units. Each of the plurality of sparse tensor compute units 805A-805M receives a sub-feature map (and corresponding index values) from the plurality of sparse tensor feature map memory units 415A-415M or 515A-515M via a bi-directional bus 810A-810M, respectively. The bi-directional bus 810A-810M may also be used to send the output sub-feature maps back to the plurality of sparse tensor feature map memory units 415A-415M or 515A-515M.

For example, if the sparse tensor memory cluster 400 having the static binding is used, in some embodiments, the sparse tensor compute unit #i may be configured to receive the sub-feature map (and corresponding index values) stored within the sparse tensor feature map memory unit #i via the bi-directional bus #i. In such embodiments, the sparse tensor compute unit #i may also be configured to send the output sub-feature map to the sparse tensor feature map memory unit #i via the bi-directional bus #i. Thus, a one-to-one correspondence between a particular sparse tensor compute unit and a sparse tensor feature map memory unit exists. For example, during static binding, the sparse tensor compute unit 805A may receive a sub-feature map (and corresponding index values) from the sparse tensor feature map memory unit 415A via the bi-directional bus 810A, and send the resulting output sub-feature map back to the sparse tensor feature map memory unit 415A via the bi-directional bus 810A.

In other embodiments, if the sparse tensor memory cluster 500 is used, a sparse tensor compute unit #i may still be associated with sparse tensor feature map memory unit #i. However, depending upon the configuration of the memory interconnect 525, a sparse tensor compute unit #i may receive a sub-feature map from a sparse tensor feature map memory unit #(i+1)-M via the bi-directional bus 810A-810M. Further, depending upon the configuration of the memory interconnect 525, a sparse tensor compute unit #i may be able to send the output sub-feature map to a sparse tensor feature map memory unit #(i+1)-M in addition to the sparse tensor feature map memory unit #i.

In addition to the sub-feature maps, each of the plurality of sparse tensor compute units 805A-805M receives weight values (and corresponding index values) via a uni-directional bus 815A-815M from the sparse tensor weight memory 410 or the sparse tensor weight memory 510. In some embodiments, the same weight may be transmitted to each, or at least a group, of the plurality of sparse tensor compute units 805A-805M via the uni-directional bus 815A-815M. In other embodiments, different weights may be transmitted to each, or at least a group, of the plurality of sparse tensor compute units 805A-805M via the uni-directional 815A-815M. Further, in some embodiments, a single weight may be transmitted to the plurality of sparse tensor compute units 805A-805M at a time, while in other embodiments, more than one weight may be simultaneously transmitted to one or more of the plurality of sparse tensor compute units at a time.

The output sub-feature maps obtained from processing a sub-feature map may be transmitted back to the corresponding one of the sparse tensor feature map memory unit. For example, in some embodiments, the sparse tensor compute unit 805A may receive a sub-feature map from the sparse tensor feature map memory unit 415A or 515A, process the sub-feature map to obtain an output sub-feature map, and send the output sub-feature map back to the sparse tensor feature map memory unit 415A or 515A. The sparse tensor feature map memory unit 415A or 515A may then send the output sub-feature map to the DRAM 215, to another sparse tensor feature map memory unit, and/or to another sparse tensor compute unit based upon the configuration.

Figure 9:
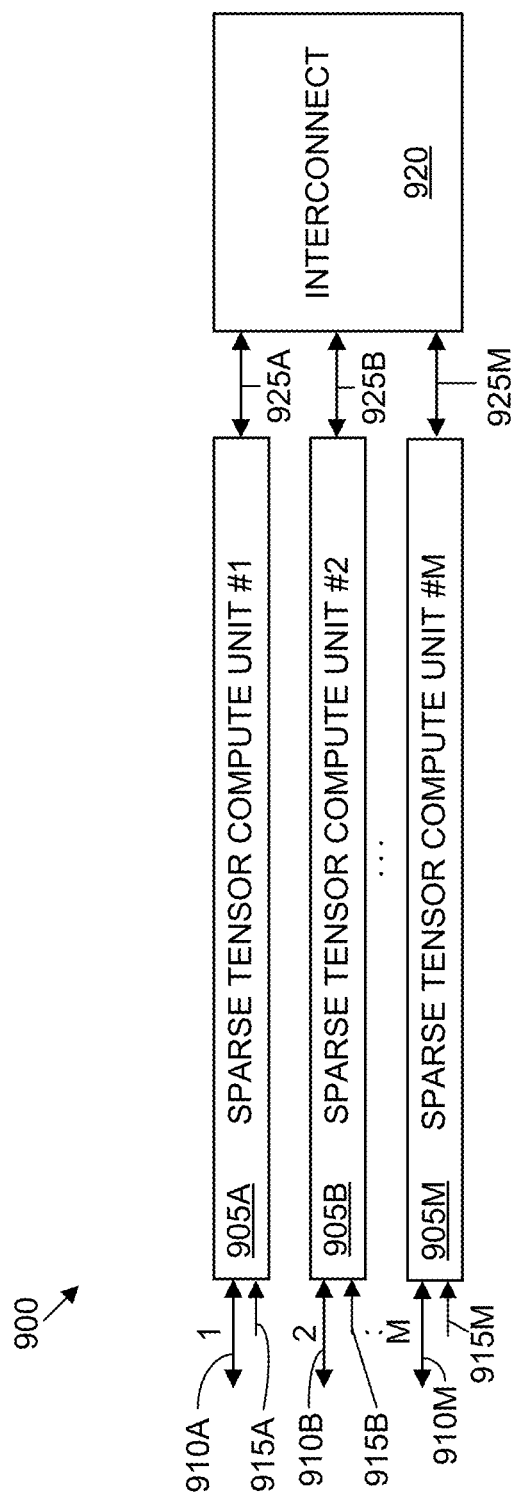
FIG. 9 is another example block diagram of the sparse tensor compute cluster of the accelerator of FIG. 2, in accordance with some embodiments of the present disclosure.

Turning to FIG. 9, an example sparse tensor compute cluster 900 is shown, in accordance with some embodiments of the present disclosure. The sparse tensor compute cluster 900 is analogous to the sparse tensor compute cluster 230. The sparse tensor compute cluster 900 is also substantially similar to the sparse tensor compute cluster 800. For example, similar to the sparse tensor compute cluster 800, the sparse tensor compute cluster 900 includes a plurality of sparse tensor compute units 905A-905M connected via a bi-directional bus 910A-910M to at least one of the sparse tensor feature map memory units 415A-415M or 515A-515M, as discussed above. Also similar to the sparse tensor compute cluster 800, each of the plurality of sparse tensor compute units 905A-905M is connected via a uni-directional bus 915A-915M to the sparse tensor weight memory 410 or 510 to receive the weights.

However, unlike the sparse tensor compute cluster 800 in which each of the plurality of sparse tensor compute units 805A-805M is independent and does not share the data being processed therein with other ones of the plurality of sparse tensor compute units, the plurality of sparse tensor compute units 905A-905M of the sparse tensor compute cluster 900 are interconnected via an interconnect 920. The interconnect 920 may be configured to override the static binding discussed above. Thus, in some embodiments, the interconnect 920 may enable a sparse tensor compute unit #i to communicate with other ones of the sparse tensor compute units #1-M depending upon the configuration of the interconnect. For example, in some embodiments, the interconnect 920 may be two-by-two switch that enables a sparse tensor compute unit #i to communicate with the sparse tensor compute unit #i+1. In other embodiments, the interconnect 920 may be a multi-stage interconnect such as a mesh network or Benes Network that allows a sparse tensor compute unit #i to communicate with each of the other sparse tensor compute units #1-M.

Each of the plurality of sparse tensor compute units 905A-905M may be connected to the interconnect 920 via a bi-directional bus 925A-925M. Thus, each of the plurality of sparse tensor compute units 905A-905M may be configured to send the output sub-feature map resulting from processing a particular sub-feature map directly to another one of the plurality of sparse tensor compute units via the interconnect 920 and the bi-directional bus 925A-925M instead of first sending those results to the sparse tensor memory cluster 400 or 500. By using the interconnect 525, the flexibility in assigning and processing sub-feature maps may be increased.

Figure 10:
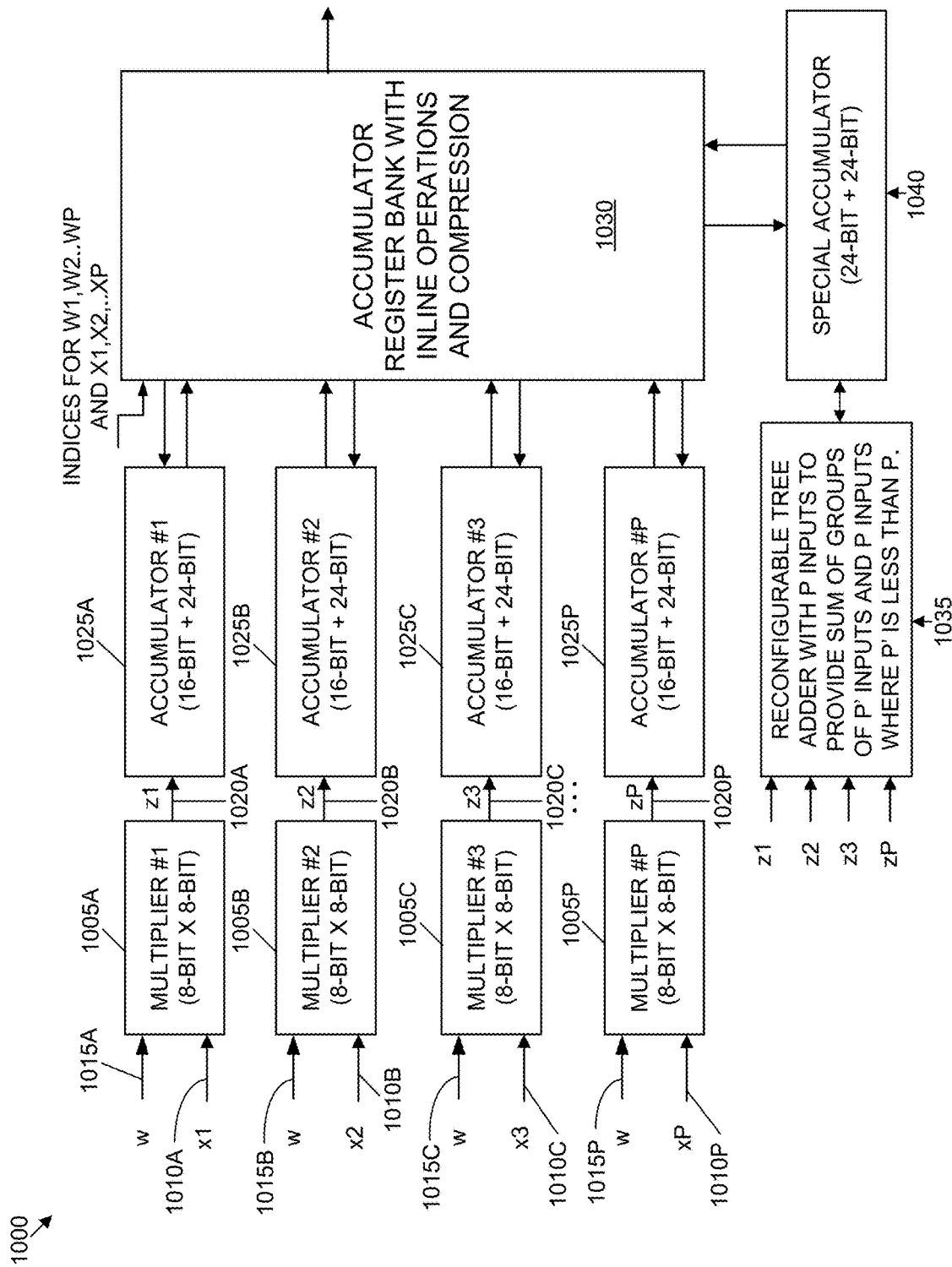
FIG. 10 is an example block diagram of a sparse tensor compute unit of the sparse tensor compute clusters of FIGS. 8 and 9, in accordance with some embodiments of the present disclosure.

Turning to FIG. 10, an example block diagram of a sparse tensor compute unit 1000 is shown, in accordance with some embodiments of the present disclosure. The sparse tensor compute unit 1000 is analogous to one of the plurality of sparse tensor compute units 805A-805M or 905A-905M. The sparse tensor compute unit 1000 is configured to perform various machine learning operations such as multiplication, addition, etc., that may need to be performed during a convolution operation in a CNN. Thus, the sparse tensor compute unit 1000 receives a sub-feature map (and corresponding index values) from the sparse tensor memory cluster 400 or 500, as discussed above, or an output sub-feature map from another sparse tensor compute unit. The sparse tensor compute unit 1000 also receives weight values from the sparse tensor weight memory 410 or 510.

The sparse tensor compute unit 1000 includes a plurality of multipliers 1005A-1005P, each of which is configured to multiply a data value of a sub-feature map with a weight value of the weight matrix 220. In some embodiments, the number of the plurality of multipliers 1005A-1005P may be dependent upon the number of cells in the sub-feature map. For example, for a 2×2 sub-feature map having a total of four cells across two rows and two columns, in some embodiments, the number of the plurality of multipliers 1005A-1005P may be four to enable the data value in each cell to be processed independently. In other embodiments, the number of the plurality of multipliers 1005A-1005P may be greater than or less than the number of cells in a sub-feature map.

For example, in some embodiments, the number of the plurality of multipliers 1005A-1005P may be dependent upon the number of cells having non-zero values in the sub-feature map. For example, in the 2×2 sub-feature map above having four cells, if only three cells have non-zero values, the number of the plurality of multipliers 1005A-1005P may be three to process the three non-zero values in parallel. Alternatively, the number of the plurality of multipliers 1005A-1005P may still be four, however, only three of the four multipliers may be engaged/used to process the three non-zero values. In other embodiments, the number of the plurality of multipliers 1005A-1005P may be two, and two of the three non-zero values may be processed in parallel in a first round and the third non-zero value may be processed in a second round in one of the two multipliers after the first round.

In some embodiments, all of the P multiplier units may be used in each clock cycle. For example, if the number of the plurality of multipliers 1005A-1005P is 4 and there are 3 non-zero values (d1,d2,d3) in a 2×2 cell on which weights w1 and w2 are to applied. At clock cycle 1, all 4 multipliers may be utilized as follows: d1*w1, d2*w1, d3*w1 and d1*w2. Generally speaking, if P is the total number of data values in the sub-feature map being processed by the sparse tensor compute cluster 1000 and Q is the number of non-zero values in the sub-feature map, in some embodiments (e.g., in CONV2 layers), Q multipliers may be engaged and max(1, ceiling(P−Q)/Q) unique weights may be transmitted to the Q multipliers to ensure full utilization of the plurality of multipliers 1005A-1005P. For example, in case of 1 unique weight value, the unique weight value may be transmitted to each of the Q multipliers. In the case of 2 unique weight values, the first weight value may be transmitted to the Q multipliers and the second weight value may be transmitted to the remaining number of multipliers. In the case of 1×1 CONV and FC layers, P weight values may be transmitted to P multipliers. Thus, in some embodiments, only non-zero data values of the sub-feature map are input into the plurality of multipliers 1005A-1005P. Since a product with a zero data value is zero, any zero values in the input sub-feature map need not be processed through the plurality of multipliers 1005A-1005P, thereby saving computing resources and time. Rather, in some embodiments, after the computation results of the non-zero values are filled in the output feature map, the remaining index values may be filled with zero values.

In some embodiments, the number of the plurality of multipliers 1005A-1005P may be dependent upon the size of the weight matrix 220 (also referred to herein as a kernel matrix or filter matrix). The weight matrix 220 may also include a plurality of cells, as discussed above. For example, the weight matrix 220 may have two rows and two columns forming four cells. Thus, the number of the plurality of multipliers 1005A-1005P that are provided or engaged may be four to process four data values in parallel. Thus, the number of the plurality of multipliers 1005A-1005P may be dependent upon a variety of factors.

In some embodiments, only non-zero weight values may be input into the plurality of multipliers 1005A-1005P. Thus, for example, if the weight matrix 220 has four cells and only three of those cells have non-zero values, only three weight values may be input into the plurality of multipliers 1005A-1005P. In some embodiments, the number of non-zero weight values may not impact the number of the plurality of multipliers 1005A-1005P, but rather, may impact the number of iterations that are needed to process a sub-feature map, as discussed below. Similar to the zero data values, the appropriate index values of where the result of multiplying with that zero-weight value would be located in the output sub-feature map may be computed. Those index values may then be populated with a value of zero.

Further, in some embodiments, each sparse tensor compute unit (e.g., the plurality of sparse tensor compute units 805A-805M, 905A-905M) in a sparse tensor computer cluster (e.g., the sparse tensor compute cluster 800, 900) may have the same number of multipliers (e.g., the plurality of multipliers 1005A-1005P), while in other embodiments, the number of multipliers in one or more sparse tensor compute units of a sparse tensor compute cluster may be different than other ones of the sparse tensor compute units in the sparse tensor compute cluster.

Additionally, each of the plurality of multipliers 1005A-1005P may be sized based upon the size of the data values and the weight values that are to be processed therein. In some embodiments, each of the plurality of multipliers 1005A-1005P may be an electronic circuit configured to multiply two binary numbers. Generally speaking, each of the plurality of multipliers 1005A-1005P may be implemented in any of a variety of ways using software, hardware, firmware, or combinations thereof.

Each of the plurality of multipliers 1005A-1005P, thus, receives a data value 1010A-1010P from a sub-feature map. For example, and referring to FIG. 11 in conjunction with FIG. 10, the sparse tensor compute unit 1000 is explained with respect to an example 5×5 input feature map 1100. It is to be understood that the input feature map 1100 is simply an example and is not intended to be limiting in any way. The present disclosure may be used to process input feature maps of any size and having any data values therein. The input feature map 1100 may be generated from the input image 205. The input feature map 1100 may include a plurality of cells, each cell being formed at the intersection of a row (that extends in an X-direction 1105) and a column (that extends in a Y-direction 1110). Each of the plurality of cells in the input feature map 1100 includes a data value that is to be processed in the sparse tensor compute unit 1000.

In some embodiments, the input feature map 1100 may be padded by zeroes on all sides to ensure that the output feature map is of the same size as the input feature map. For example, a row of zeroes may be added above the first row and below the last row of the input feature map 1100, and a column of zeroes may be added to the left hand side of the first column and to the right hand side of the last column of that input feature map for padding. By padding zeroes to the input feature map 1100, a padded feature map 1115 having a 7×7 size may be obtained. In some embodiments, the partitioning block 210 may perform the padding. In other embodiments, the padding may be added by another component of the accelerator 200. Without zero padding, the output feature map may be of a different size than the input feature map.

Further, in some embodiments, sub-feature maps may be created from the padded feature map 1115, and weight values from a kernel matrix 1120 may be applied to those sub-feature maps. It is to be understood that the kernel matrix 1120 is simply an example and is not intended to be limiting in any way. The kernel matrix 1120 may assume other sizes (e.g., the number of rows and number of columns may vary from that shown) and the values within the kernel matrix may also vary. The kernel matrix 1120 may be said to be of a kernel size, k. In a square kernel matrix (e.g., the kernel matrix 1120) having equal number of rows and columns, the kernel size, k, is equal to the number of rows or columns in the kernel matrix in some embodiments. In other embodiments, the kernel size, k, for a square or non-square kernel matrix may be considered an input parameter that may be determined/optimized using external training processes involving supervised examples and back-propagation of error gradients. Thus, for the kernel matrix 1120 having two rows and two columns, the description below is assuming that the kernel size, k, is two.

Figure 11:
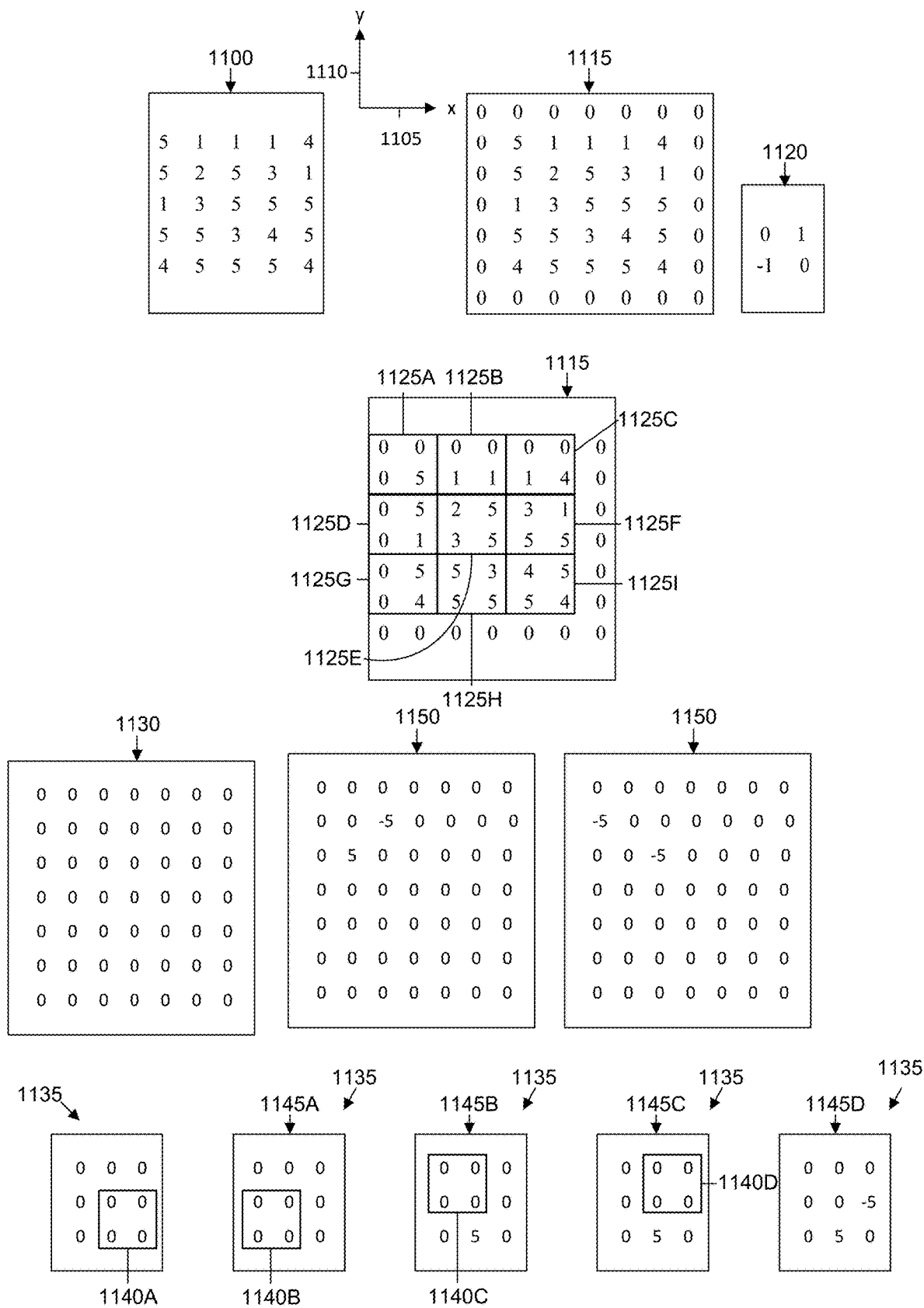
FIG. 11 is an example of processing a sub-feature map in the sparse tensor compute unit of FIG. 10, in accordance with some embodiments of the present disclosure.

In some embodiments, the padded feature map 1115 may be divided into sub-feature maps in the partitioning block 210 or other component of the accelerator 200, as discussed above in FIGS. 3A and 3B. For example and as shown in FIG. 11, the padded feature map 1115 may be divided, as discussed above, to create a plurality of sub-feature maps 1125A-1125I. Since the last row and the last column of the padded feature map 1115 includes all zero values, those values do not have an impact on the output values, and therefore, need not be processed. Each of the plurality of sub-feature maps 1125A-1125I may be processed in parallel in different sparse tensor compute units (e.g., the sparse tensor compute unit 1000). For example, in some embodiments, the sub-feature map 1125A may be processed in a first sparse tensor compute unit, the sub-feature map 1125B may be processed in a second sparse tensor compute unit, and so on.

Further, in FIG. 11, each of the plurality of sub-feature maps 1125A-1125I includes two rows and two columns. Although each of the plurality of sub-feature maps 1125A-1125I is of the same size as other sub-feature maps in FIG. 11, it is to be understood that the sub-feature maps may be of varying sizes, as discussed above. Further, although each of the plurality of sub-feature maps 1125A-1125I has the same number of rows and the columns as the kernel matrix 1120, in some embodiments, one or more of the plurality of sub-feature maps may have varying number of rows and/or columns than the kernel matrix. Depending upon the number of the plurality of multipliers 1005A-1005P in the sparse tensor compute unit 1000, multiple data values in each of the plurality of sub-feature maps 1125A-1125I may be processed in parallel. For example, if the sub-feature map 1125A is being processed in the sparse tensor compute unit 1000, and assuming that the plurality of multipliers 1005A-1005P includes four multipliers at least, the data values in each of the four cells of that sub-feature map may be processed in parallel.

Thus, to process the sub-feature map 1125A, the data values from that sub-feature map may be input into the plurality of multipliers 1005A-1005P. For example, the data value "0" having the index value (1,1) (e.g., row 1, column 1) of the sub-feature map 1125A may be loaded into the multiplier 1005A, the data value "0" having the index value (1,2) (e.g., row 1, column 2) may be loaded into the multiplier 1005B, the data value "1" having the index value (2,1) (e.g., row 2, column 1) may be loaded into the multiplier 1005C, and the data value "5" having the index value (2,2) (e.g., row 2, column 2) may be loaded into the multiplier 1005P. In some embodiments, the corresponding index values of the data values may also be input into the respective one of the plurality of multipliers 1005A-1005P. The data values that are zero in value are loaded into the plurality of multipliers 1005A-1005P herein simply for ease of illustration. In other embodiments, only non-zero data values may be loaded into the plurality of multipliers 1005A-1005P.

In addition to the data values, each of the plurality of multipliers 1005A-1005P receives a weight value 1015A-1015P from the sparse tensor weight memory 410 or 510. The weight value 1015A-1015P may be a value from a cell of the kernel matrix 1120. In some embodiments, the sparse tensor compute unit 1000 may be configured to process one unique weight at a time. In such cases, a single weight value may be broadcast to each of the plurality of multipliers 1005A-1005P at a time. For example, in a first iteration of processing the sub-feature map 1125A, a first weight value from the kernel matrix 1120 may be transmitted to each of the multipliers 1005A, 1005B, 1005C, and 1005P (collectively referred to below as the plurality of multipliers 1005A-1005P). Thus, the same weight value is broadcast to each of the plurality of multipliers 1005A-1005P.

Upon finishing processing of the sub-feature map 1125A with the first weight value, a second weight value from the kernel matrix 1120 may be transmitted to each of the plurality of multipliers 1005A-1005P in a second iteration. Upon finishing processing of the sub-feature map 1125A with the second weight value, a third weight value from the kernel matrix 1120 may be transmitted to each of the plurality of multipliers 1005A-1005P in a third iteration, and upon finishing processing of the sub-feature map with the third weight value, a fourth weight value from the kernel matrix may be transmitted to each of the plurality of multipliers in a fourth iteration. Thus, the processing of the sub-feature map 1125A may require four iterations. During each iteration, the input weight value is multiplied with each of the data values in the sub-feature map 1125A. Further, each iteration may include one or more rounds depending upon the number of the plurality of multipliers 1005A-1005P. Specifically, if the number of the plurality of multipliers 1005A-1005P includes enough number of multipliers to process all the data values of a sub-feature map in parallel, then each iteration may include a single round. On the other hand, if the number of the plurality of multipliers 1005A-1005P is less than the number of data values in the sub-feature map, then each iteration may include multiple rounds. Upon completing the four iterations with the sub-feature map 1125A, the output of the sparse tensor compute unit 1000 may be the output sub-feature map corresponding to the sub-feature map 1125A.

Further, in some embodiments, the order in which the weight values from the kernel matrix 1120 are transmitted to the plurality of multipliers 1005A-1005P may be pre-determined. For example, in some embodiments, the weight value from the kernel matrix 1120 having index value (1,1) may be loaded into each of the plurality of multipliers 1005A-1005P in the first iteration. As indicated above, the index value captures the row number and column number of a particular cell in the kernel matrix 1120. Thus, the index value (1,1) corresponds to row 1 column 1 of the kernel matrix 1120. The weight value corresponding to the index value (1,1) in the kernel matrix 1120 is "0." Thus, the weight value of "0" is loaded into each of the plurality of multipliers 1005A-1005P in the first iteration. Similar to the data values, zero weight values are described as being input into the plurality of multipliers 1005A-1005P simply for ease of illustration. In other embodiments, only non-zero weight values may be input into the plurality of multipliers 1005A-1005P. In the second iteration, the weight value in the index value (1,2) (e.g., the weight value "1") is broadcast to each of the plurality of multipliers 1005A-1005P. In the third iteration, the weight value corresponding to the index value (2,2) (e.g., having the weight value "0") is loaded into each of the plurality of multipliers 1005A-1005P, while in the fourth iteration, the weight value of "−1" corresponding to the index value (1,1) is broadcast to each of the plurality of multipliers. In other embodiments, the weight values may be input into the plurality of multipliers 1005A-1005P in a different order in the various iterations.

Thus, in the first iteration of processing the sub-feature map 1125A, each of the plurality of multipliers 1005A-1005P receives one data value from the sub-feature map and the weight value of "0" corresponding to the index value (1,1) in the kernel matrix 1120. Each of the plurality of multipliers 1005A-1005P computes a product (e.g., z=w*x) between its respective data value (e.g., the data values 1010A-1010P) and the weight value (e.g., the weight values 1015A-1015P) to obtain a product. For example, the multiplier 1005A may multiply the data value 1010A with the weight value 1015A to obtain a product value 1020A. Similarly, the multiplier 1005B may multiply the data value 1010B with the weight value 1015B to obtain a product value 1020B, the multiplier 1005C may multiply the data value 1010C with the weight value 1015C to obtain a product value 1020C, and the multiplier 1005P may multiply the data value 1010P with the weight value 1015P to obtain a product value 1020P. The product values 1020A-1020P may be represented as a product matrix such that each of the product values 1020A-1020P has the same index value as the data value that was input into the respective one of the plurality of multipliers 1005A-1005P. For example, since the data value having the index value of (1,1) was input into the multiplier 1005A, the product value 1020A also has the index value of (1,1) in the product matrix. Thus, the product matrix based on the product values 1020A-1020P may look like:

0 0
0 0

Each of the product values 1020A-1202P is input into a corresponding accumulator 1025A-1025P, respectively. Each of the accumulators 1025A-1025P may include a register (or other type of memory) configured to receive and temporarily store the respective one of the product values 1020A-1020P. In some embodiments, each of the accumulators 1025A-1025P may also include a computing element (e.g., an addition element) to perform the computations discussed below. Although P separate ones of the accumulators 1025A-1025P are shown in FIG. 10, in some embodiments, one or more of the P accumulators may be combined together to form a larger accumulator that receives the product values 1020A-1020P. Additionally, in some embodiments, the size of each of the accumulators 1025A-1025P may be computed using the formula: $(2k-1)\times(2k-1)$, where k is the kernel size of the kernel matrix 1120. Since in the current example, the kernel size, k, of the kernel matrix 1120 is 2, each of the accumulators 1025A-1025P may be sized to at least store a 3×3 matrix.

Further, upon transmitting the product values 1020A-1020P to the accumulators 1025A-1025P, the second iteration of processing the sub-feature map 1125A may start in the plurality of multipliers 1005A-1005P. Thus, in the second iteration, the weight value corresponding to the index value (1,2) of the kernel matrix 1120 may be transmitted to each of the plurality of multipliers 1005A-1005P. Since the data values of the sub-feature map 1125A are already in the plurality of multipliers 1005A-1005P from the first iteration, those data values need not be input again.

Further, upon receiving the product values 1020A-1020P, each of the accumulators 1025A-1025P may process those values based upon values received from a register bank 1030. The register bank 1030 is configured to store the output sub-feature map resulting from convolving the sub-feature map 1125A with the kernel matrix 1120. The register bank 1030 may be a group of registers, flip flops, or other memory units. While the register bank 1030 is explained here in terms of registers, in other embodiments, flip flops or other types of memory units may be used in the register bank. In some embodiments, the register bank 1030 may be part of one or more of the accumulators 1125A-1125P. Further, in some embodiments, the register bank 1030 may include a plurality of row registers and a plurality of column registers that are connected together to form one or more shift registers. In some embodiments, the plurality of row registers may be connected together to form a shift register to enable the values stored therein to be shifted right or left by at least one position. Similarly, in some embodiments, the plurality of column registers may be connected together to form a shift register to enable the values stored therein to be shifted up or down by at least one position.

Further, the size of the register bank 1030 may be based upon the size of the padded feature map 1115 (or the size of the output feature map). Thus, for a 7×7 size of the padded feature map 1115, the register bank 1030 may be initialized with a size of 7×7. In other words, the register bank 1030 may include 49 registers such that 7 registers in each row are connected together to form a shift register and 7 registers in each column are connected together to form a shift register. Further, in some embodiments, at the start of the first iteration, the register bank 1030 may be initialized with all zero values, as shown in register bank 1130 in FIG. 11. Additionally, in some embodiments, at the start of the first iteration, a portion of the register bank 1130 may be loaded into each of the accumulators 1025A-1025P.

For example, each of the accumulators 1025A-1025P may include a register 1135 having a size of $(2k-1)\times(2k-1)$ or 3×3, as discussed above. When the register bank 1130 is initialized with all 0 values at the beginning of the first iteration, the register 1135 of each of the accumulators 1025A-1025P may be loaded with values from a 3×3 portion of the register bank 1130. The 3×3 portion from the register bank 1130 that is copied into the register 1135 may be determined based on the following formula:

Register=register bank($i$:$i$+acc_length−1,$j$:$j$+acc_length−1)

In the formula above, the first term corresponds to the row numbers of the register bank 1130 and the second term corresponds to the column numbers of the register bank. Further, in the formula above, "i" is the start of the row number and "j" is the start of the column number of the sub-feature map 1125A in the padded feature map 1115, and acc_length is the size of the register 1135. In other words, (i, j) is the index value of the sub-feature map 1125A. For example, the size of the register 1135 in the example above is 3 since the register is 3×3. The size of the register 1135 is computed similar to the kernel size of the kernel matrix 1120. Thus, for the sub-feature map 1125A, "i" in the formula above is 1, "j" is 1, and acc_length is 3. Thus, the register 1135 of each of the accumulators 1025A-1025P may be initialized with rows (1:3, 1:3) of the register bank 1130. Since the values in rows 1:3 and columns 1:3 of the register bank 1130 are all zeroes at the time of initialization, the values in the register 1135 are initialized with all zeroes. In addition to the product values 1020A-1020P, the register bank 1030 also receives the index values corresponding to each data value in the sub-feature map 1125A and the index values corresponding to each weight value in the kernel matrix 1120 to compute the portion of the register bank 1030 that is to be loaded into each of the accumulators 1025A-1025P.

Thus, at the start of the first iteration, the register bank 1030 is initialized with the 0 values shown in the register bank 1130 and the register 1135 of each of the accumulators 1025A-1025P is initialized with a 3×3 portion from the register bank 1130. Each of the accumulators 1025A-1025P reads a portion of its respective register 1135 in each iteration and adds the current product values (e.g., the product values 1020A-1020P) to the product values computed in previous iterations. For example, for the first iteration in which the weight value corresponding to the index value (1,1) is transmitted to the plurality of multipliers 1005A-1005P, the accumulators 1025A-1025P read a portion 1140A of their respective instance of the register 1135, as shown in FIG. 11. The order in which portions of the register 1135 are read may be determined by the definition of the convolution operation. Thus, in some embodiments, the portion 1140A is read first. In other embodiments, depending upon the definition of the convolution operation, another portion of the register 1135 may be read first. The accumulators 1025A-1025P add the product values 1020A-1020P in the product matrix above with the values in the portion 1140A. Specifically, the accumulators 1025A-1025P may perform the following matrix addition:

$$\begin{bmatrix} 0 & 0 \\ 0 & 0 \end{bmatrix} + \begin{bmatrix} 0 & 0 \\ 0 & 0 \end{bmatrix} = \begin{bmatrix} 0 & 0 \\ 0 & 0 \end{bmatrix}$$

In the equation above, the first matrix is the product matrix derived from the product values 1020A-1020P and the second matrix corresponds to the values in the portion 1140A. The result of the matrix addition may be stored back into the portion 1140A of the register 1135 of each of the accumulators 1025A-1025P. Thus, after the first iteration, the register 1135 of each of the accumulators 1025A-1025P has the values shown in register 1145A of FIG. 11.

In the second iteration, the sub-feature map 1125A continues to be loaded into the plurality of multipliers 1005A-1005P, as discussed above, and the weight value of "1" corresponding to the index (1, 2) in the kernel matrix 1120 is transmitted to each of those multipliers. The product values 1020A-1020P may be represented by combining the product values 1020A-1020P in a product matrix, z in the second iteration as:

$$\begin{bmatrix} 0 & 0 \\ 0 & 5 \end{bmatrix}$$

The above product values 1020A-1020P may be transmitted to the accumulators 1025A-1025P. The accumulators 1025A-1025P may read a portion 1140B from the register 1145A, which is obtained by shifting from the location of the portion 1140A left column-wise by one position. The accumulators 1025A-1025P may perform matrix addition on the values in the product matrix of the second iteration with the values in the portion 1140B as follows:

$$\begin{bmatrix} 0 & 0 \\ 0 & 5 \end{bmatrix} + \begin{bmatrix} 0 & 0 \\ 0 & 0 \end{bmatrix} = \begin{bmatrix} 0 & 0 \\ 0 & 5 \end{bmatrix}$$

The result of the matrix addition above may be stored back in the portion 1140B. Thus, after the second iteration, the register 1135 has values shown in register 1145B:

In the third iteration, the sub-feature map 1125A continues to be loaded into the plurality of multipliers 1005A-1005P, as discussed above, and the weight value of "1" corresponding to the index (2, 2) in the kernel matrix 1120 is transmitted to each of those multipliers. The product values 1020A-1020P may be represented by a product matrix, z in the second iteration as:

$$\begin{bmatrix} 0 & 0 \\ 0 & 0 \end{bmatrix}$$

The above product values 1020A-1020P may be transmitted to the accumulators 1025A-1025P. The accumulators 1025A-1025P may read a portion 1140C of the register 1145B, which is obtained by shifting the location of the portion 1140B of the register 1145A up row-wise by one position. The accumulators 1025A-1025P may perform matrix addition on the values in the product matrix of the third iteration with the values in the portion 1140C as follows:

$$\begin{bmatrix} 0 & 0 \\ 0 & 0 \end{bmatrix} + \begin{bmatrix} 0 & 0 \\ 0 & 0 \end{bmatrix} = \begin{bmatrix} 0 & 0 \\ 0 & 0 \end{bmatrix}$$

The result of the matrix addition above may be stored in the portion 1140C. Thus, after the third iteration, the register 1135 has the values shown in register 1145C.

In the fourth iteration, the sub-feature map 1125A continues to be loaded into the plurality of multipliers 1005A-1005P, as discussed above, and the weight value of "−1" corresponding to the index (2, 1) in the kernel matrix 1120 is transmitted to each of those multipliers. The product values 1020A-1020P may be represented by a product matrix, z in the second iteration as:

$$\begin{bmatrix} 0 & 0 \\ 0 & -5 \end{bmatrix}$$

The above product values 1020A-1020P may be transmitted to the accumulators 1025A-1025P. The accumulators 1025A-1025P may read a portion 1140D of the register 1145C, which is obtained by shifting the location of the portion 1140C to the right column-wise by one position. The accumulators 1025A-1025P may perform matrix addition on the values in the product matrix of the fourth iteration with the values in the portion 1140D as follows:

$$\begin{bmatrix} 0 & 0 \\ 0 & -5 \end{bmatrix} + \begin{bmatrix} 0 & 0 \\ 0 & 0 \end{bmatrix} = \begin{bmatrix} 0 & 0 \\ 0 & -5 \end{bmatrix}$$

The result of the matrix addition above may be stored in the portion 1140D. Thus, after the fourth iteration, the register 1135 has the values shown in register 1145D.

Since in the example of FIG. 11, there are only four iterations, upon completing the four iterations for the sub-feature map 1125A, the accumulators 1025A-1025P load the values stored in the register 1135 (e.g., the values in the register 1145D) back into the register bank 1130. Further, the values of the register 1145D may be loaded back into the register 1130 in the same location from where those values were initially initialized. Thus for example, the following formula may be used to determine where the values from the register 1145A are to uploaded to the register 1130:

Register bank=register($i$:$i$+acc_length−1,$j$:$j$+acc_length−1)

Thus, for the sub-feature map 1125A, the values in the register 1145D may be loaded into rows (1:3, 1:3) of the register bank 1130. Thus, after loading the values in the register 1145D to the register bank 1130, the register bank 1030 may have values similar to register bank 1150. Further, the loaded values in the register bank 1150 may be circular shifted right by one column. For example, the shifting operation may be performed in accordance with the following formula:

Register bank=circshift(register bank,kernel size−1,2)

The directionality of shifting may be dependent upon the convolution definition. Thus, in other embodiments, the register bank 1150 may be shifted in other ways. Thus, the values in the register 1150 may be shifted to obtain values shown in register 1155. The values in the register 1150 may be subject to one or more in-line operations in the register bank 1030. For example, the register bank 1030 may perform a non-linear Rectified Linear Unit (ReLU) operation and a pooling operation. Thus, in some embodiments, the register bank 1030 may include a ReLU processing unit and pooling operation processing unit to perform the ReLU and pooling operations, respectively. In other embodiments, a separate component may be associated with the sparse tensor compute unit 1000 to perform the ReLU and pooling operations.

In some embodiments, a ReLU operation may implement the following activation function: $f(x)=\max(0,x)$. In other embodiments, the ReLU operation may implement other activation functions. The ReLU operation may generate one output for each input. Thus, for A inputs, the ReLU operation may generate A outputs. A pooling operation may then reduce the A results to B results. For example, a pooling operation having a kernel size of 2×2 may reduce A inputs into A/4 inputs. Thus, depending upon the kernel size of the pooling operation, the register bank 1030 may reduce A inputs into B inputs. The register bank 1130 may also be associated with B pooling units, with each pooling unit configured to perform a down sampling operation on one of the A results of the ReLU operation. The pooling operation may perform a max pooling operation in which a maximum value from a group of cell values is determined, an average pooling operation in which an average of a group of cell values is determined, or a sum pooling operation in which a sum of a group of cell values is determined. In other embodiments, other pooling operations may be performed. The results of the pooling operation may represent the output sub-feature map, which may be sent back to the associated sparse tensor memory cluster 400, 500 or to another sparse tensor compute unit. In some embodiments, the output sub-feature map may be compressed before being sent to the sparse tensor memory cluster 400, 500.

In some embodiments, before compressing the output sub-feature map, the output sub-feature map may be combined with other output sub-feature maps generated from the other sparse tensor compute units. To combine the various output sub-feature maps, in some embodiments, the output sub-feature maps may be "stitched" together to obtain the output feature map. For example, in some embodiments, if the input feature map is divided into four sub-feature maps [A, B, C, D], which generate four respective output sub-feature maps A', B', C', and D', the output feature maps may be given as [A', B', C', D'].

Further, each of the product values 1020A-1020P is also input into an adder 1035 and stored in a special accumulator 1040. The adder 1035 may be used to compute sums of groups of the product values 1020A-1020P. For example, the adder 1035 may be used to compute sums of groups of P' inputs and P inputs where P' is less than P. The special accumulator 1040 may handle the accumulations that may be needed for fully connected layers and 1×1 convolutions, by taking outputs of the adder 1035 and previously accumulated results from the register bank 1030.

Figure 12:
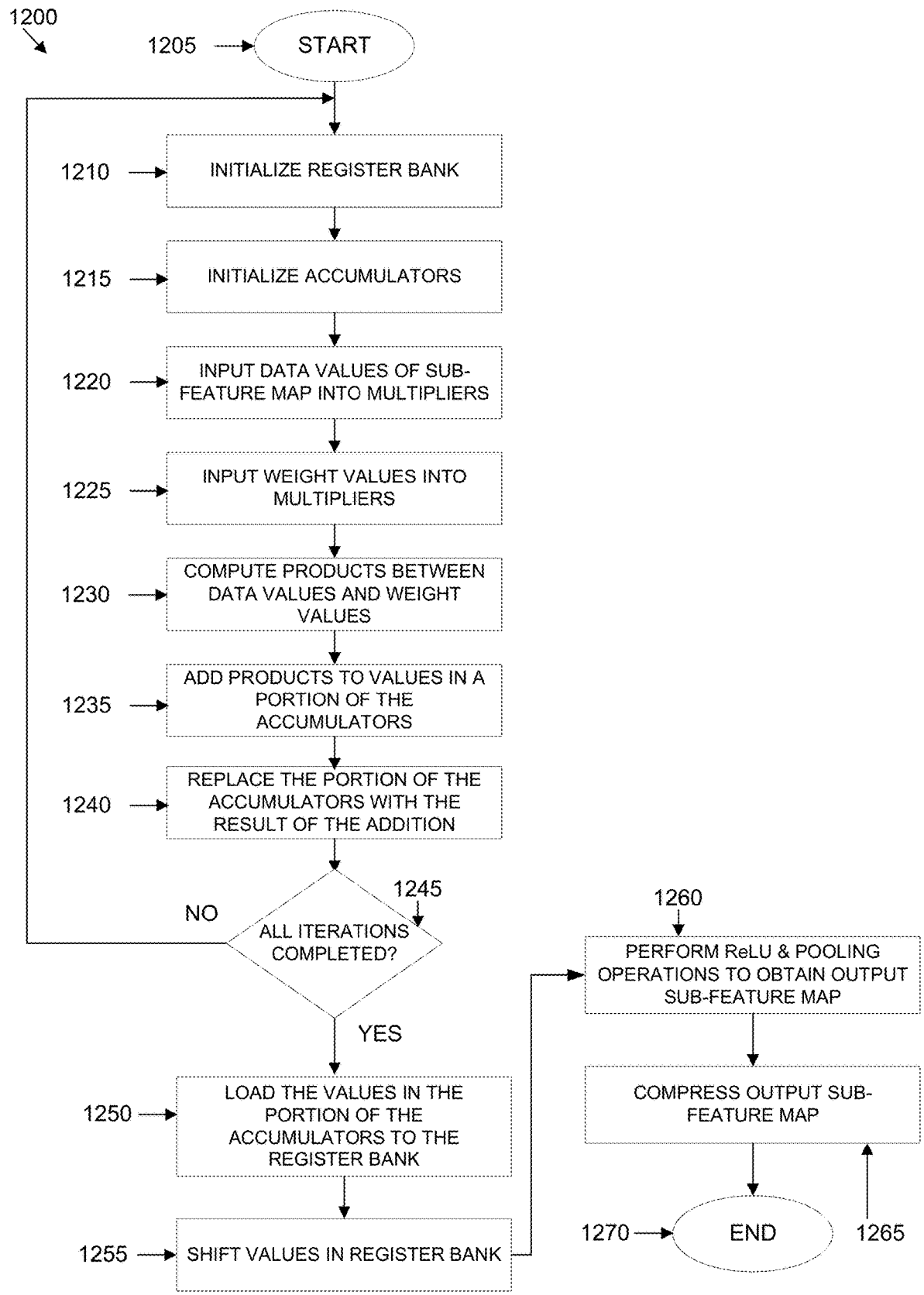
FIG. 12 is an example flowchart outlining operations for processing the sub-feature map in the sparse tensor compute unit of FIG. 10, in accordance with some embodiments of the present disclosure.

Turning now to FIG. 12, an example flowchart outlining operations of a process 1200 is shown, in accordance with some embodiments of the present disclosure. The process 1200 may be implemented in the sparse tensor compute unit 1000. In some embodiments, a controller may be associated with the sparse tensor compute unit 1000 to perform the process 1200. The controller may be associated with a memory for storing computer-readable instructions, which may be performed by a processor associated with the controller. In other embodiments, the scheduling engine 225 may be configured to perform the process 1200. The process 1200 may include other or additional operations depending upon the particular embodiment.

Upon starting at operation 1205, the register bank 1030 is initialized at operation 1210. As indicated above, at the start of the first iteration, the register bank 1030 may be initialized with all zero values. Further, upon initializing the register bank 1030, each of the accumulators 1025A-1025P may be initialized at operation 1215 such that a portion of the register bank is loaded into each of those accumulators. The portion of the register bank 1030 that is loaded into the each of the accumulators is based upon the index values of the sub-feature map in the input feature map being processed. At operation 1220, data values from the sub-feature map (e.g., the sub-feature map 1125A) are input into the plurality of multipliers 1005A-1005P as discussed above. In some embodiments, the operations 1210/1215 and 1220 may be occur in parallel. At operation 1225, one weight value from the kernel matrix 1220 is transmitted to each of the plurality of multipliers 1005A-1005P.

Each of the plurality of multipliers 1005A-1005P computes a product between the data value of the sub-feature map received therein and the weight value at operation 1230 to obtain a product value (e.g., the product values 1020A-1020P). The product values may be represented as a product matrix. At operation 1235, the values in the product matrix is added to values read from a window of the portion loaded into the accumulators 1025A-1025P at the operation 1215. For example, in the first iteration, the values in the product matrix may be added to the portion 1140A. In the second iteration, the values in the product matrix may be added to the portion 1140B, while in the third iteration, the values in the product matrix may be added to the portion 1140C, and in the fourth iteration, the values in the product matrix may be added to the portion 1140D. Thus, in each iteration, the window (e.g., the portions 1140A-1140D) may be shifted by one position (e.g., from the initial position of the portion 1140A—shift left column wise to the position of the portion 1140B—shift up row wise to the position of the portion 1140C—shift right column wise to the position of the portion 1140D). The shifting pattern described above may be applied even if the register 1135 is greater than 3×3 in size.

The result of the addition in each iteration is stored back in the accumulators 1025A-1025P at operation 1240. Then, at operation 1245, it is determined whether all the iterations have been completed. Again, the number of iterations may be dependent upon the number of non-zero weight values in the weight matrix 1120 and the number of unique weight values that are to be transmitted to the plurality of multipliers 1005A-1005P in each iteration. For example, for a 2×2 weight matrix, if a single weight value is transmitted in each iteration, and if all four weight values in that weight matrix are non-zero values, then the process 1200 may include 4 iterations. If additional iterations remain, the process 1200 loops back to the operation 1210 to continue processing the next iteration. On the other hand, if at the operation 1245, it is determined that all the iterations have completed, at operation 1250, the accumulators 1025A-1025P load the portion obtained at the operation 1240 after completion of the last iteration back into the register bank 1030. At operation 1255, the register bank 1030 performs a shift operation, and at operation 1260, a ReLU and pooling operation is performed on the shifted values in the register bank to obtain an output sub-feature map. Optionally, at operation 1265, the output sub-feature map may be compressed. The process 1200 then ends at operation 1270 by sending the output sub-feature map to the associated sparse tensor memory cluster 400, 500, or to another sparse tensor compute unit.

In some embodiments, where depth separable convolutions are implemented (e.g., where the feature map has multiple channels), the result from each channel may be stored as an intermediate output sub-feature map. For example, the sub-feature maps of each channel may perform operations 1205-1255, and the result of those operations may be stored as an intermediate output sub-feature map. In some embodiments, ReLU and pooling operations may not be performed on the intermediate output sub-feature maps. Thus, depending upon the number of channels, multiple intermediate output sub-feature maps may be obtained. For example, for three channels, three intermediate output sub-feature maps may be obtained. (e.g., depthwise convolution or spatial convolution performed independently over each channel of an input). Each of the intermediate output sub-feature maps may then be combined by applying a 1×1 filter according to given hyperparameters of the neural network. (e.g., Pointwise convolution such as a 1×1 convolution, projecting the channels output by the depthwise convolution onto a new channel space.) The ReLU and pooling operations of the operation 1260 may then be performed on the combined intermediate output sub-feature maps to obtain the output sub-feature map.

Figure 13:
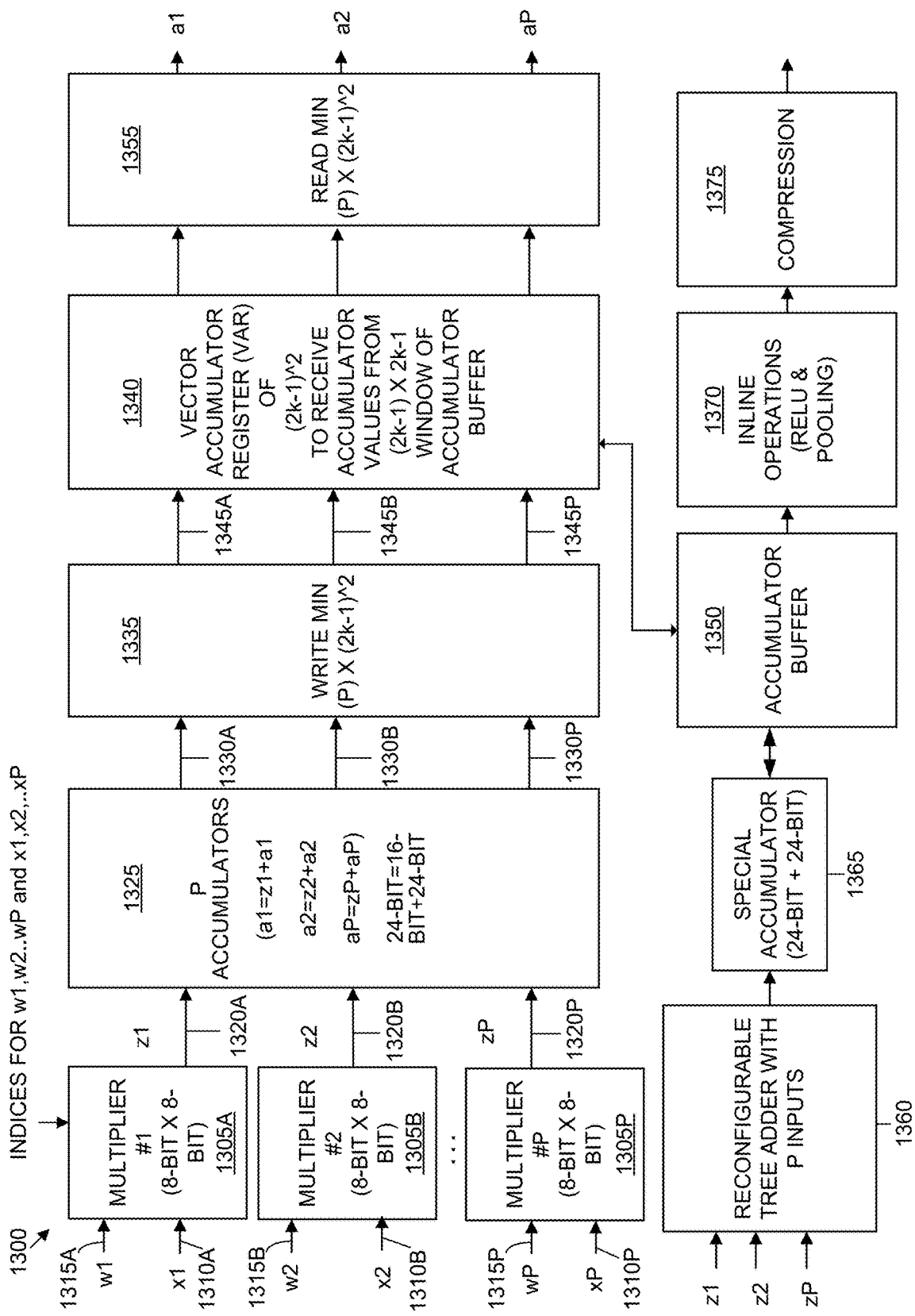
FIG. 13 is another example of the sparse tensor compute unit of the sparse tensor compute clusters of FIGS. 8 and 9, in accordance with some embodiments of the present disclosure.

Referring now to FIG. 13, an example block diagram of a sparse tensor compute unit 1300 is shown, in accordance with some embodiments of the present disclosure. The sparse tensor compute unit 1300 is analogous to one of the plurality of sparse tensor compute units 805A-805M or 905A-905M. The sparse tensor compute unit 1300 is configured to perform various machine learning operations such as multiplication, addition, etc., that may need to be performed during a convolution operation in a CNN. The sparse tensor compute unit 1300, like the sparse tensor compute unit 1000, includes a plurality of multipliers 1305A-1305P. Each of the plurality of multipliers 1305A-1305P is configured similar to the plurality of multipliers 1005A-1005P, and therefore, is not described again.

Further, each of the plurality of multipliers 1305A-1305P is configured to receive a data value (e.g., data values 1310A-1310P) from a sub-feature map (e.g., the sub-feature map 1125A), as well as a weight value (e.g., weight values 1315A-1315P) from a kernel matrix (e.g., the kernel matrix 1120) that is to be applied to the sub-feature map. Each of the plurality of multipliers 1305A-1305P computes a product between the data value (e.g., the data values 1310A-1310P) and the weight value (e.g., the weight values 1315A-1315P) stored therein to generate product values 1320A-1320P, respectively. Also, similar to the sparse tensor compute unit 1000, the sparse tensor compute unit 1300 also processes the sub-feature map 1125A in multiple iterations (e.g., four iterations, as discussed above). In each iteration, a different weight value from the kernel matrix 1120 may be applied to the sub-feature map 1125A.

In some embodiments, each of the plurality of multipliers 1305A-1305P may also receive the index values of the data values 1310A-1310P, respectively, and the index values of each of the weight values 1315A-1315P. For example, the multiplier 1305A may receive the index value of the data value 1310A and the index values of each of the weight values from the kernel matrix 1120. Based upon the index values, each of the plurality of multipliers 1305A-1305P may determine the index value of where the product value (e.g., the product values 1320A-1320P) computed by that multiplier is to be located in the output sub-feature map. In some embodiments, each of the plurality of multipliers 1305A-1305P may compute the index value of the product values 1320A-1320P using the following formulae:

$$XW\_row\_idx = X\_row\_idx + ((W\_ROW\_LEN-1) - W\_row\_idx)$$

$$XW\_col\_idx = X\_col\_idx + ((W\_COL\_LEN-1) - W\_col\_idx)$$

In the formulae above, indices start from 0 and XW_row_idx, XW_col_idx are the row, column index values, respectively, of the product values (e.g., the product values 1320A-1320P) in the output sub-feature map. X_row_idx and X_col_idx are the row, column index values, respectively, of the first multiplicand (e.g., the data values 1310A-1310P). W_row_idx, W_col_idx are the row, column index values, respectively, of the second multiplicand (e.g., the weight values 1315A-1315P). W_ROW_LEN, W_COL_LEN are the dimensions (e.g., kernel size) of the kernel matrix 1120. Further, XW-row_idx may be the same as X_row_idx offset by the filter row length and filter coefficient row index filter coefficient row index takes the value from 0 to W_ROW_LEN-1.

Upon computing the index values of the product values 1320A-1320P, each of the plurality of multipliers 1305A-1305P may transmit their respective product value and the computed index value to an accumulator 1325. Although the plurality of multipliers 1305A-1305P have been described as computing the index values of the product values 1320A-1320P, in some embodiments, the accumulator 1325 may instead receive the various index values of the first and second multiplicands to compute the index values of those product values. In other embodiments, another component of the accelerator 200 may compute the index values for the product values 1320A-1320P in the output sub-feature map.

Thus, each of the product values 1320A-1320P and the computed index values are input into the accumulator 1325. In some embodiments, the accumulator 1325 may be a combination of "P" accumulators (where "P" is the total number of the plurality of multipliers 1305A-1305P) and each accumulator may be similar to the plurality of accumulators 1025A-1025P. The accumulator 1325 is, thus, configured similar to the accumulators 1025A-1025P. Similar to the accumulators 1025A-1025P, the accumulator 1325 may be configured to add each of the product values 1320A-1320P to the sum computed in the last iteration. For example, the accumulator 1325 may add the product value 1320A of the current iteration to the product value 1320A from the previous iterations. Thus, the accumulator 1325 may perform the following operations:

$$a1 = a1 + z1$$

$$a2 = a2 + z2$$

$$\ldots$$

$$aP = aP + zP$$

In the equations above, z1 is the product value 1320A, z2 is the product value 1320B, zP is the product value 1320P, and so on. At the start of the first iteration, each of the values a1, a2, . . . , aP may be initialized to zero. Results 1330A-1330P, including the summation results (e.g., a1, a2, . . . , aP) and the computed index values of each of those results may be sent from the accumulator 1325 to a Multi-stage Interconnection Network ("MIN") 1335. The result 1330A may include the summation result, a1, and the index value computed by the multiplier 1305A for the product value 1320A. Similarly, the result 1330B may include the summation result, a2, as well as the index value computed by the multiplier 1305B for the product value 1320B, and so on.

The MIN 1335 may be used for local interleaving and connecting the accumulator 1325 to a variable accumulator register ("VAR") 1340. Additional details of the MIN 1335 may be found in U.S. application Ser. No. 15/627,042, filed on Jun. 19, 2017, the entirety of which is incorporated by reference herein. The MIN 1335 may include a plurality of control states. In some embodiments, the total number of locations input to a READ MIN (e.g., MIN 1355 described below) are $(2k-1)^2$. Since P values need to be accessed out of these $(2k-1)^2$ values, the READ MIN (e.g., the MIN 1355) may be used. The total number of locations the WRITE MIN (e.g., the MIN 1335) is connected to are $(2k-1)^2$. Since P values need to be written out of these $(2k-1)^2$ values, the WRITE MIN (e.g., the MIN 1335) may be used. In some embodiments, if two of the product values 1320A-1320P have the same computed index values, the MIN 1335 may sort the results 1330A-1330P. The WRITE MIN (e.g., the MIN 1335) may, thus, be used to write to the VAR 1340 and the READ Min (e.g., the MIN 1355) may be used to read from the VAR 1340. Thus, the MIN 1335 may transmit sorted results 1345A-1345P, including the index values computed by the plurality of multipliers 1305A-1305P, to the VAR 1340.

Thus, the MIN 1335 and the MIN 1355 may provide a bi-directional connectivity (e.g., one direction for read and another direction for write) on first P ports (or k^2 ports in case of no sparsity in an input sub-feature map) of a Benes network (total number of ports may be (2k-1)^2), where the number of P ports may be based on a percentage of non-zero values in the input sub-feature map. For example, if there are 60% non-zero values in an input sub-feature map, and the kernel matrix is 3×3, then the P ports may be chosen to be 6. In some embodiments, the P ports may be chosen independent of the average sparsity and may be based on various hardware considerations.

The VAR 1340 is initialized with a portion from an accumulator buffer 1350 similar to the accumulators 1025A-1025P. The accumulator buffer 1350 is similar to the register bank 1030. However, the accumulator buffer 1350 does not implement a shifting operation. Similar to the register bank 1030, the accumulator buffer 1350 may be of a size of the output sub-feature map, as discussed above with respect to the register bank. For example, using the example of FIG. 11, the accumulator buffer 1350 may be of size 7×7. Further, at the start of the first iteration, the accumulator buffer 1350 may be initialized with all zero values, as discussed above.

Additionally, at the start of the first iteration, a portion of the accumulator buffer 1350 may be loaded into the VAR 1340. The size of the VAR 1340 may be computed using the formula: (2k-1)×(2k-1), where k is the kernel size of the kernel matrix 1120. Since in the example of FIG. 11, the kernel size, k, of the kernel matrix 1120 is 2, the size of the VAR 1340 is 3×3. Further, the 3×3 portion from the accumulator buffer 1350 that is copied into the VAR 1340 may be determined based on the following formula:

$$VAR = \text{accumulator buffer}(i{:}i+\text{acc\_length}-1, j{:}j+\text{acc\_length}-1)$$

In the formula above, the first term corresponds to the row numbers (e.g., row index value) of the accumulator buffer 1350 and the second term corresponds to the column numbers (e.g., column index value) of the accumulator buffer. Further, in the formula above, "i" is the start of the row number and "j" is the start of the column number of the sub-feature map 1125A in the padded feature map 1115, and acc_length is the size of the accumulator buffer 1350. For example, since the size of the accumulator buffer 1350 in the example above is 3×3, the acc_length is 3. Thus, for example, for processing the sub-feature map 1125A, "i" in the formula above is 1, "j" is 1, and acc_length is 3. Thus, at the start of the first iteration, rows 1:3 and columns 1:3 of the accumulator buffer 1350 may be loaded into the VAR 1340.

Upon receiving the sorted results 1345A-1345P and the computed index values from the MIN 1335, the VAR 1340 stores the results in the appropriate index value of the portion copied from the accumulator buffer 1350. Upon storing the sorted results 1345A-1345P in the appropriate index values in the VAR 1340, the VAR may transmit the sorted results 1345A-1345P to the MIN 1355, which is structured similar to the MIN 1335. The MIN 1355 may send the sorted results 1345A-1345P back to the accumulator 1325 for use during the next iteration.

Further, after completing all iterations of processing the sub-feature map 1125A, the VAR 1340 may send the results stored therein back to the accumulator buffer 1350. For example, if rows 1:3 and columns 1:3 were copied from the accumulator buffer 1350 to the VAR 1340 at the start of the first iteration, at the end of the last iteration, the results from the VAR are loaded back into rows 1:3 and columns 1:3 of the accumulator buffer. Thus, the portion of the accumulator buffer 1350 that is loaded into the VAR 1340 at the start of the first iteration is replaced by the results from the VAR 1340 at the end of the last iteration.

In addition to sending the product values 1320A-1320P to the accumulator 1325, those product values are also input into an adder 1360. The results from the adder 1360 are stored within a special accumulator 1365. The adder 1360 and the special accumulator 1365 are analogous to the adder 1035 and the special accumulator 1040, respectively.

ReLU and pooling operations 1370 are performed, as discussed above, on the values stored in the accumulator buffer 1350 after the last iteration to obtain an output sub-feature map. The results of the ReLU and pooling operations 1370 may optionally be compressed in a compression block 1375, as discussed above. The compressed results may be sent back to the DRAM 215 via the associated memory storage memory cluster or to another sparse tensor compute unit.

Figure 14:
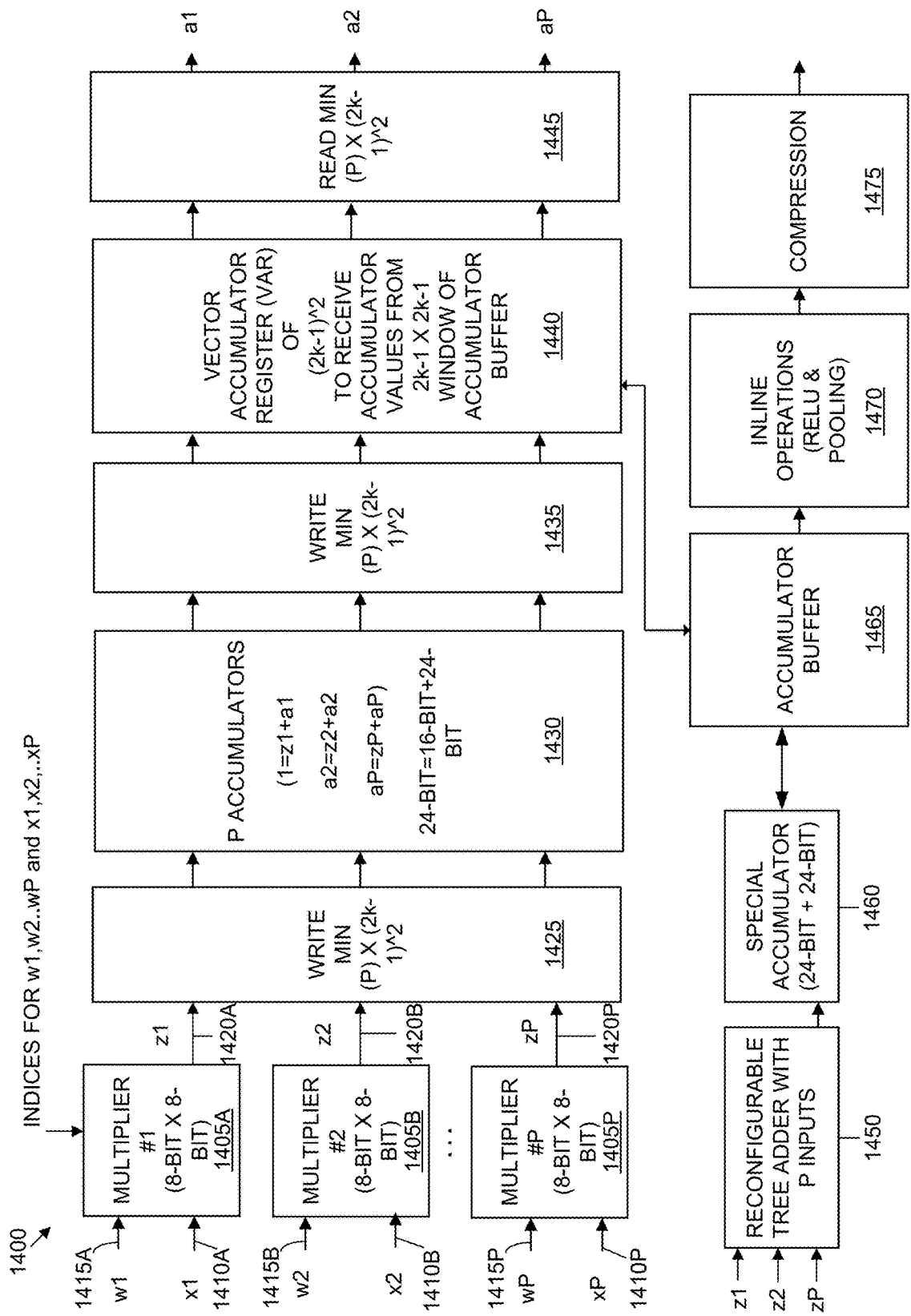
FIG. 14 is yet another example of the sparse tensor compute unit of the sparse tensor compute clusters of FIGS. 8 and 9, in accordance with some embodiments of the present disclosure.

Referring now to FIG. 14, an example of a sparse tensor compute unit 1400 is shown, in accordance with some embodiments of the present disclosure. The sparse tensor compute unit 1400 is substantially similar to the sparse tensor compute unit 1300. For example, similar to the sparse tensor compute unit 1300, the sparse tensor compute unit 1400 includes a plurality of multipliers 1405A-1405P that receive data values 1410A-1410P and weight values 1415A-1415P to generate product values 1420A-1420P. Each of the plurality of multipliers 1405A-1405P may also receive the index values of the data values 1410A-1410P and the weight values 1415A-1415P to compute the index values of the product values 1420A-1420P, as explained above.

The sparse tensor compute unit 1300 is configured to receive one unique weight value at a time. In other words, the same weight value is transmitted to each of the plurality of multipliers 1305A-1305P in the sparse tensor compute unit 1300 in each iteration. However, the sparse tensor compute unit 1400 is configured to process more than one unique weight values in each iteration. In some embodiments, more than one unique weight values may need to be processed at a time. In such cases, multiple weight values may be broadcast to the plurality of multipliers 1405A-1405P at a time. For example, a first group of the plurality of multipliers 1405A-1405P may receive a first weight value, a second group of the plurality of multipliers may receive a second weight value, and so on. For example, when two weight values are used in each iteration, a first weight value may be transmitted to Q ones of the plurality of multipliers 1405A-1405P (where Q is the number of non-zeroes in a particular sub-feature map) and a second weight value may be transmitted to (P-Q) number of the plurality of multipliers. The number of unique weight values that may be used in each iteration may be computed using the following formula: max(1, ceiling (P-Q)) where Q is the number of non-zero values in a particular sub-feature map and P is the number of the plurality of multipliers 1405A-1405P that are engaged.

The product values 1420A-1420P and the computed index values may be transmitted to a MIN 1425. Specifically, the MIN 1425 may be a write arbiter MIN having "P" number of first in first out buffers and P×P control states. If more than one of the product values 1420A-1420P have the same computed index value in the output sub-feature map, the MIN 1425 may send one of the product values going to that index value, while store the remaining product values in the buffers. The MIN 1425 then sends the products values 1420A-1420P and the computed index values to an accumulator 1430. The accumulator 1430 is similar to the accumulator 1425. Further, MIN 1435, VAR 1440, MIN 1445, adder 1450, special accumulator 1460, accumulator buffer 1465, ReLU and pooling operations 1470, and compression block 1475 are configured similar to the MIN 1335, the VAR 1340, the MIN 1355, the adder 1360, the special accumulator 1365, the accumulator buffer 1350, the ReLU and pooling operations 1370, and the compression block 1375, and therefore, are not described again for conciseness of expression. Each of these elements process the sub-feature map 1125A as described above in FIG. 14.

Figure 15:
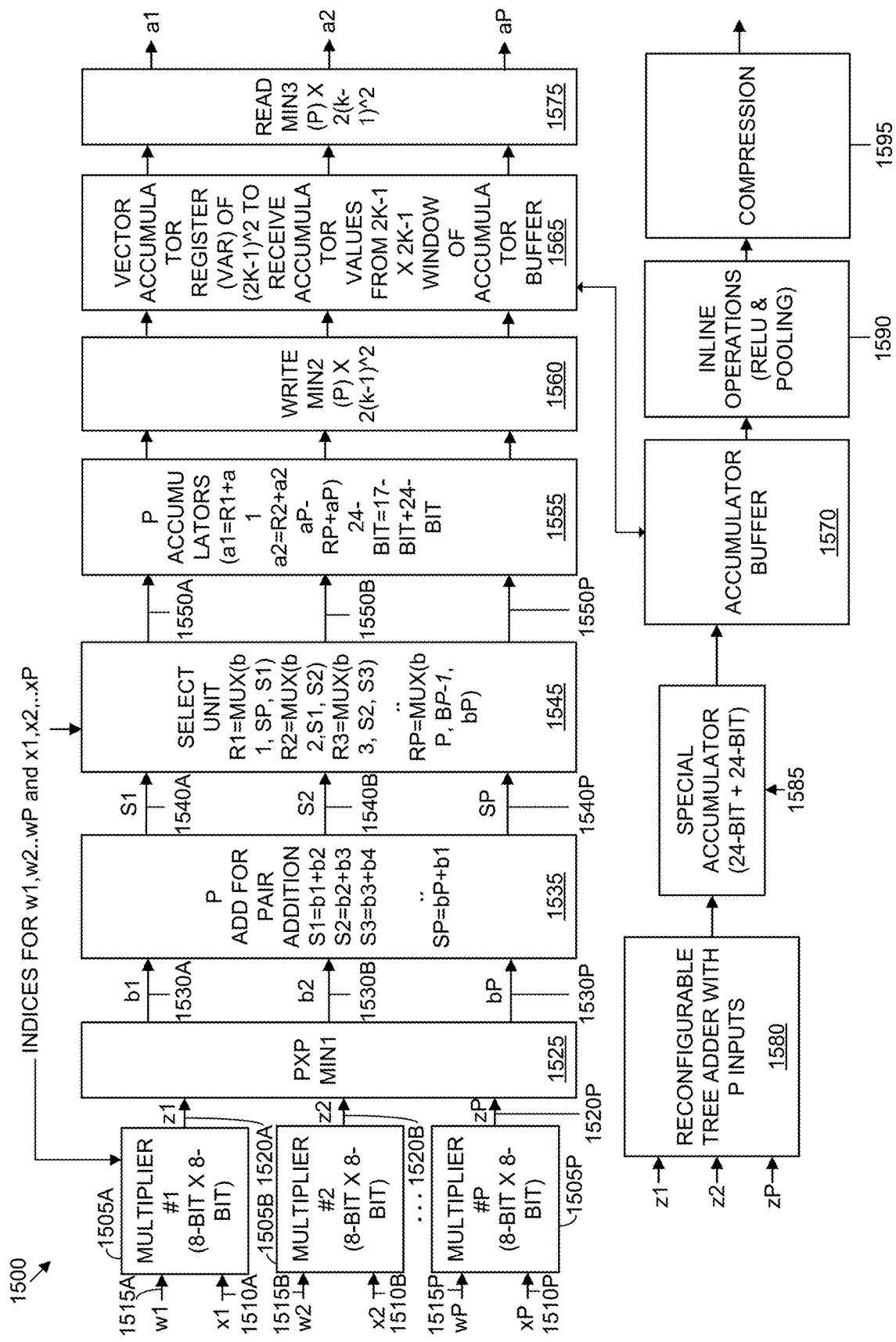
FIG. 15 is one more example of the sparse tensor compute unit of the sparse tensor compute clusters of FIGS. 8 and 9, in accordance with some embodiments of the present disclosure.

Turning to FIG. 15, an example of a sparse tensor compute unit 1500 is shown, in accordance with some embodiments of the present disclosure. The sparse tensor compute unit 1500 is substantially similar to the sparse tensor compute unit 1400. For example, similar to the sparse tensor compute unit 1400, the sparse tensor compute unit 1500 includes a plurality of multipliers 1505A-1505P that receive data values 1510A-1510P and weight values 1515A-1515P to generate product values 1520A-1520P, and compute the index values of those product values. Also similar to the sparse tensor compute unit 1400, the sparse tensor compute unit 1500 is configured to receive multiple weight values in each iteration. The product values 1520A-1520P and the computed index values may be transmitted to a MIN 1525, which may be structured similar to the MIN 1425. The MIN 1525 transmits values 1530A-1530P to an addition block 1535. The addition block 1535 may perform the following addition operation:

$S1=b1+b2$ $S2=b2+b3$ $S3=b3+b4$ $\ldots$ $SP=bP+b1$

The added values (S1, S2, . . . SP) may be considered speculative computations. If two weight values are sent to the sparse tensor compute unit 1500, the two product values resulting from those two weight values may need to be added together before accumulation. The added values (S1, S2, . . . , SP) may be transmitted as values 1540A-1540P to a select unit 1545. The select unit 1545 may be a group of multiplexers that are configured to perform the following operations:

$R1=MUX(b1,SP,S1)$ $R2=MUX(b2,S1,S2)$ $R3=MUX(b3,S2,S3)$ $\ldots$ $RP=MUX(bP,S(P-1),SP)$ In some embodiments, the control for the selection of the multiplexers above may be based on the output index value for each product value. If two adjacent product values share the same output index value, then the sum value of the adjacent product values may be selected.

Although the select unit 1545 has been described as having a group of multiplexers, in other embodiments, other elements that are configured to select one input from a plurality of inputs based on a selection criteria may be used.

Results 1550A-1550P (e.g., R1, R2, . . . , RP) may be transmitted to an accumulator 1555. The accumulator 1555 is similar to the accumulator 1430 and configured to perform the following addition operations:

$a1=R1+a2$ $a2=R2+a3$ $a3=R3+a4$ $\ldots$ $aP=RP+a1$

The results from the accumulator 1555 may be sent to a MIN 1560, which is similar to the MIN 1435. Further, the results from the accumulator 1555 may be processed in a VAR 1565, accumulator buffer 1570, MIN 1575, adder 1580, special accumulator 1585, ReLU and pooling operations 1590, and compression block 1595 similar to that in the VAR 1435, the accumulator buffer 1465, the MIN 1445, the adder 1450, the special accumulator 1460, the ReLU and pooling operations 1470, and the compression block 1475, and therefore, not explained again.

Figure 16:
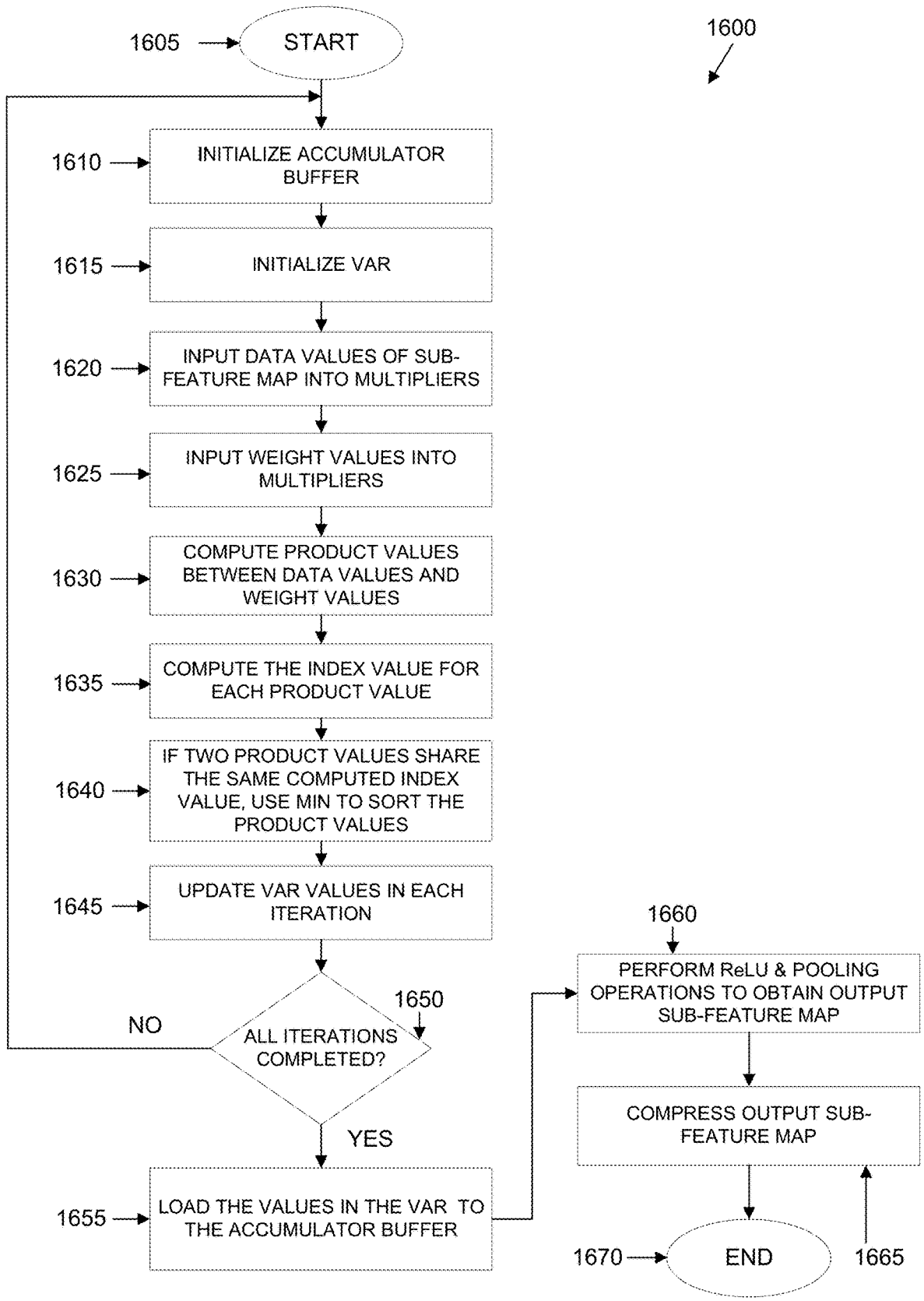
FIG. 16 is an example flowchart outlining operations for processing a sub-feature map in the sparse tensor compute units of FIGS. 13-15 in a standard convolution operation or in a 1×1 fully connected convolution operation, in accordance with some embodiments of the present disclosure.

Turning to FIG. 16, an example flowchart outlining operations of a process 1600 is shown, in accordance with some embodiments of the present disclosure. The process 1600 may include other or additional operations depending upon the embodiment. The process 1600 may be implemented in the sparse tensor compute unit 1300, the sparse tensor compute unit 1400, or the sparse tensor compute unit 1500. In some embodiments, the sparse tensor compute unit implementing the process 1600 may include a controller that performs the process 1600. The controller may be associated with a memory for storing computer-readable instructions, which may be executed by a processor associated with the controller. In other embodiments, the scheduling engine 225 may be configured to perform the process 1600. The process 1600 may be implemented during a standard convolution operation in a CNN. The process 1600 may also be implemented in a fully connected 1×1 convolution operation in which a 1×1 weight matrix is applied.

Upon starting at operation 1605, the accumulator buffer (e.g., the accumulator buffer 1350, the accumulator buffer 1465, the accumulator buffer 1570) of the sparse tensor compute unit (e.g., the sparse tensor compute unit 1300, the sparse tensor compute unit 1400, or the sparse tensor compute unit 1500) that is implementing the process 1600 is initialized at operation 1610. The operation 1610 is similar to the operation 1210. As indicated above, at the start of the first iteration, the accumulator buffer may be initialized with all zero values. Further, upon initializing the accumulator buffer at the operation 1610, the VAR (e.g., the VAR 1340, the VAR 1440, the VAR 1565) of the sparse tensor compute unit implementing the process 1600 is initialized at operation 1615 such that a portion of the accumulator buffer is loaded into the VAR.

At operation 1620, data values from the sub-feature map (e.g., the sub-feature map 1125A) are input into the plurality of multipliers (e.g., the plurality of multipliers 1305A-1305P, the plurality of multipliers 1405A-1405P, the plurality of multipliers 1505A-1505P) of the sparse tensor compute unit implementing the process 1600, as discussed above. At the operation 1620, the index values corresponding to the data values may also be input into the plurality of multipliers. At operation 1625, one or more weight values (e.g., from the kernel matrix 1220) are transmitted to each of the plurality of multipliers (e.g., the plurality of multipliers 1305A-1305P, the plurality of multipliers 1405A-1405P, the plurality of multipliers 1505A-1505P) of the sparse tensor compute unit implementing the process 1600, as discussed above. The index values of those weight values may also be input into those multipliers. The number of weight values transmitted to each of the plurality of multipliers may be dependent upon the type of convolution being performed. For example, in some embodiments, two unique weight values may be transmitted to each of the plurality of multipliers in a standard convolution operation, while a single weight value may be transmitted to each of those multipliers in a fully connected 1×1 convolution operation. In some embodiments, the operations 1610/1615 and 1620/1625 may occur in parallel.

Each of the plurality of multipliers (e.g., the plurality of multipliers 1305A-1305P, the plurality of multipliers 1405A-1405P, the plurality of multipliers 1505A-1505P) computes a product between the data value of the sub-feature map received therein and the weight value(s) at operation 1630 to obtain a product value (e.g., the product values 1320A-1320P, the product values 1420A-1420P, the product values 1520A-1520P). The product values may be represented as a product matrix. At operation 1635, the plurality of multipliers (e.g., the plurality of multipliers 1305A-1305P, the plurality of multipliers 1405A-1405P, the plurality of multipliers 1505A-1505P) also compute the index values for those product values, as discussed above.

At operation 1640, if two product values share the same computed index, the MIN (e.g., the MIN 1335, the MIN 1435, the MIN 1460) of the sparse tensor compute unit implementing the process 1600 sorts the product values such that the product values sharing the same index value are adjacent to each other in the VAR (e.g., the VAR 1340, the VAR 1440, the VAR 1565) of the sparse tensor compute unit implementing the process 1600. The sorted results from the MIN are stored in the VAR at operation 1645. Then, at operation 1650, it is determined whether all the iterations have been completed. If additional iterations remain, the process 1600 loops back to the operation 1610 to continue processing the next iteration. On the other hand, if at the operation 1650, it is determined that all the iterations have completed, at operation 1655, the values in the VAR (e.g., the VAR 1340, the VAR 1440, the VAR 1565) obtained at the operation 1645 after completion of the last iteration are loaded back into the accumulator buffer (e.g., the accumulator buffer 1350, the accumulator buffer 1465, the accumulator buffer 1570). At operation 1660, ReLU and pooling operations are performed on the values in the accumulator buffer to obtain an output sub-feature map. Optionally, at operation 1665, the output sub-feature map may be compressed. The process 1600 then ends at operation 1670 by sending the output sub-feature map to the associated sparse tensor memory cluster 400, 500, or to another sparse tensor compute unit.

In some embodiments, the output sub-feature map may again be sub-divided into additional sub-feature maps, as discussed above in FIGS. 3A and 3B, based on sparsity to equalize the number of zeroes and non-zeroes in each of the additional sub-feature maps, and to equalize the workload in each of the sparse tensor compute units of the sparse tensor compute cluster 230. A similar rebalancing of the output sub-feature maps may be performed in the process 1200.

In some embodiments, where depth separable convolutions are implemented (e.g., where the feature map has multiple channels), the result from each channel may be stored as an intermediate output sub-feature map. For example, the sub-feature maps of each channel may perform operations 1605-1665, and the result of those operations may be stored as an intermediate output sub-feature map. In some embodiments, ReLU and pooling operations may not be performed on the intermediate output sub-feature maps. Thus, depending upon the number of channels, multiple intermediate output sub-feature maps may be obtained. For example, for three channels, three intermediate output sub-feature maps may be obtained. Each of the intermediate output sub-feature maps may then be combined by applying a 1×1 filter. The ReLU and pooling operations of the operation 1660 are then performed on the combined intermediate output sub-feature maps to obtain the output sub-feature map.

Figure 17:
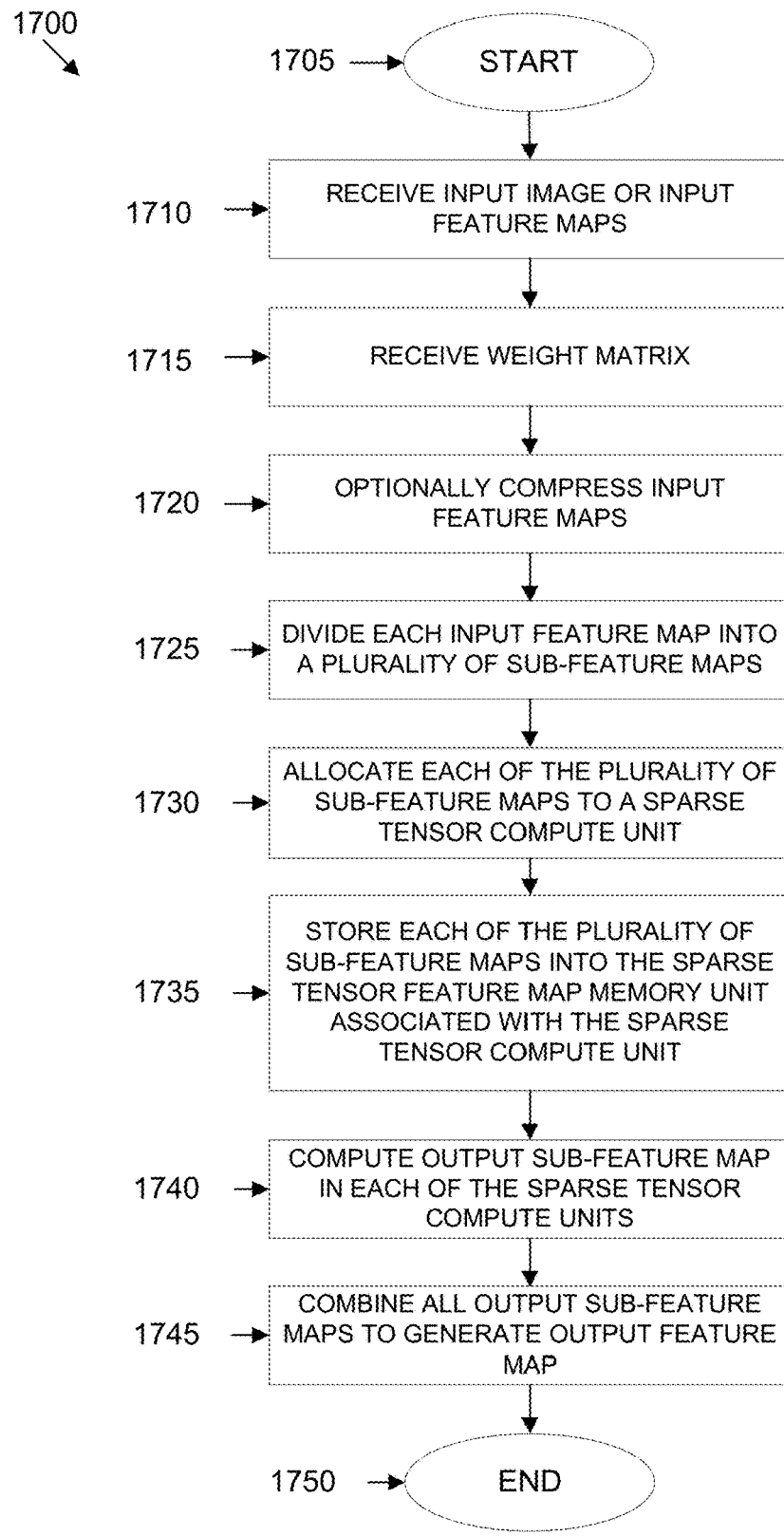
FIG. 17 is an example flowchart outlining operations for processing an input feature map using the accelerator of FIG. 2, in accordance with some embodiments of the present disclosure.

Turning now to FIG. 17, an example flowchart outlining operations of a process 1700 is shown, in accordance with some embodiments of the present disclosure. The process 1700 may include additional or other operations depending upon the particular embodiment. The process 1700 may be implemented by the accelerator 200. In some embodiments, the process 1700 may be implemented by the scheduling engine 225 of the accelerator 200. In other embodiment, the process 1700 may be implanted by another component of the accelerator 200. The process 1700 starts at operation 1705 when one or more machine learning operations are to be performed on a new input data (e.g., the input image 205) in a machine learning application. For example, when an image classification is to be done to identify one or more features in the input image, the process 1700 may be implemented. Thus, at operation 1710, the input image or the feature maps associated with the input image may be input into the accelerator 200.

The input image may be represented by an array of pixels based upon the size, height, and color scheme of the input image. Simply as an example and without intending to be limiting in any way, the process 1700 is explained below with respect to an input image of size 1024×1024×3. Thus, the input image is 1024 pixel wide and 1024 pixel high, and has 3 color channels. The input image may, thus, be treated as a combination of three feature maps, with one feature map for each color channel and each feature map having a size of 1024×1024×1. In some embodiments, the input image may be input into the accelerator 200, and the accelerator may derive the feature maps from the input image. In other embodiments, the conversion of the input image into the feature maps may occur outside the accelerator 200 (by another component on the host device (e.g., the host device 105) with which the accelerator 200 is associated), and the feature maps may be input into the accelerator instead of the input image. Further, the input image or the feature maps of the input image (whichever is input into the accelerator 200) may be stored within the DRAM 215 of the accelerator.

At operation 1715, the accelerator 200 receives a weight matrix (e.g., the weight matrix 220). Although the operation 1715 has been described as occurring after the operation 1710 in which the input image or the feature maps of the input image are received by the accelerator 200, in some embodiments, the operation 1715 may occur before the operation 1710. In some embodiments, the operations 1710 and 1715 may occur simultaneously or substantially simultaneously.

In some embodiments, the accelerator 200 may be configured for a neural network having a plurality of layers. For example, in some embodiments, the accelerator 200 may be configured for a convolutional neural network having a plurality of convolution layers. In some embodiments, each of the plurality of convolution layers may have a specific weight matrix that may be applied to the feature map of that layer. Thus, in such embodiments, the accelerator 200 may receive multiple weight matrices, with one weight matrix configured for one layer. Each weight matrix may include weight values that may be applied to the feature maps. Specifically, multiplication, addition, and other operations may be performed between corresponding weight values and the data values of the input feature map. In some embodiments, the weight matrix may also be compressed. In some embodiments, the weight matrix may at least temporarily be stored within the DRAM 215.

In some embodiments, the weight matrices, before or after compression, may also be reordered, and a static sparsity analysis performed on the weight matrices. The static sparsity analysis may be performed before or after the compression of the weight matrices. In some embodiments, the static sparsity analysis may be performed by the accelerator 200, while in other embodiments, the static sparsity analysis may be performed outside the accelerator. The static sparsity analysis identifies the weight values in a weight matrix that are zero. If a particular weight value is zero, the multiplication with that zero weight value is also zero. Thus, instead of allocating resources to multiply zero weight values with values in the feature maps, the results of those multiplication operations may directly be encoded as zero. Further, since the weight values that are zero in the weight matrix are known beforehand and do not change from one feature map to another, the sparsity in a weight matrix is static.

Thus, the weight matrices may be compressed and reordered, and a static sparsity analysis may be performed to identify zero weight values and obtain an input weight tensor from each weight matrix. Each of the input weight values may be stored within the DRAM 215, and assigned for computation with an input feature map based on a load and store schedule stored within the accelerator 200.

At operation 1720, each of the input feature maps of the input image are compressed, as discussed above. Although the operation 1720 is described after the operation 1715, in some embodiments, the operation 1720 may occur any time after the feature maps of the input image are available. Each of the feature maps may be compressed by recursively partitioning each of the feature maps into portions of smaller cell sizes, until a desired compression criteria is reached. The desired compression criteria may be based on the number of compression levels or the threshold minimum cell size, as discussed in greater detail in the U.S. application Ser. No. 16/726,084 mentioned above. The compression operations discussed throughout this disclosure may be performed as discussed in the U.S. application Ser. No. 16/726,084.

At operation 1725, each input feature map of the input image is divided into a plurality of sub-feature maps, as discussed in FIGS. 3A and 3B above. By dividing an input feature map into a plurality of sub-feature maps, each of the plurality of sub-feature maps may be processed in parallel. Further, the input feature map may be divided into the plurality of sub-feature maps, such that each of the plurality of sub-feature maps has the same or substantially similar sparsity. In some embodiments, the sparsity in each of the plurality of sub-feature maps satisfies a predetermined threshold (e.g., the predetermined percentage difference threshold discussed above). Thus, each of the plurality of sub-feature maps may have the same or similar number of zero values and/or non-zero values. Further, by dividing the input feature map into the plurality of sub-feature maps, the dynamic sparsity in the input feature map may be converted into static or close to static sparsity in each of the plurality of sub-feature maps.

Each of the plurality of sub-feature maps may be assigned to a sparse tensor compute unit based on the closeness of the where they are stored currently to the compute units (e.g., the sparse tensor compute units 1000, 1300, 1400, 1500) at operation 1730. At operation 1735, each of the plurality of sub-feature maps is stored in the sparse tensor feature map memory unit that is associated with the sparse tensor compute unit that is to process a particular one of the plurality of sub-feature maps. In some operations, a time folding operation may be performed if a particular sub-feature map is larger than the storage capacity of the sparse tensor feature map memory unit in which that sub-feature map is to be stored. In some embodiments, a time folding operation may be considered similar to the sub-feature partitioning described above in FIGS. 3A and 3B. In a time folding operation, the partitioning is based on the feature map size. For example, if the maximum size of an input image that is supported is 1024×1024 and if we have an input image that is 2048×2048 in size, then the large input image may be divided into four input feature maps, each input feature map having a size of 1024×1024.

At the operation 1735, the weight values to be applied to that particular one of the plurality of sub-feature maps are also transferred to the sparse tensor weight memory associated with the sparse tensor compute unit. When the sparse tensor compute unit becomes available, the sparse tensor feature map memory unit may transfer the particular sub-feature map to the sparse tensor compute unit. The sparse tensor weight memory may also transfer the weight matrix stored therein to the sparse tensor compute unit.

Each of the sparse tensor compute units processes the received sub-feature map to generate an output sub-feature map, at operation 1740 and as discussed above with respect to FIGS. 10-16. Each of the sparse tensor compute units may send their output sub-feature map back to the DRAM 215 or to another sparse tensor compute unit. In some embodiments, one or more output sub-feature maps may again be subdivided according to FIGS. 3A and 3B, and undergo further processing in a sparse tensor compute unit. Once all output sub-feature maps have completed processing, those output sub-feature maps may be combined to generate the output feature map at operation 1745. The process 1700 ends at operation 1750.

In some embodiments, at the output of each sparse tensor compute unit, the number of non-zeros in the output sub-feature map may be measured. As the output sub-feature maps are generated, it may be possible to redirect the output sub-feature map of one sparse tensor compute unit to another sparse tensor compute unit for balancing sparsity. However, in some embodiments, it may be easier and more efficient to balance the sparsity in output sub-feature maps after all the sub-feature maps are produced and stored in the sparse tensor feature map memories while supplying to the sparse tensor compute unit for the next convolution layer. For balancing sparsity in such a way, another network may be used to provide connectivity between sparse tensor feature map memories and sparse tensor compute units. When processing depth-wise separable convolutions, point-wise or 1×1 convolutions may be performed using multiple intermediate feature maps. These intermediate feature maps may not be sparse as they just go through convolution only and not ReLU (activation). Also each intermediate feature map output may need to be stored back in DRAM. The sparsity arises at the final output of point-wise or 1×1 convolutions as these include ReLU (activation).

Figure 18A:
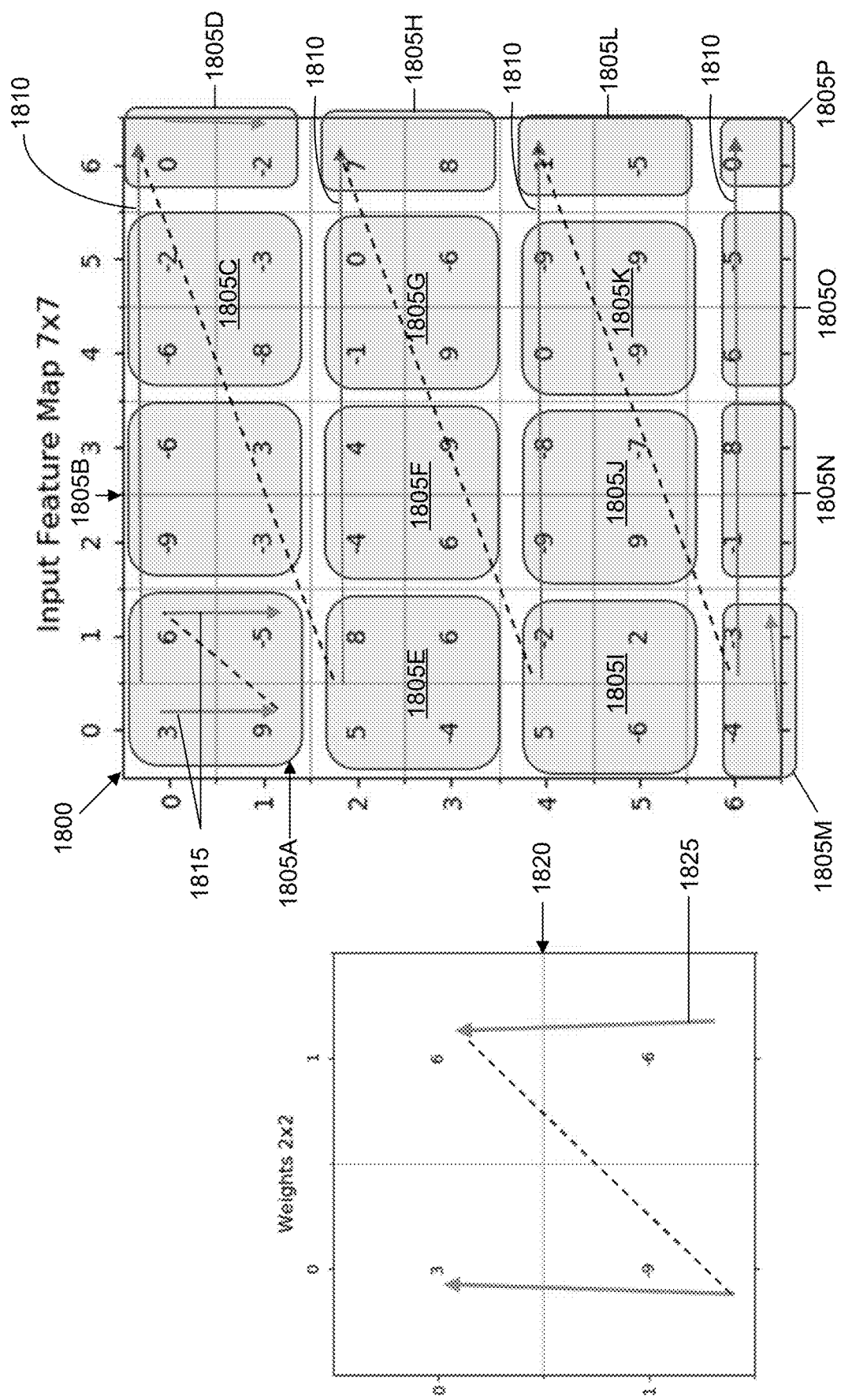
FIGS. 18A-18D show an example of processing a sub-feature map in the sparse tensor compute unit of FIG. 13, in accordance with some embodiments of the present disclosure.

Turning now to FIGS. 18A-18D, an example of processing an input feature map 1800 in the sparse tensor compute unit 1300 is shown, in accordance with some embodiments of the present disclosure. It is to be understood that the input feature map 1800 is simply an example and is not intended to be limiting in any way. The present disclosure may be used to process input feature maps of any size and having any data values therein. The input feature map 1800 may be generated from the input image 205. As shown in FIG. 18A in particular, the input feature map 1800 may include a plurality of cells, each cell being formed at the intersection of a row (that extends in the X-direction 1105; see FIG. 11) and a column (that extends in the Y-direction 1110; see FIG. 11). Each of the plurality of cells in the input feature map 1800 includes a data value that is to be processed in the sparse tensor compute unit 1300.

Although not shown in FIG. 18A, in some embodiments, the input feature map 1800 may be padded by zeroes on all sides similar to the input feature map 1100. Further, in some embodiments, sub-feature maps may be created from the input feature map 1800 (or from the padded feature map when padding is used). In some embodiments, the input feature map 1800 may be divided into sub-feature maps in the partitioning block 210 or other component of the accelerator 200, as discussed above in FIGS. 3A and 3B. For example and as shown in FIG. 18A, the input feature map 1800 may be divided into a plurality of sub-feature maps 1805A-1805P. Each of the plurality of sub-feature maps 1805A-1805P may be processed in the sparse tensor compute unit 1300 in series (or in parallel in multiple instances of the sparse tensor compute unit 1300). In some embodiments, the plurality of sub-feature maps 1805A-1805P may be processed in an order shown by arrows 1810. For example, the sub-feature map 1805A may be processed first followed by the sub-feature maps 1805B-1805D. Then, the sub-feature maps 1805E-1805H may be processed, followed by the sub-feature maps 18051-1805L, and so on. Further, within each of the plurality of sub-feature maps 1805A-1805P, the data values may be processed in an order shown by arrow 1815. The order in which the plurality of sub-feature maps 1805A-1805P are processed and/or the order in which the data values of each of the plurality of sub-feature maps are processed may vary in other embodiments. Additionally, in some embodiments, only non-zero data values may be input into the sparse tensor compute unit 1300.

Figure 18B:
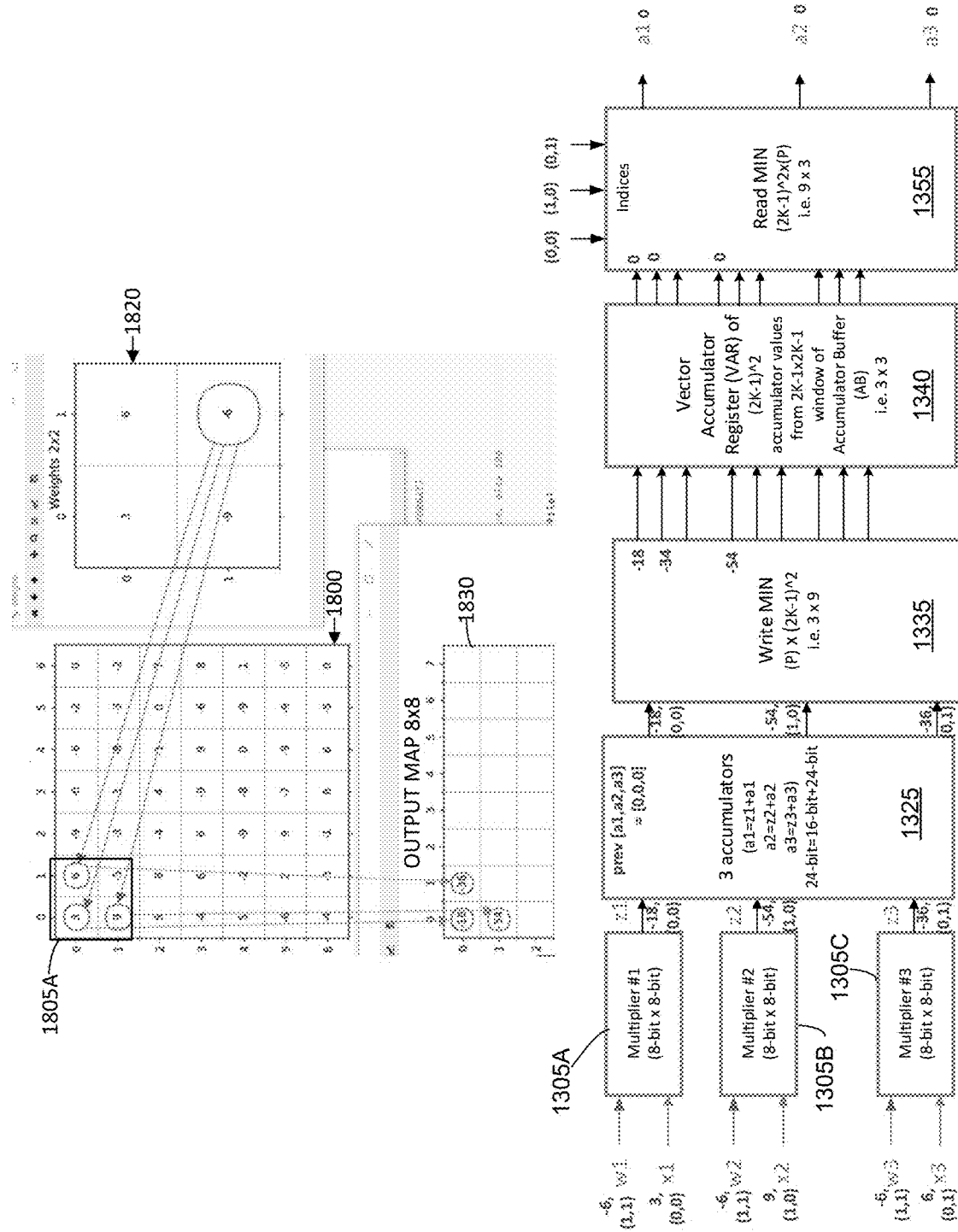
Figure 18C:
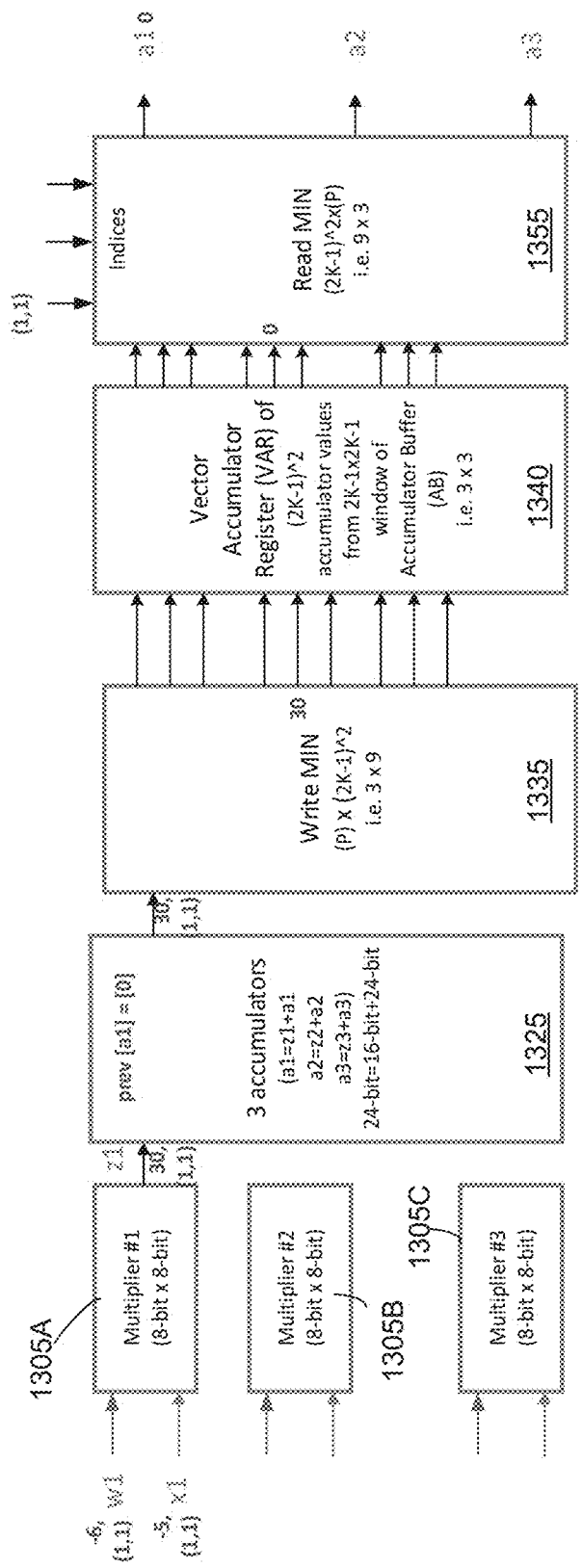
Figure 18D:
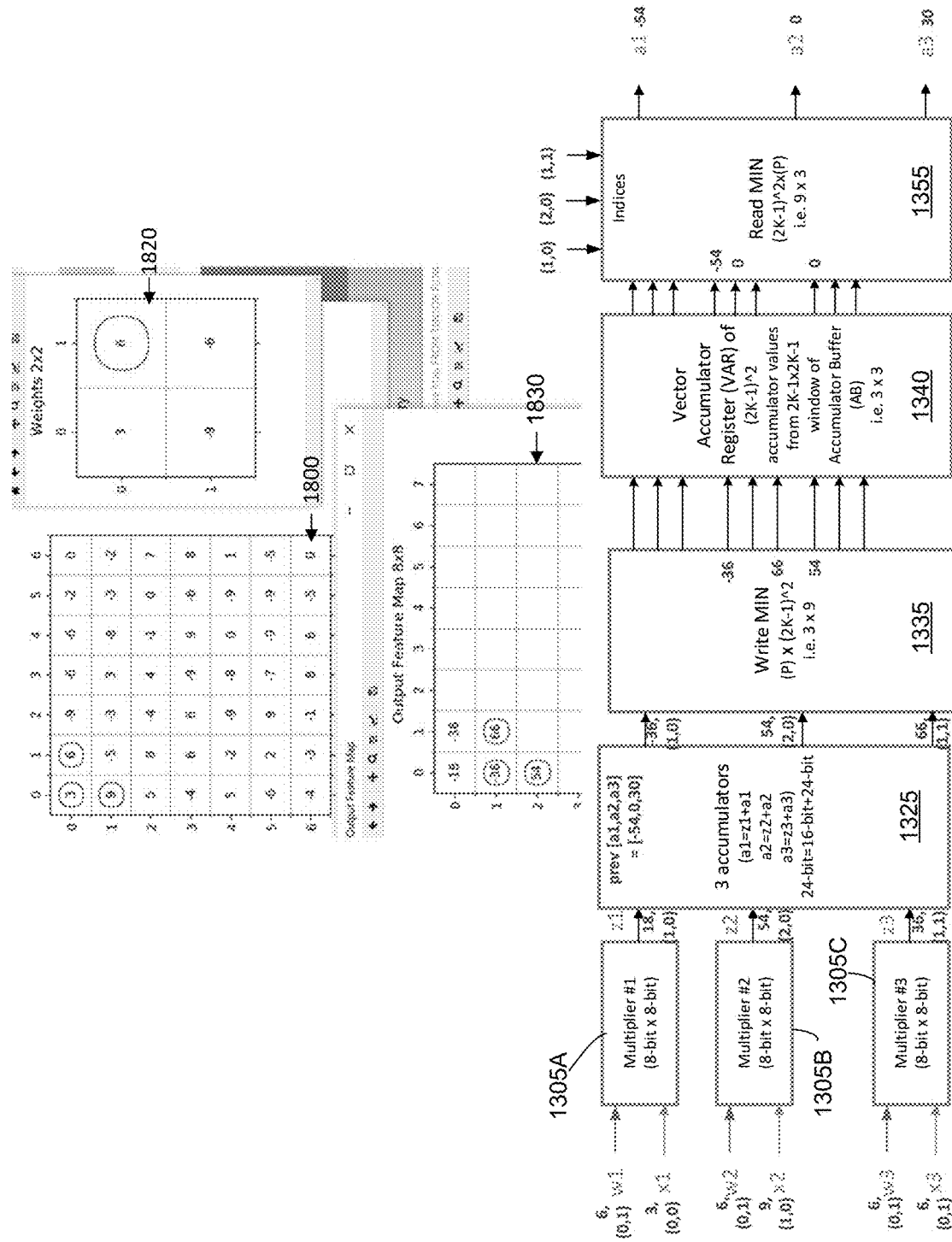

Although each of the plurality of sub-feature maps 1805A-1805P includes two rows and two columns and those sub-feature maps are all of the same size, it is to be understood that in other embodiments, those sub-feature maps may be of varying sizes, may include varying numbers of rows and columns, and the data values within each of the plurality of sub-feature maps 1805A-1805P may vary. Further, depending upon the number of the plurality of multipliers 1305A-1305P in the sparse tensor compute unit 1300, multiple data values of each of the plurality of sub-feature maps 1805A-1805P may be processed in parallel. For purposes of explanation, FIGS. 18B-18D are explained with respect to the sub-feature map 1805A. However, the other ones of the plurality of sub-feature maps 1805B-1805P may be similarly processed. Further, FIGS. 18A-18D are described assuming that the number of the plurality of multipliers 1305A-1305P is three. Since the sub-feature map 1805A includes four non-zero data values, each iteration may include two rounds. In the first round, three data values of the sub-feature map 1805A may be processed and in the second round, the last data value of that sub-feature map may be processed. Since the data values are processed in the order shown by the arrow 1815, in the first round, the data values having the indices (0, 0), (0, 1), and (1, 0) may be processed, while in the second round the data value having the index (1, 1) may be processed.

The data values of the sub-feature map 1805A may be combined with weight values of a kernel matrix 1820. It is to be understood that the kernel matrix 1820 is simply an example and is not intended to be limiting in any way. The kernel matrix 1820 may assume other sizes (e.g., the number of rows and number of columns may vary from that shown) and the values within the kernel matrix may also vary. Further, although each of the plurality of sub-feature maps 1805A-1805P has the same number of rows and the columns as the kernel matrix 1820, in some embodiments, one or more of the plurality of sub-feature maps may have varying number of rows and/or columns than the kernel matrix. The weight values in the kernel matrix 1820 may be applied in a designated order as shown by arrow 1825. Further, since the sparse tensor compute unit 1300 is configured for one unique weight value in each iteration, a single weight value is broadcast to each of the plurality of multipliers 1305A-1305P in each iteration.

Thus, to process the sub-feature map 1805A, the data values from that sub-feature map may be input into the plurality of multipliers 1305A-1305P. Assuming three multipliers, and as shown in FIG. 18B, the first three data values may be input into the plurality of multipliers 1305A-1305P. Specifically, the data value "3" may be input into the multipliers 1305A, the data value "9" may be input into the multiplier 1305B, and the data value "6" may be input into the multiplier 1305C. Further, each of the multipliers 1305A-1305C may receive the first weight value of "−6," as shown in FIG. 18B and compute a product between their respective data values and the first weight value. Each of the multipliers 1305A-1305C may also receive the index values of the data values that each of those multipliers receive, as well as the index value of the first weight value. Based on the received index values, each of those multipliers 1305A-1305C may compute the result index values in the output sub-feature map where the results of the multiplication are to stored. In some embodiments, the multipliers 1305A-1305C may compute the result index values using the formulae discussed above in FIG. 13.

The product values from the multipliers 1305A-1305C and the result index values may be sent to the accumulator 1325. The accumulator 1325 may also receive the addition results from the previous iterations from the MIN 1355, as shown in FIG. 18B. Specifically, the MIN 1355 may also receive the result index values and read the values from the VAR 1340 corresponding to the result index values, and send those values to the accumulator 1325, as shown in FIG. 18B. The accumulator 1325 may then add the product values of the current iteration to the product values of the previous iterations. The accumulator 1325 may transmit the results of the addition, as well as the result index values to the MIN 1335. The MIN 1335 may write the results of the addition to the VAR 1340 at the index locations identified by the result index values. As indicated above, the VAR 1340 is initialized with a portion from the accumulator buffer 1350. Thus, upon writing the results of the additions to the VAR 1340 at the index locations identified by the result index values, the VAR 1340 may have values as shown in an output map 1830, only a portion of which is shown in FIG. 18B.

In the second round of the first iteration, the remaining data value, "−5," of the sub-feature map 1805A is input into the multiplier 1305A. The first weight value, "−6," is also input into the multiplier 1305A, as shown in FIG. 18C. The index values of the data value and the first weight value are also input into the multiplier 1305A. The product value and the result index value are sent to the accumulator 1325, which adds the product value to the product value from the previous iterations, and sends the result to the VAR 1340 via the MIN 1335, as shown in the output map 1830 of FIG. 18C.

Referring now to FIG. 18D, in the first round of the second iteration, the data values "3," "9," and "6" are input into the multipliers 1305A, 1305B, and 1305C, respectively. Further, the second weight value "6" is input into the multipliers 1305A-1305C, as shown in FIG. 18D. Additionally, the index values of the data values and the second weight value may be input into the multipliers 1305A-1305C. The data values and the second weight value may be combined in the sparse tensor compute unit 1300, as discussed above with respect to the first round of the first iteration. The output of the first round of the second iteration may be stored in the output map 1830, as shown in FIG. 18D. The second round of the second iteration may be similar to the second round of the first iteration but with the second weight value instead of the first weight value. Similarly, each of the third weight value, "−9," and the fourth weight value, "3" may be processed in the third iteration and the fourth iteration, respectively. Each of the third iteration and the fourth iteration may have two rounds, similar to the first iteration and the second iteration. The values in the output map 1830 at the end of the fourth iteration may form the output sub-feature map and may be stored within the accumulator buffer 1350.

Figure 19A:
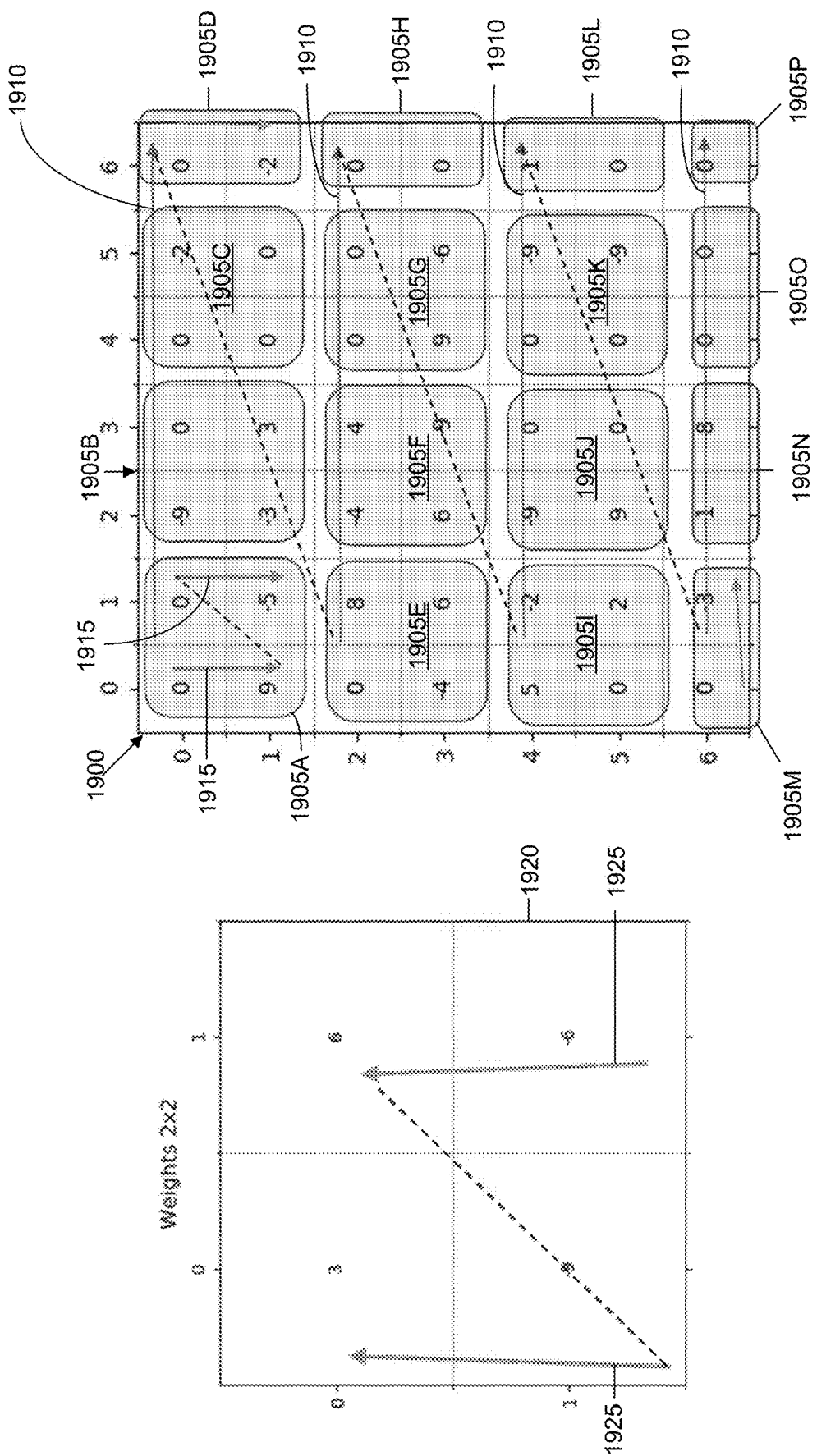
FIGS. 19A-19E show an example of processing a sub-feature map in the sparse tensor compute unit of FIG. 15, in accordance with some embodiments of the present disclosure.

Turning now to FIGS. 19A-19E, an example of processing an input feature map 1900 in the sparse tensor compute unit 1500 is shown, in accordance with some embodiments of the present disclosure. It is to be understood that the input feature map 1900 is simply an example and is not intended to be limiting in any way. The present disclosure may be used to process input feature maps of any size and having any data values therein. The input feature map 1900 may be generated from the input image 205. As shown in FIG. 19A in particular, the input feature map 1900 may include a plurality of cells, each cell being formed at the intersection of a row (that extends in the X-direction 1105; see FIG. 11) and a column (that extends in the Y-direction 1110; see FIG. 11). Each of the plurality of cells in the input feature map 11 includes a data value that is to be processed in the sparse tensor compute unit 1500.

Although not shown in FIG. 19A, in some embodiments, the input feature map 1900 may be padded by zeroes on all sides similar to the input feature map 1100. Further, in some embodiments, sub-feature maps may be created from the input feature map 1900 (or from the padded feature map when padding is used). In some embodiments, the input feature map 1900 may be divided into sub-feature maps in the partitioning block 210 or other component of the accelerator 200, as discussed above in FIGS. 3A and 3B. For example and as shown in FIG. 19A, the input feature map 1900 may be divided into a plurality of sub-feature maps 1905A-1905P. In some embodiments, at least some of the plurality of sub-feature maps 1905A-1905P may be processed in the sparse tensor compute unit 1500 in series (e.g., one after another). In other embodiments, at least some of the plurality of sub-feature maps 1905A-1905P may be processed in parallel in multiple instances of the sparse tensor compute unit 1500. In some embodiments, the plurality of sub-feature maps 1905A-1905P may be processed in an order shown by arrows 1910. Further, within each of the plurality of sub-feature maps 1905A-1905P, the data values may be processed in an order shown by arrow 1915. The order in which the plurality of sub-feature maps 1905A-1905P are processed and/or the order in which the data values of each of the plurality of sub-feature maps are processed may vary in other embodiments. Additionally, in some embodiments, only non-zero data values may be input into the sparse tensor compute unit 1500.

Although each of the plurality of sub-feature maps 1905A-1905P includes two rows and two columns and those sub-feature maps are all of the same size, it is to be understood that in other embodiments, those sub-feature maps may be of varying sizes, may include varying numbers of rows and columns, and the data values within each of the plurality of sub-feature maps 1905A-1905P may vary. Further, depending upon the number of the plurality of multipliers 1505A-1505P in the sparse tensor compute unit 1500, multiple data values of each of the plurality of sub-feature maps 1505A-1505P may be processed in parallel. For purposes of explanation, FIGS. 19B-19E are explained with respect to the sub-feature map 1905A. However, the other ones of the plurality of sub-feature maps 1905B-1905P may be similarly processed. Further, FIGS. 19A-19E are described assuming that the number of the plurality of multipliers 1505A-1505P is three. Since the sub-feature map 1905A includes only two non-zero data values, each iteration may include a single round. It is to be understood that the number of rounds in each iteration may vary from one sub-feature map to another sub-feature map. For example, the sub-feature map 1905B includes three non-zero data values and since three multipliers are used in the current example, each iteration of processing that sub-feature map may still include a single round. On the other hand, the sub-feature map 1905F includes four non-zero data values. Thus, with three multipliers, each iteration of processing the sub-feature map 9105F may include two rounds.

The data values of the sub-feature map 1905A may be combined with weight values of a kernel matrix 1920. It is to be understood that the kernel matrix 1920 is simply an example and is not intended to be limiting in any way. The kernel matrix 1920 may assume other sizes (e.g., the number of rows and number of columns may vary from that shown) and the values within the kernel matrix may also vary. Further, although each of the plurality of sub-feature maps 1905A-1905P has the same number of rows and the columns as the kernel matrix 1920, in some embodiments, one or more of the plurality of sub-feature maps may have varying number of rows and/or columns than the kernel matrix. The weight values in the kernel matrix 1920 may be applied in a designated order as shown by arrow 1925. Further, as indicated above, the sparse tensor compute unit 1500 is configured to process multiple weight values in each iteration. Thus, depending upon the number of non-zero data values and the number of multipliers, multiple weight values may be broadcast in each iteration. The example of FIGS. 19A-19E is explained assuming two unique weight values may be broadcast in each iteration.

Figure 19B:
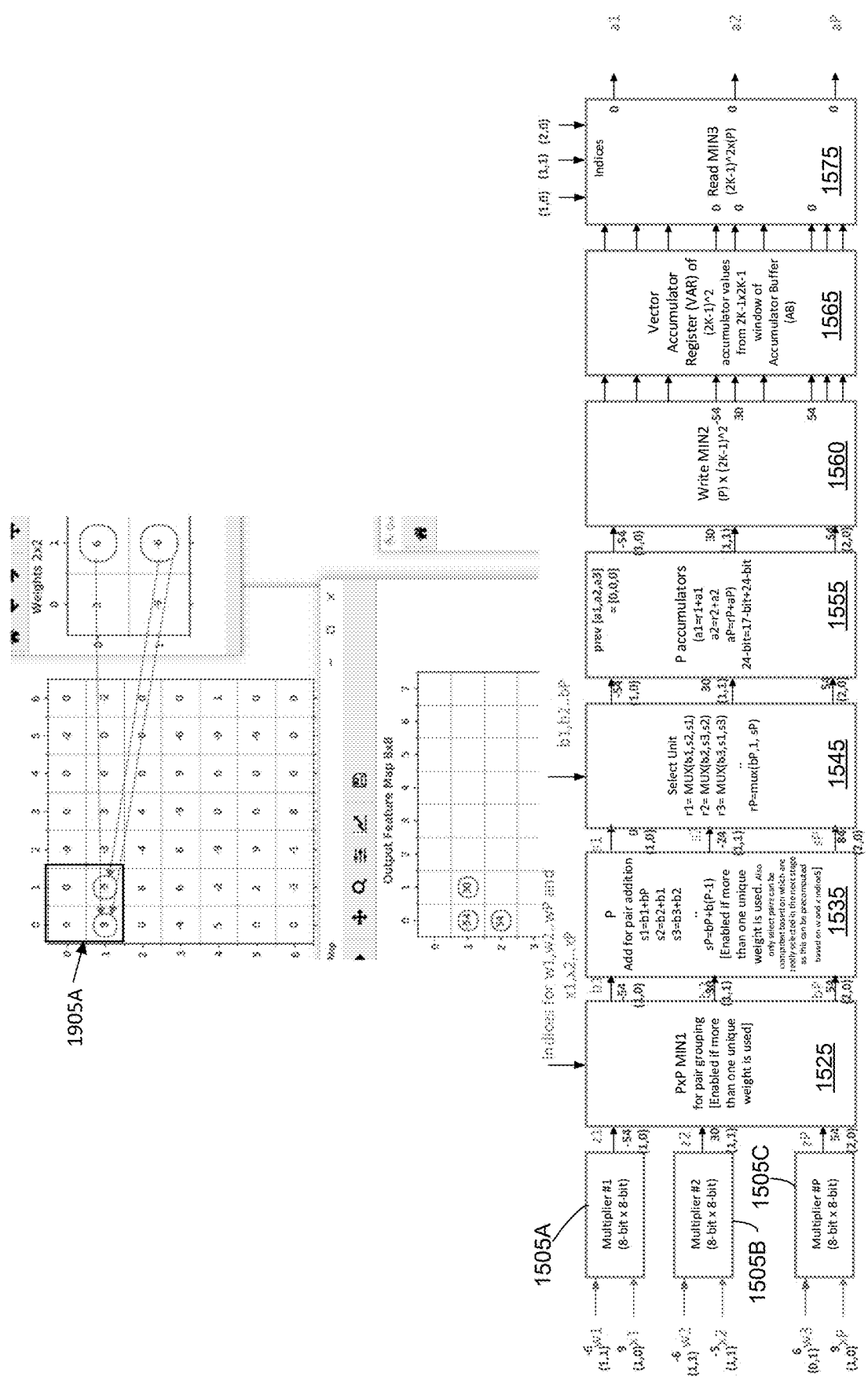

For example and as shown in FIG. 19B, the sub-feature map 1905A includes two non-zero values only. Thus, only the first two of the three multipliers need to be engaged in the first iteration to process the two non-zero data values. However, to increase performance and utilize resources at full capacity, a second weight value and the first non-zero data value may be broadcast to the third multiplier. For example, the data values "9" and "−5" of the sub-feature map 1905A may be input into the multiplier 1505A and 1505B, respectively. Further, the first weight value "−6" may be input into the multipliers 1505A and 1505B. Since we have three multipliers, the first non-zero data value in the order shown by the arrow 1915 is "9," which is input into the multiplier 1505C. Further, the second weight value "6" is input into the multiplier 1505C to start the second iteration. Thus, the second iteration overlaps with the first iteration.

Each of the multipliers 1505A-1505C may also receive the index values of the data values that each of those multipliers receive, as shown in FIG. 19B. Further, each of the multipliers 1505A and 1505B receives the index value of the first weight value and the multiplier 1505C receives the index value of the second weight value. Based on the received index values of the data values, the first weight value, and the second data value, each of those multipliers 1505A-1505C may compute the result index values in the output sub-feature map where the results of the multiplication are to be stored, as discussed above. The product results as well as the result index values may be transmitted to the MIN 1525. Since the result index values computed in the multipliers 1505A-1505C are different from one another, the MIN 1525 simply passes the product results and the result index values to the addition block 1535.

The addition block 1535 may perform the following additions:

$$s1=b1+b3$$

$$s2=b2+b1$$

$$s3=b3+b2$$

In the formulae above, b1, b2, and b3 are the outputs from the MIN 1525 and correspond to the product results generated by the multipliers 1505A, 1505B, and 1505C, respectively. As further shown in FIG. 19B, the sums from the addition block 1535 and the result index values may be input into the select unit 1545, which includes a plurality of multiplexers. In some embodiments, to process results from three multipliers, the select unit 1545 may include three multiplexers.

The results from the multiplexers of the select unit 1545 and the result index values may be sent to the accumulator 1555, which adds the s1, s2, and s3 values respectively to those values from the previous iteration, as discussed above and shown in FIG. 19B. Specifically, the result index values may be input into the MIN 1575, which may read values corresponding to those index values from the VAR 1565 and transmit those read values to the accumulator 1555. The results from the accumulator and the result index values may be transmitted to the MIN 1560 and written into the VAR 1565.

Figure 19C:
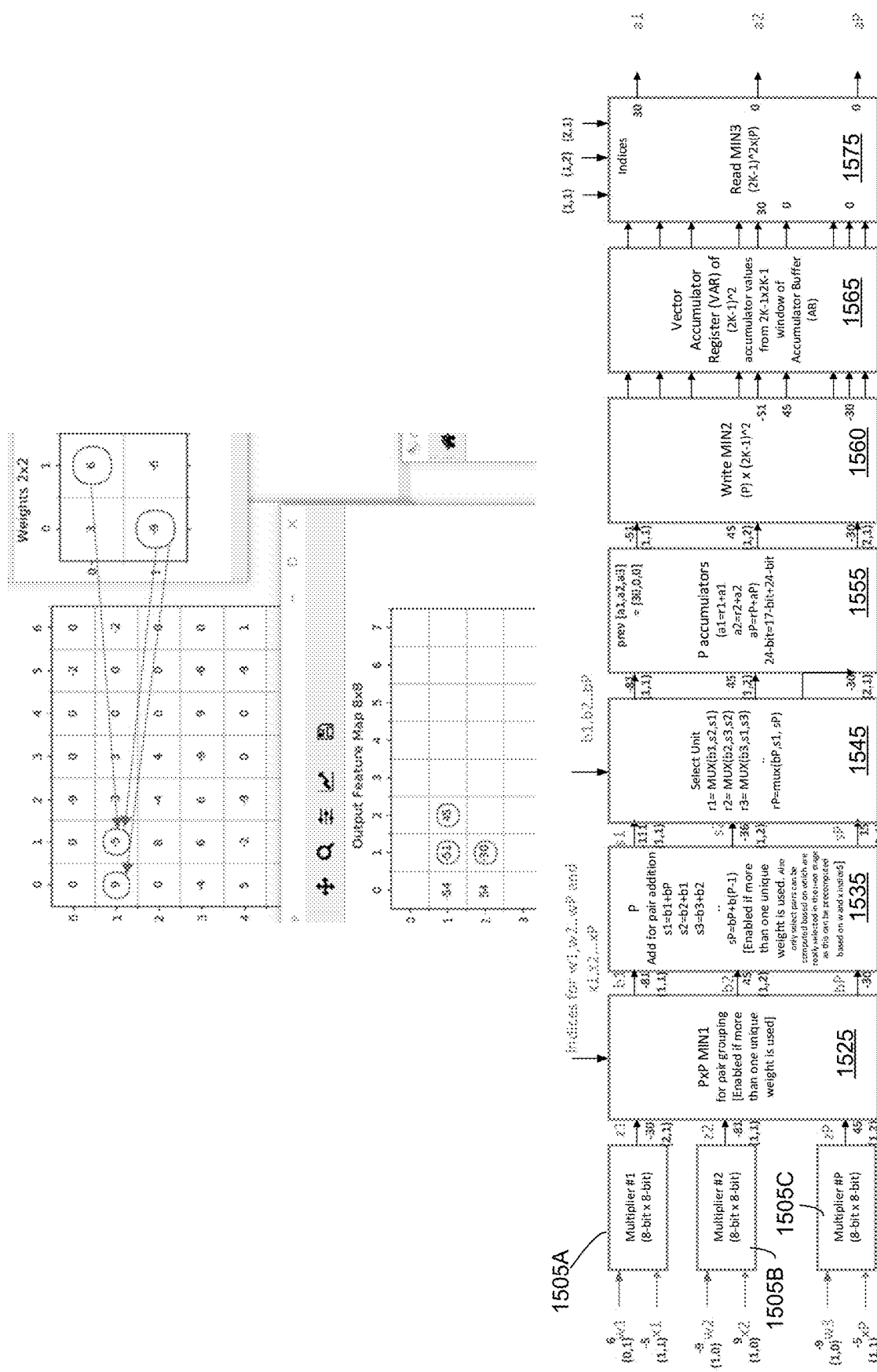

FIG. 19C shows the second iteration (or rather the second half of the second iteration), which overlaps with the second iteration. As discussed above, the second weight value and the data value "9" are processed during the first iteration (or the first half of the second iteration). In the second half of the second iteration, the remaining non-zero data value "−5" is input into the multipliers 1505A along with the second weight value. Since there are three multipliers, the remaining two non-zero data values are input into the multipliers 1505B and 1505C along with the third weight value, "−9." Thus, the second half of the second iteration and the third iteration occur in parallel. The processing of the second iteration is similar to that of the first iteration, and therefore, not described again. Similarly, the sub-feature map 1905A may be processed with the remaining weight values.

Figure 19D:
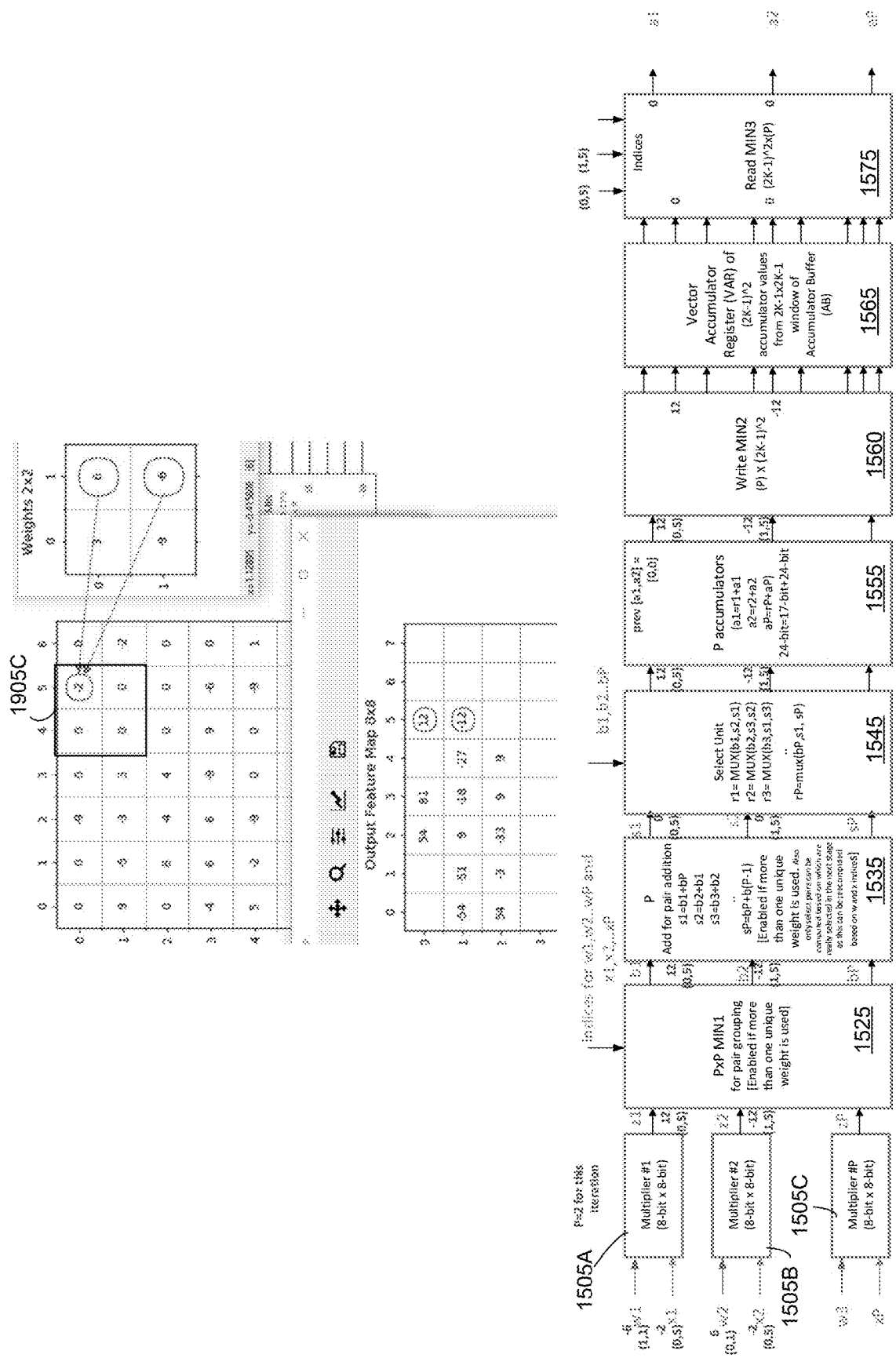

FIG. 19D shows an example of the sub-feature map 1905C having a single non-zero data value. With a single non-zero data value and three multipliers, in some embodiments, three weight values may be applied in a single iteration. For example, in the first iteration, the non-zero data value "−2" may be input into the multiplier 1905A along with the first weight value "−6." With two remaining multipliers, the non-zero data value "−2" may also be input into the multiplier 1905B along with the second weight value "6" and into the multiplier 1905C along with the third weight value "−9." However, if the sparse tensor compute unit 1900 is configured to limit the number of unique weight values in a particular iteration to two, only the first and the second data weight values may be processed in the first iteration. In such a case, the multiplier 1905C may not receive the non-zero data value "−2" with the third weight value. Rather, the multiplier 1905C may sit idle, as shown in FIG. 19D. The processing in the first iteration using the multipliers 1905A and 1905B may proceed similar to what is described above.

Figure 19E:
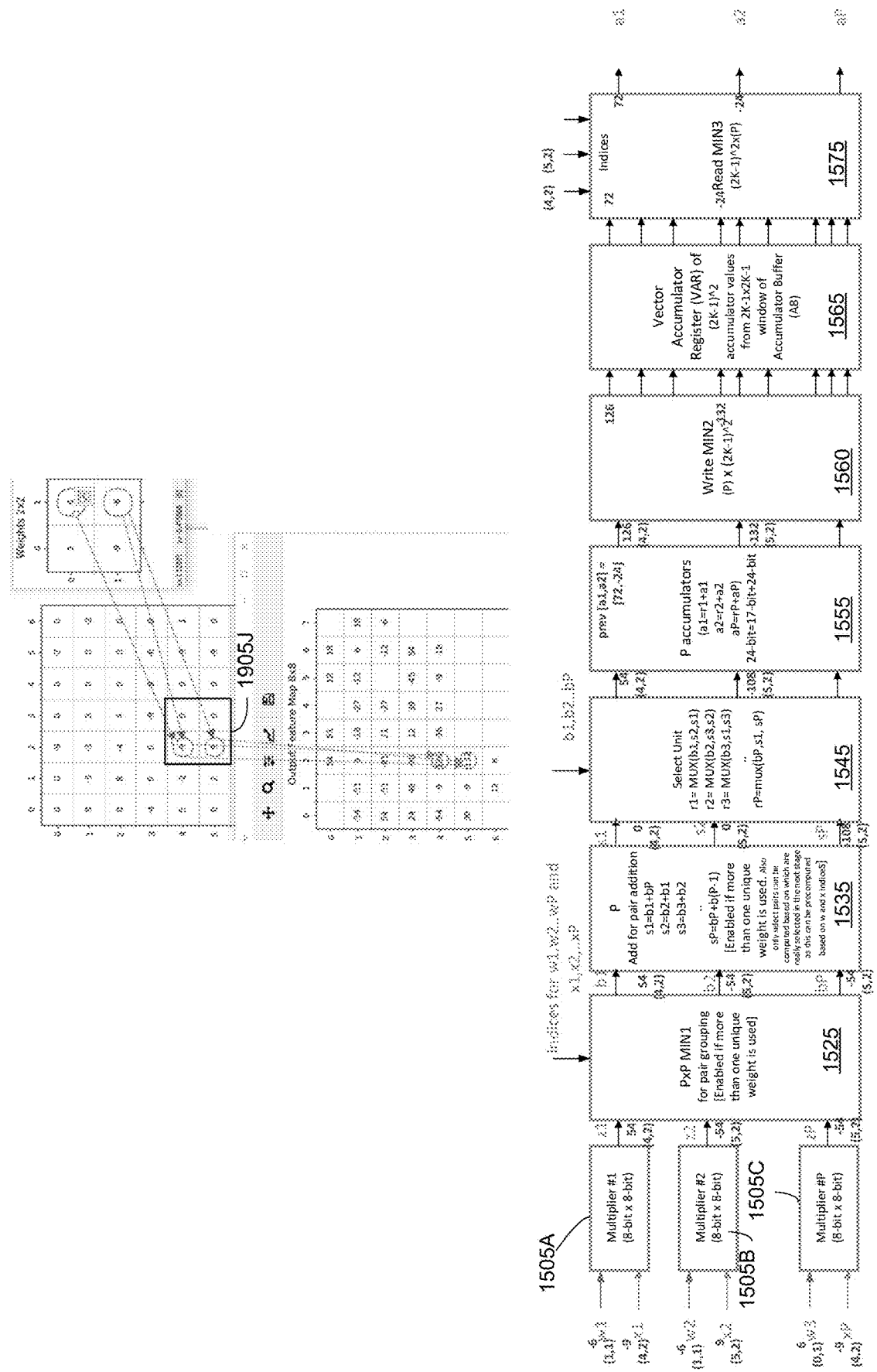

FIG. 19E shows an example in which the result index values of one iteration and the overlapping half of the next iteration overlap. For example, the sub-feature map 1905J includes two non-zero values, which may be processed similar to what is describe above for the sub-feature map 1905A. However, the result index value of (5, 2) computed for the product of the data value "9" and the first weight value of "−6" is same as the result index value of (5, 2) computed for the product of the data value "−9" and the second weight value of "6." In such a case, a merge operation may be performed, as discussed in FIGS. 20A and 20B below.

The example of FIGS. 19A-19E may also be used to process the input feature map 1900 using the sparse tensor compute unit of FIG. 14. The sparse tensor compute unit 1400 is intended to be used with two unique weight values. Thus, the example of FIGS. 19A-19E may also apply to the sparse tensor compute unit 1400. The sparse tensor compute unit 1400 is similar to the sparse tensor compute unit 1500 with the exception of the addition block 1535 and the select unit 1545. Since the MIN 1525 is similar to the MIN 1425, the data from the MIN 1425 may be transmitted directly to the accumulator 1430 in the sparse tensor compute unit 1400 instead of the MIN 1525 transmitting the data to the addition block 1535 in the sparse tensor compute unit 1500. The MIN 1425 and the MIN 1525 may both be used to avoid a collision when two product values have the same result index value. When such a collision occurs, the MIN 1425 and the MIN 1525 apply a merging operation, discussed in FIGS. 20A and 20B below.

Figure 20A:
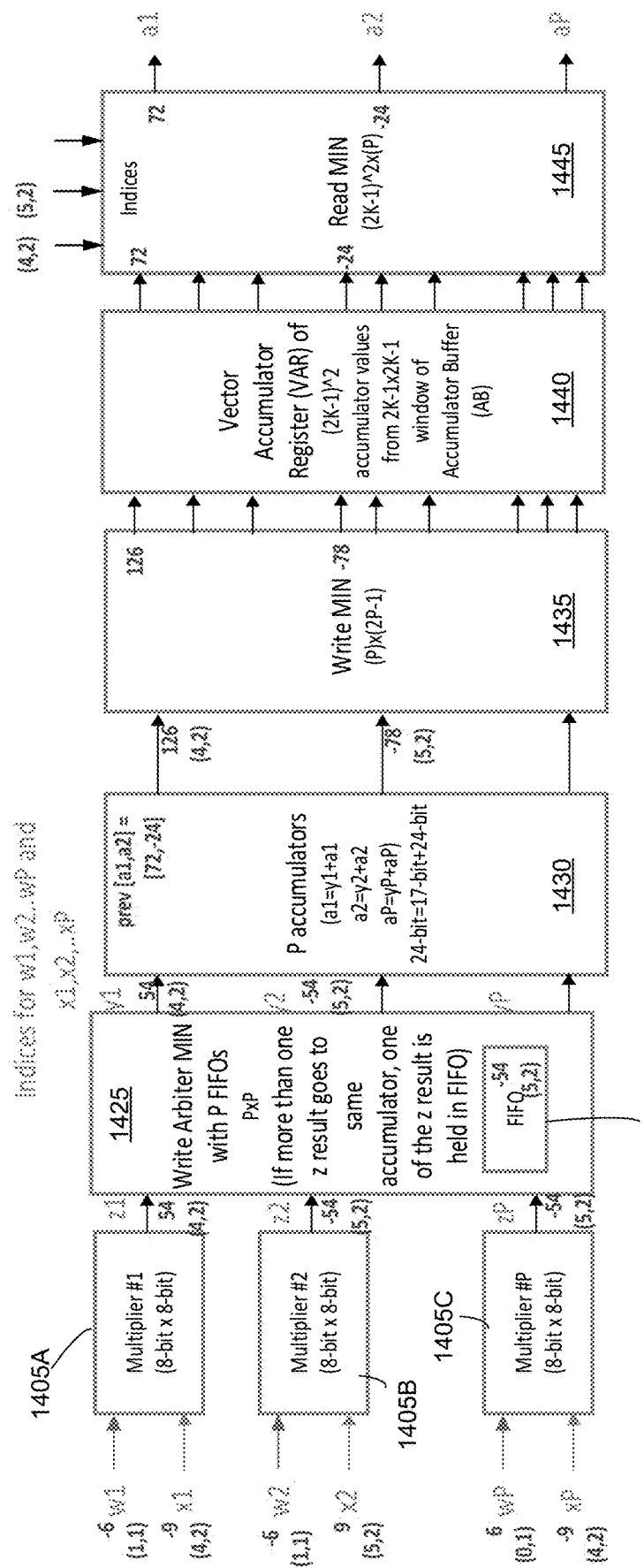
FIGS. 20A-20B show an example of a merging operation, in accordance with some embodiments of the present disclosure.
Figure 20B:
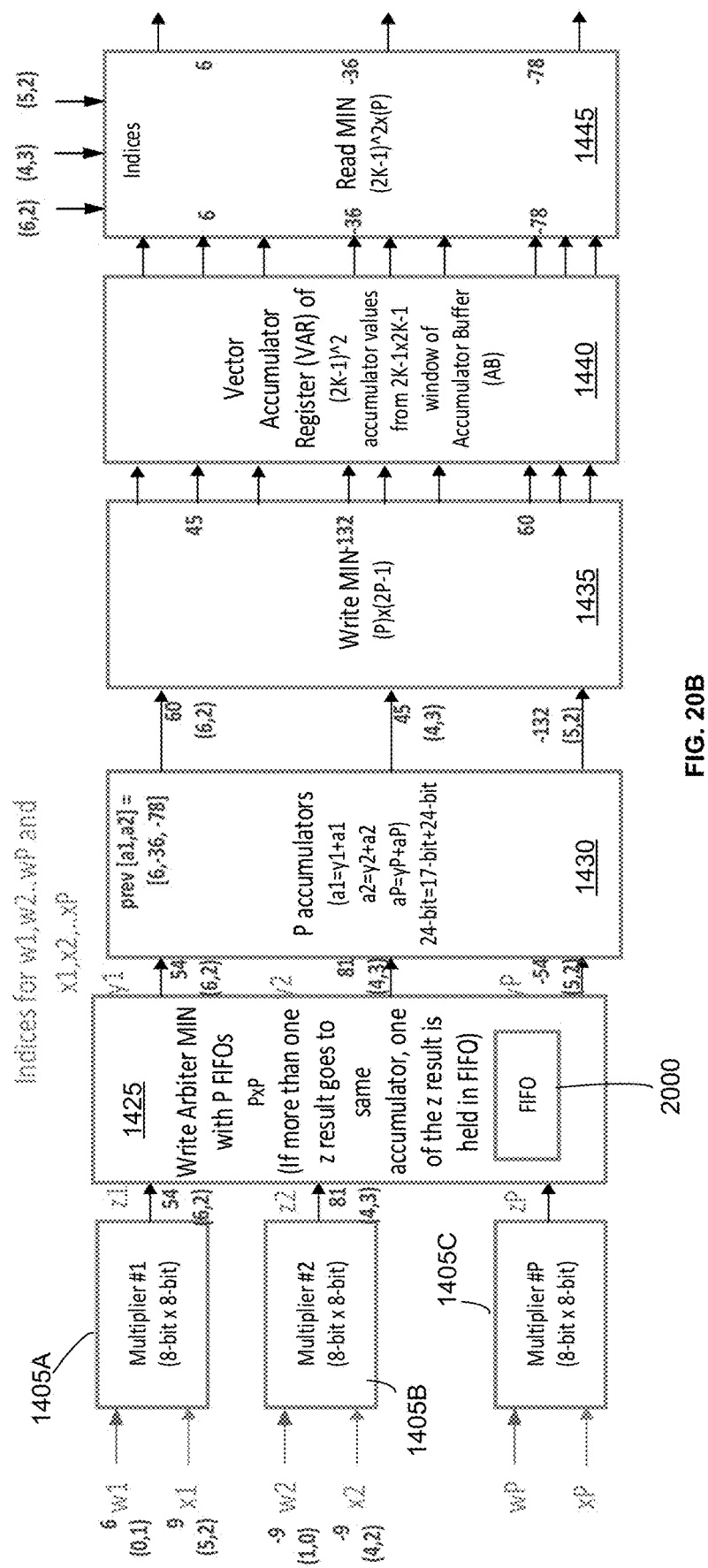

Turning now to FIGS. 20A and 20B, an example of a merging operation is explained, in accordance with some embodiments of the present disclosure. The merging operation is described with respect to the sparse tensor compute unit 1400, but the merging operation may similarly be implemented in the sparse tensor compute unit 1500. As discussed above with respect to the sub-feature map 1905J and FIG. 19E, the result index value of (5, 2) computed for the product of the data value "9" and the first weight value of "−6" is same as the result index value of (5, 2) computed for the product of the data value "−9" and the second weight value of "6." The merging operation resolves the collision in the result index value. The merging operation may be implemented by the MIN 1425 in the sparse tensor compute unit 1400 (or the MIN 1525 in the sparse tensor compute unit 1500). In some embodiments, the MIN 1425 (and the MIN 1525) may include a FIFO (first in first out buffer) 2000 to resolve the collision.

When the MIN 1425 (or the MIN 1525) receives the result index values from the plurality of multipliers 1405A-1405P, upon detecting the collision, the MIN may transfer one of the product values and the corresponding result index value to the FIFO 2000. In some embodiments, the product value and the corresponding result index value that is transferred to the FIFO 2000 may be based on the order in which the weight values are being processed. For example, in the example of the sub-feature map 1905J, the product value corresponding to the second weight value may be transmitted to the FIFO 2000 instead of the product value corresponding to the first weight value. In some embodiments, the MIN 1425 (and the MIN 1525) may be programmed with which product value to transfer to the FIFO 2000. If there are more than two collisions (e.g., more than two product values having the same result index value), all colliding product values may be sent to the FIFO 2000 except one.

Upon transferring the product value(s) to the FIFO 2000, the remaining product values and their corresponding result index values may be transmitted to the accumulator 1430 (in the sparse tensor compute unit 1400) or to the addition block 1535 (in the sparse tensor compute unit 1500). Thus, when three values are being processed in parallel in the plurality of multipliers 1405A-1405C and there is a collision between two product values, one of the colliding product values is stored in the FIFO 2000, and only two product values are further processed. The product value stored in the FIFO 2000 is processed in the next round/iteration. Thus, as shown, in FIG. 20B, in the next round/iteration of processing the sub-feature map 1905J, only two data values are input into the plurality of multipliers 1405A-1405P to generate two product values. The two product values are sent to the MIN 1425, and if there is no collision between the product values received by the MIN and the product value stored in the FIFO 2000, three product values are output by the MIN, as shown in FIG. 20B. The remaining downstream processing then proceeds normally, as discussed above.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
a multiplication circuit comprising a plurality of multipliers, each of the plurality of multipliers configured to receive a data value and a weight value to generate a product value in a convolution operation of a machine learning application, the data value is part of one of a plurality of sub-feature maps that are generated from an input feature map;
an accumulator configured to receive the product value from each of the plurality of multipliers; and
a register bank configured to store an output of the convolution operation,
wherein the accumulator is further configured to receive a portion of values stored in the register bank and combine the received portion of values with the product values to generate combined values; and
wherein the register bank is further configured to replace the portion of values with the combined values.

2. The system of claim 1, wherein the register bank comprises a plurality of row registers configured to shift in a row direction and a plurality of column registers configured to shift in a column direction.

3. The system of claim 1, wherein combining the received portion of values with the product values comprises adding each of the received portion of values with a corresponding one of the product values.

4. The system of claim 1, further comprising a reconfigurable tree adder configured to receive the product values and combine groups of the product values.

5. The system of claim 1, wherein the register bank is configured to shift a subset of values from a previous iteration by one position and send the shifted subset of values to the accumulator.

6. A system comprising:
a multiplication circuit comprising a plurality of multipliers, each of the plurality of multipliers configured to receive a data value and a weight value to generate a product value in a convolution operation of a machine learning application;
an accumulator configured to receive the product value from each of the plurality of multipliers;
a register bank configured to store an output of the convolution operation,
wherein the accumulator is further configured to receive a portion of values stored in the register bank and combine the received portion of values with the product values to generate combined values; and
wherein the register bank is further configured to replace the portion of values with the combined values; and
a first multi-stage interconnection network configured to receive the combined values from the accumulator.

7. The system of claim 6, wherein the first multi-stage interconnection network is configured to sort the combined values and write the sorted combined values into a vector accumulator register.

8. The system of claim 7, further comprising a second multi-stage interconnection network configured to read a subset of values from the vector accumulator register and send the subset of values to the accumulator.

9. The system of claim 7, wherein the vector accumulator register is further configured to receive the portion of values from the register bank before sending the portion of values to the accumulator.

10. The system of claim 6, further comprising a third multi-stage interconnection network configured to receive the product values from the plurality of multipliers, and send at least some of the product values to the accumulator based on an index value of each of the product values.

11. A method comprising:
inputting, by a processor in a machine learning application, a data value and a weight value into each of a plurality of multipliers to generate a plurality of product values in each iteration of a plurality of iterations of a convolution operation;
combining, by the processor in each iteration of the plurality of iterations, each of the plurality of product values with one of a plurality of accumulator values in an accumulator to generate a plurality of combined values, wherein the plurality of accumulator values of a current iteration are received from a register bank and are obtained by shifting a subset of values in the register bank after a previous iteration by one position; and replacing, by the processor in each iteration of the plurality of iterations, the plurality of accumulator values with the plurality of combined values in the register bank.

12. The method of claim 11, wherein values in the register bank after a last iteration of the plurality of iterations provide an output of the convolution operation on an input sub-feature map generated from an input feature map.

13. The method of claim 11, wherein each of the plurality of multipliers receive a same weight value.

14. The method of claim 11, wherein at least one of the plurality of multipliers receive the weight value that is different from the weight value received by a remaining one of the plurality of multipliers.

15. The method of claim 11, further comprising receiving the combined values from the accumulator in a first multi-stage interconnection network.

16. The method of claim 11, further comprising shifting, by the processor, values in the register bank after a last iteration of the plurality of iterations to obtain an output sub-feature map.

17. A non-transitory computer-readable media comprising computer-readable instructions stored thereon that when executed by a processor associated with a machine learning application cause the processor to:

partition an input feature map into a plurality of sub-feature maps;

input each of the plurality of sub-feature maps into a tensor compute unit of a plurality of tensor compute units to generate an output sub-feature map, wherein generating the output sub-feature map for a first sub-feature map of the plurality of sub-feature maps comprises:

inputting a plurality of data values of the first sub-feature map into a plurality of multipliers of a first tensor compute unit of the plurality of tensor compute units;

inputting a weight value into the plurality of multipliers for generating a plurality of product values;

combining each of the plurality of product values with one of a previously computed product value to obtain a plurality of combined values; and shifting the plurality of combined values to obtain the output sub-feature map for the first sub-feature map; and combine the output sub-feature map from each of the plurality of tensor compute units to obtain an output feature map.

18. The non-transitory computer-readable media of claim 17, further comprising performing a non-linear Rectified Linear Unit operation and a pooling operation on the shifted plurality of combined values to obtain the output sub-feature map.

19. The non-transitory computer-readable media of claim 17, further comprising compressing the output sub-feature map before combining to obtain the output feature map.

20. The non-transitory computer-readable media of claim 18, wherein each of the plurality of data values that are input into the plurality of multipliers is a non-zero value, and wherein the weight value is a non-zero value.

* * * * *